(12) United States Patent
Fukui et al.

(10) Patent No.: US 11,951,805 B2
(45) Date of Patent: Apr. 9, 2024

(54) HEAT MANAGEMENT SYSTEM

(71) Applicant: DENSO CORPORATION, Kariya (JP)

(72) Inventors: Yasuteru Fukui, Kariya (JP);
Nobuharu Kakehashi, Kariya (JP);
Tomohiro Hayase, Kariya (JP)

(73) Assignee: DENSO CORPORATION, Kariya (JP)

( * ) Notice: Subject to any disclaimer, the term of this patent is extended or adjusted under 35 U.S.C. 154(b) by 26 days.

(21) Appl. No.: 17/410,103

(22) Filed: Aug. 24, 2021

(65) Prior Publication Data

US 2022/0024279 A1    Jan. 27, 2022

Related U.S. Application Data

(63) Continuation of application No. PCT/JP2020/006470, filed on Feb. 19, 2020.

(30) Foreign Application Priority Data

Feb. 28, 2019   (JP) .................. 2019-035448
Feb. 13, 2020   (JP) .................. 2020-022300

(51) Int. Cl.
*F24F 7/00*       (2021.01)
*B60H 1/00*       (2006.01)
*B60H 1/14*       (2006.01)

(52) U.S. Cl.
CPC ......... *B60H 1/00921* (2013.01); *B60H 1/143* (2013.01); *B60H 2001/00928* (2013.01);
(Continued)

(58) Field of Classification Search
CPC ............... B60H 1/00921; B60H 1/143; B60H 2001/00928; B60H 2001/00942; B60H 2001/00949
(Continued)

(56) References Cited

U.S. PATENT DOCUMENTS

2012/0174602 A1   7/2012 Olivier et al.
2015/0258875 A1   9/2015 Enomoto et al.
(Continued)

FOREIGN PATENT DOCUMENTS

CN    110997369 A  *  4/2020
DE    112014006161 T5   10/2016
(Continued)

*Primary Examiner* — Davis D Hwu
(74) *Attorney, Agent, or Firm* — Harness, Dickey & Pierce, P.L.C.

(57) ABSTRACT

A heat management system includes a high-temperature heat medium circuit, a low-temperature heat medium circuit, a circuit connection part, and a circuit switching part. The high-temperature heat medium circuit connects a heat medium and refrigerant heat exchanger and a heater core. The low-temperature heat medium circuit connects a radiator and a heat generation equipment. The circuit connection part connects the high-temperature heat medium circuit and the low-temperature heat medium circuit such that the heat medium can flow in and out. The heat management system is switched by the circuit switching part between an operation mode in which the heat medium heated by the heat medium and refrigerant heat exchanger is circulated through the heater core and an operation mode in which the heat medium heated by the heat generation equipment and the heat medium and refrigerant heat exchanger is circulated through the heater core.

17 Claims, 30 Drawing Sheets

(52) U.S. Cl.
 CPC ............. *B60H 2001/00942* (2013.01); *B60H 2001/00949* (2013.01)

(58) Field of Classification Search
 USPC .......................................................... 165/59
 See application file for complete search history.

(56) References Cited

U.S. PATENT DOCUMENTS

| | | |
|---|---|---|
| 2016/0332505 A1 | 11/2016 | Yamanaka et al. |
| 2020/0207178 A1* | 7/2020 | Makimoto et al. ......................... B60H 1/00885 |

FOREIGN PATENT DOCUMENTS

| | | |
|---|---|---|
| JP | H07101227 A | 4/1995 |
| JP | 2010013044 A | 1/2010 |
| JP | 2015154521 A | 8/2015 |
| JP | 2018058573 A | 4/2018 |
| WO | WO2014034062 A1 * | 3/2014 |

* cited by examiner

⇨ : COOLING MODE
⇨ : MEDIUM-COOL MODE
⇨⇨ : MEDIUM-COOL AND COOLING MODE

HEAT MANAGEMENT SYSTEM

CROSS REFERENCE TO RELATED APPLICATION

The present application is a continuation application of International Patent Application No. PCT/JP2020/006470 filed on Feb. 19, 2020, which designated the U.S. and claims the benefit of priority from Japanese Patent Applications No. 2019-035448 filed on Feb. 28, 2019 and No. 2020-022300 filed on Feb. 13, 2020. The entire disclosures of all of the above applications are incorporated herein by reference.

TECHNICAL FIELD

The present disclosure relates to a heat management system and is suitable for use in a vehicle that obtains a driving force for vehicle traveling from a traveling electric motor.

BACKGROUND

Conventionally, a technique of a heat management system applied to an electric vehicle that obtains a driving force for vehicle traveling from a traveling electric motor is known. In a vehicle heat-pump air conditioner, waste heat generated in an electric motor for driving a vehicle and a controller of the electric motor is recovered via cooling water of a cooling water circuit and is used as heating sources in a vehicle interior.

SUMMARY

A heat management system according to an aspect of the present disclosure includes a high-temperature heat medium circuit, a low-temperature heat medium circuit, a circuit connection part and a circuit switching part.

The high-temperature heat medium circuit connects a heat medium and refrigerant heat exchanger and a heater core to circulate a heat medium. The heat medium and refrigerant heat exchanger is configured to adjust a temperature of the heat medium by heat exchange with a refrigerant circulating in a refrigeration cycle. The heater core is configured to radiate heat of the heat medium to ventilation air to be blown to a space to be air conditioned.

The low-temperature heat medium circuit connects a radiator and a heat generation equipment to circulate the heat medium. The radiator is configured to radiate heat of the heat medium to outside air. The heat generation equipment is configured to generate heat in accordance with operation and to have a temperature adjusted by the heat of the heat medium.

The circuit connection part connects the high-temperature heat medium circuit and the low-temperature heat medium circuit, to flow in and out the heat medium in the high-temperature heat medium circuit and the low-temperature heat medium circuit. The circuit switching part is configured to switch the flow of the heat medium in the high-temperature heat medium circuit, the low-temperature heat medium circuit and the circuit connection part.

In the heat management system, the circuit switching part may be configured to switch between an operation mode in which the heat medium heated by the heat medium and refrigerant heat exchanger is circulated to pass through the heater core, and an operation mode in which the heat medium heated by the heat generation equipment and the heat medium and refrigerant heat exchanger is circulated to pass through the heater core.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

Figure 1:
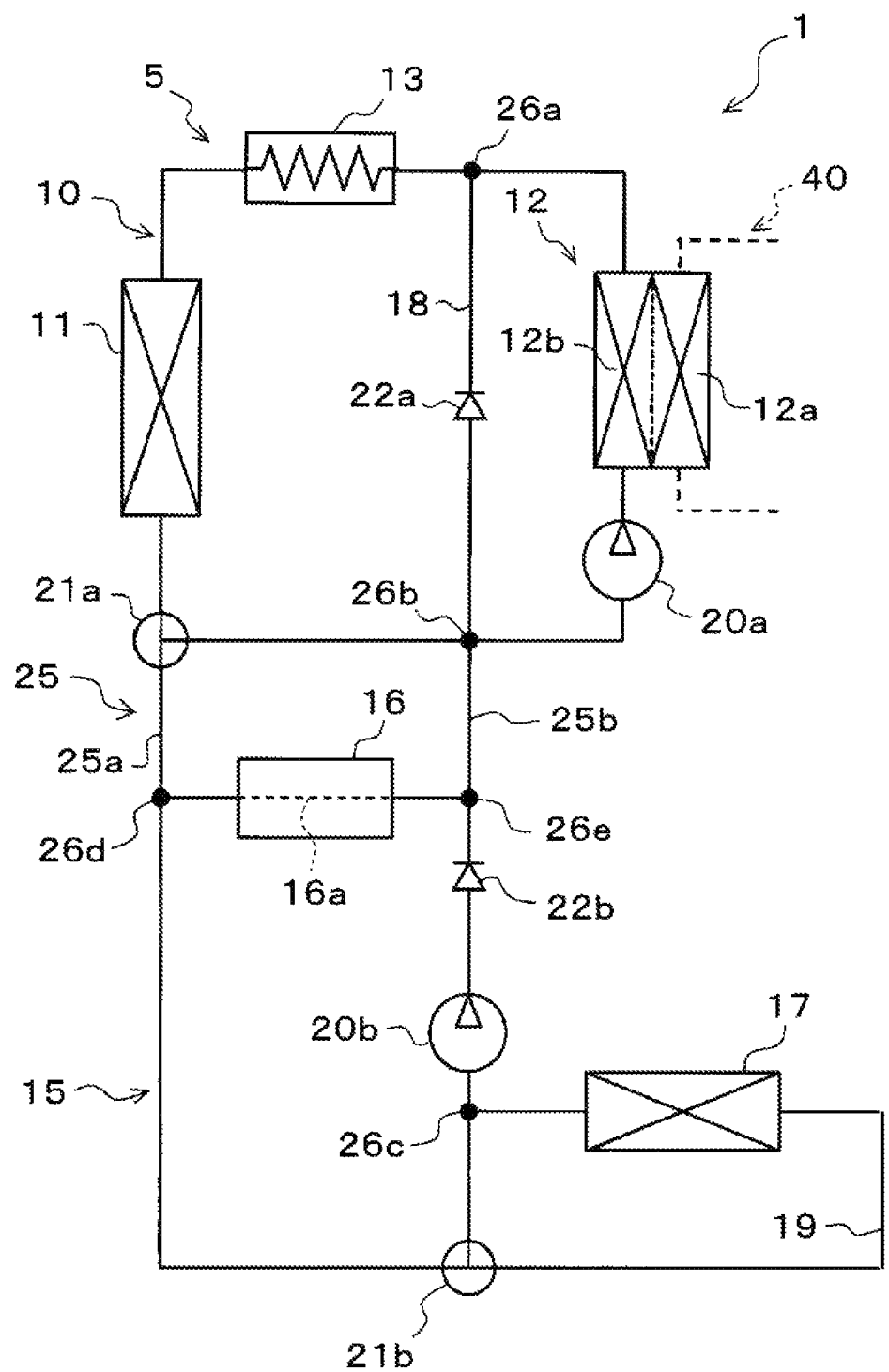
FIG. 1 is an overall configuration diagram of a heat management system according to a first embodiment.

In a heat management system, the heat of cooling water in a cooling water circuit is pumped up by a vapor-compression heat pump and used for heating a vehicle interior. At this time, it is necessary to exchange heat between the cooling water in the cooling water circuit and a refrigerant of the heat pump, thereby causing a heat loss associated with heat exchange efficiency or the like when the heat is transported from the cooling water to the refrigerant.

Further, for using waste heat of heat generation equipment mounted on a vehicle such as an electric motor as a heating source, it is necessary to operate a compressor constituting a heat pump. Thus, at the time of using the waste heat of the heat generation equipment as the heating source, it is desirable to reduce the operating amount of the compressor as much as possible.

The present disclosure has been made in view of these points, and an object of the present disclosure is to provide a heat management system that can further improve efficiency when waste heat of heat generation equipment is used for heating a vehicle interior.

A heat management system according to an aspect of the present disclosure includes a high-temperature heat medium circuit, a low-temperature heat medium circuit, a circuit connection part and a circuit switching part.

The high-temperature heat medium circuit connects a heat medium and refrigerant heat exchanger and a heater core to circulate a heat medium. The heat medium and refrigerant heat exchanger is configured to adjust a temperature of the heat medium by heat exchange with a refrigerant circulating in a refrigeration cycle. The heater core is configured to radiate heat of the heat medium to ventilation air to be blown to a space to be air conditioned.

The low-temperature heat medium circuit connects a radiator and a heat generation equipment to circulate the heat medium. The radiator is configured to radiate heat of the heat medium to outside air. The heat generation equipment is configured to generate heat in accordance with operation and to have a temperature adjusted by the heat of the heat medium.

The circuit connection part connects the high-temperature heat medium circuit and the low-temperature heat medium circuit, to flow in and out the heat medium in the high-temperature heat medium circuit and the low-temperature heat medium circuit. The circuit switching part is configured to switch the flow of the heat medium in the high-temperature heat medium circuit, the low-temperature heat medium circuit and the circuit connection part.

In the heat management system, the circuit switching part may be configured to switch between an operation mode in which the heat medium heated by the heat medium and refrigerant heat exchanger is circulated to pass through the heater core, and an operation mode in which the heat medium heated by the heat generation equipment and the heat medium and refrigerant heat exchanger is circulated to pass through the heater core.

According to this, because the heat medium heated by the heat medium and refrigerant heat exchanger can be circulated to pass through the heater core, the space to be air conditioned can be heated using the refrigeration cycle. In addition, because the heat medium heated by the heat generation equipment and the heat medium and refrigerant heat exchanger can be circulated through the heater core, the waste heat of the heat generation equipment can be used for heating the ventilation air via the heat medium.

That is, according to the heat management system, the waste heat of the heat generation equipment can be used for heating the space to be air conditioned without using the refrigerant of the refrigeration cycle, so that the heat loss associated with the heat exchange efficiency and the like can be reduced to improve the heating efficiency.

In addition, the heat medium heated by the heat generation equipment and the heat medium and refrigerant heat exchanger is circulated to pass through the heater core, and the waste heat of the heat generation equipment is used for heating, whereby the operating amount of the refrigeration cycle (e.g., the operating amount of the compressor) can be kept low. As a result, the heat management system can improve the heating efficiency of the space to be air conditioned from the viewpoint of energy consumption.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

First, a schematic configuration of a heat management system 1 according to a first embodiment will be described with reference to the drawings. The heat management system 1 according to the first embodiment is mounted on an electric vehicle that obtains a driving force for traveling from a motor-generator.

In the electric vehicle, the heat management system 1 performs air conditioning in a vehicle interior, which is a space to be air conditioned, and performs temperature adjustment of in-vehicle equipment (e.g., heat generation equipment 16) subjected to temperature adjustment. That is, in the electric vehicle, the heat management system 1 according to the first embodiment is used as a vehicle air conditioner with a temperature adjustment function of in-vehicle equipment.

In the heat management system 1 in the first embodiment, a heat generation equipment 16 that generates heat during operation is subjected to temperature adjustment. The heat generation equipment 16 includes a plurality of components. Specific examples of the components of the heat generation equipment 16 may include a motor-generator, a power control unit (So-called PCU), and a control device for an advanced driving assistance system (So-called ADAS).

The motor-generator outputs the driving force for traveling by being supplied with electric power and generates regenerative electric power at the time of vehicle deceleration or the like. The PCU is obtained by integrating a transformer, a frequency converter, and the like in order to appropriately control electric power supplied to each in-vehicle equipment.

The proper temperature ranges of the respective components of the heat generation equipment 16 are different from each other. For example, the proper temperature range of the motor-generator is wider than the proper temperature range of the power control unit and is set to a high-temperature zone. Thus, the proper use of the power control unit requires more delicate temperature management than the motor-generator.

The heat management system 1 according to the first embodiment includes a heat medium circuit 5, a refrigeration cycle 40, an interior air conditioning unit 60, and the like. The heat management system 1 performs air conditioning in a vehicle interior, which is a space to be air conditioned, and performs temperature adjustment of in-vehicle equipment (e.g., heat generation equipment 16) subjected to temperature adjustment.

The heat medium circuit 5 is a heat-medium circulation circuit that circulates cooling water as a heat medium and includes a high-temperature heat medium circuit 10, a low-temperature heat medium circuit 15, and a circuit connection part 25. In the heat management system 1, the circuit configuration of the heat medium circuit 5 is switched as described later in order to perform vehicle interior air-conditioning and cooling of in-vehicle equipment.

The refrigeration cycle 40 is a refrigerant circulation circuit that circulates a refrigerant. In the heat management system 1, the circuit configuration of the refrigeration cycle 40 is switched in accordance with various air conditioning operation modes to be described later.

First, the configuration of the heat medium circuit 5 in a first embodiment will be described with reference to the drawings. As illustrated in FIG. 1, the heat medium circuit 5 is a heat-medium circulation circuit that circulates cooling water as a heat medium and includes a high-temperature heat medium circuit 10, a low-temperature heat medium circuit 15, a circuit connection part 25, and the like. In the heat management system 1, an ethylene glycol aqueous solution, which is an incompressible fluid, is adopted as a heat medium circulating in the heat medium circuit 5.

In the high-temperature heat medium circuit 10, a heater core 11, a heat medium passage 12b of a water refrigerant heat exchanger 12, a heater 13, a first pump 20a, a first heat-medium three-way valve 21a, and the like are disposed.

The first pump 20a pumps the heat medium toward the heat medium passage 12b of the water refrigerant heat exchanger 12. The first pump 20a is an electric pump with its rotation speed (i.e., pumping capacity) controlled by a control voltage output from the control device 70.

The water refrigerant heat exchanger 12 is a component of the high-temperature heat medium circuit 10 and is one of the components of the refrigeration cycle 40. The water refrigerant heat exchanger 12 includes a refrigerant passage 12a through which the refrigerant of the refrigeration cycle 40 is circulated, and the heat medium passage 12b through which the heat medium of the heat medium circuit 5 is circulated.

The water refrigerant heat exchanger 12 is formed of the same kind of metal (an aluminum alloy in the first embodiment) having excellent heat conductivity, and each constituent member is integrated by brazing. As a result, the refrigerant circulating through the refrigerant passage 12a and the heat medium circulating through the heat medium passage 12b can exchange heat with each other. Thereby, the water refrigerant heat exchanger 12 is an example of the heat medium and refrigerant heat exchanger.

In the following description, for clarifying the description, in the heat medium passage 12b of the water refrigerant heat exchanger 12, a connection port on the first pump 20a side is referred to as a heat medium inlet, and a connection port on the other side is referred to as a heat medium outlet.

A heater 13 is connected to the heat medium outlet side of the water refrigerant heat exchanger 12. The heater 13 includes a heating passage and a heat generation part and heats the heat medium flowing into the heater core 11 by electric power supplied from a control device 70 to be described later. The calorific value of the heater 13 can be arbitrarily adjusted by controlling the electric power from the control device 70.

The heating passage of the heater 13 is a passage through which the heat medium is circulated. The heat generation part heats the heat medium circulating through the heating passage by being supplied with electric power. Specifically, a positive temperature coefficient (PTC) element or a nichrome wire can be adopted as the heat generation part.

A heat medium inlet side of the heater core 11 is connected to an outlet of the heater 13. The heater core 11 is a heat exchanger that exchanges heat between the heat medium and ventilation air blown from an interior blower 62 to be described later. The heater core 11 is a heating part that heats the ventilation air by using the heat of the heat medium heated by the water refrigerant heat exchanger 12, the heater 13, and the like as a heat source. The heater core 11 is disposed in a casing 61 of an interior air conditioning unit 60 to be described later.

The heat medium outlet of the heater core 11 is connected to the inflow port side of the first heat-medium three-way valve 21a. The first heat-medium three-way valve 21a is a three-way flow rate adjustment value capable of continuously adjusting a flow rate ratio between a flow rate of a heat medium caused to flow out to the suction port side of the first pump 20a and a flow rate of a heat medium caused to flow out to a first connection passage 25a side to be described later among the heat media flowing out of the heater core 11. The operation of the first heat-medium three-way valve 21a is controlled by a control signal output from the control device 70.

Further, the first heat-medium three-way valve 21a can cause the total flow rate of the heat medium flowing out of the heater core 11 to flow out to either the first pump 20a side or the first connection passage 25a side. Thereby, the first heat-medium three-way valve 21a can switch the circuit configuration of the heat medium circuit 5. Hence, the first heat-medium three-way valve 21a functions as a part of a circuit switching part of the heat medium circuit 5 that switches the circuit configuration of the heat medium circuit 5.

As illustrated in FIG. 1, a bypass passage 18 is connected to the high-temperature heat medium circuit 10. One end side of the bypass passage 18 is connected to a pipe connecting a heat medium outlet of the heat medium passage 12b in the water refrigerant heat exchanger 12 and a heat medium inlet of the heater 13 and constitutes a first connection 26a. The other end side of the bypass passage 18 is connected to a pipe connecting an outflow port of the first heat-medium three-way valve 21a and a suction port of the first pump 20a and constitutes a second connection 26b.

A first heat-medium check valve 22a is disposed in the bypass passage 18. The first heat-medium check valve 22a allows the heat medium to flow from the second connection 26b side to the first connection 26a side and prohibits the heat medium from flowing from the first connection 26a side to the second connection 26b side.

Next, the configuration of the low-temperature heat medium circuit 15 will be described. In the low-temperature heat medium circuit 15, a heat medium passage 16a of the heat generation equipment 16, a radiator 17, a second pump 20b, a second heat-medium three-way valve 21b, and the like are disposed. The second pump 20b pumps the heat medium toward one end portion side of the heat medium passage 16a in the heat generation equipment 16. The basic configuration of the second pump 20b is similar to that of the first pump 20a.

A second heat-medium check valve 22b is disposed on the discharge port side of the second pump 20b. The second heat-medium check valve 22b allows the heat medium to flow from the discharge port side of the second pump 20b to the heat medium passage 16a side of the heat generation equipment 16 and prohibits the heat medium from flowing from the heat medium passage 16a side to the discharge port side of the second pump 20b.

The heat medium passage 16a of the heat generation equipment 16 is formed in a housing portion forming an outer shell of the heat generation equipment 16, the inside of a case, or the like. The heat medium passage 16a of the heat generation equipment 16 is a heat medium passage that adjusts the temperature of the heat generation equipment 16 by circulating the heat medium. In other words, the heat medium passage 16a of the heat generation equipment 16 functions as a temperature adjustment part that adjusts the temperature of the heat generation equipment 16 by heat exchange with the heat medium circulating in the heat medium circuit 5.

The second heat-medium three-way valve 21b is connected to the other end side of the heat medium passage 16a in the heat generation equipment 16. The second heat-medium three-way valve 21b is a three-way flow rate adjustment value capable of continuously adjusting a flow rate ratio between a flow rate of a heat medium flowing out to the suction port side of the second pump 20b and a flow rate of a heat medium flowing out to the radiator-side passage 19 side in the heat medium flowing in from the heat generation equipment 16 side.

The basic configuration of the second heat-medium three-way valve 21b is similar to that of the first heat-medium three-way valve 21a. Hence, the first heat-medium three-way valve 21a is a heat medium circuit switching part that switches the circuit configuration of the heat medium circuit 5.

The radiator-side passage 19 is a heat medium passage for guiding the heat medium to the radiator 17. One end portion of the radiator-side passage 19 is connected to one of the heat medium outlets in the second heat-medium three-way valve 21b. The other end portion of the radiator-side passage 19 is connected between the suction port of the second pump 20b and another one of the heat medium outlets of the second heat-medium three-way valve 21b and constitutes a third connection 26c.

The radiator 17 is a heat exchanger that exchanges heat between the heat medium circulating inside and outside air. Therefore, the radiator 17 radiates the heat of the heat medium passing through the radiator-side passage 19 to the outside air. The radiator 17 is disposed on the front side in the drive device compartment. Thus, the radiator 17 can be configured integrally with the exterior heat exchanger 43.

As illustrated in FIG. 1, the heat medium circuit 5 includes a circuit connection part 25. The circuit connection part 25 is a portion that connects the high-temperature heat medium circuit 10 and the low-temperature heat medium circuit 15 such that the heat medium is able to flow in and out. In the first embodiment, the circuit connection part 25 is made up of the first connection passage 25a and a second connection passage 25b.

The first connection passage 25a is connected to one inflow/outflow port of the first heat-medium three-way valve 21a in the high-temperature heat medium circuit 10. The other end side of the first connection passage 25a is connected to a pipe between the other end side of the heat medium passage 16a in the heat generation equipment 16 and the inflow port of the second heat-medium three-way valve 21b in the low-temperature heat medium circuit 15, and constitutes a fourth connection 26d.

The second connection passage 25b is connected to the second connection 26b in the high-temperature heat medium circuit 10. The other end side of the second connection passage 25b is connected to a pipe between the outflow port of the second heat-medium check valve 22b and one end side of the heat medium passage 16a in the heat generation equipment 16 in the low-temperature heat medium circuit 15 and constitutes a fifth connection 26e.

Therefore, the first connection passage 25a and the second heat-medium check valve 22b enables the heat medium to circulate in the heat medium circuit 5 while allowing the heat medium to flow in and out between the high-temperature heat medium circuit 10 and the low-temperature heat medium circuit 15.

Figure 2:
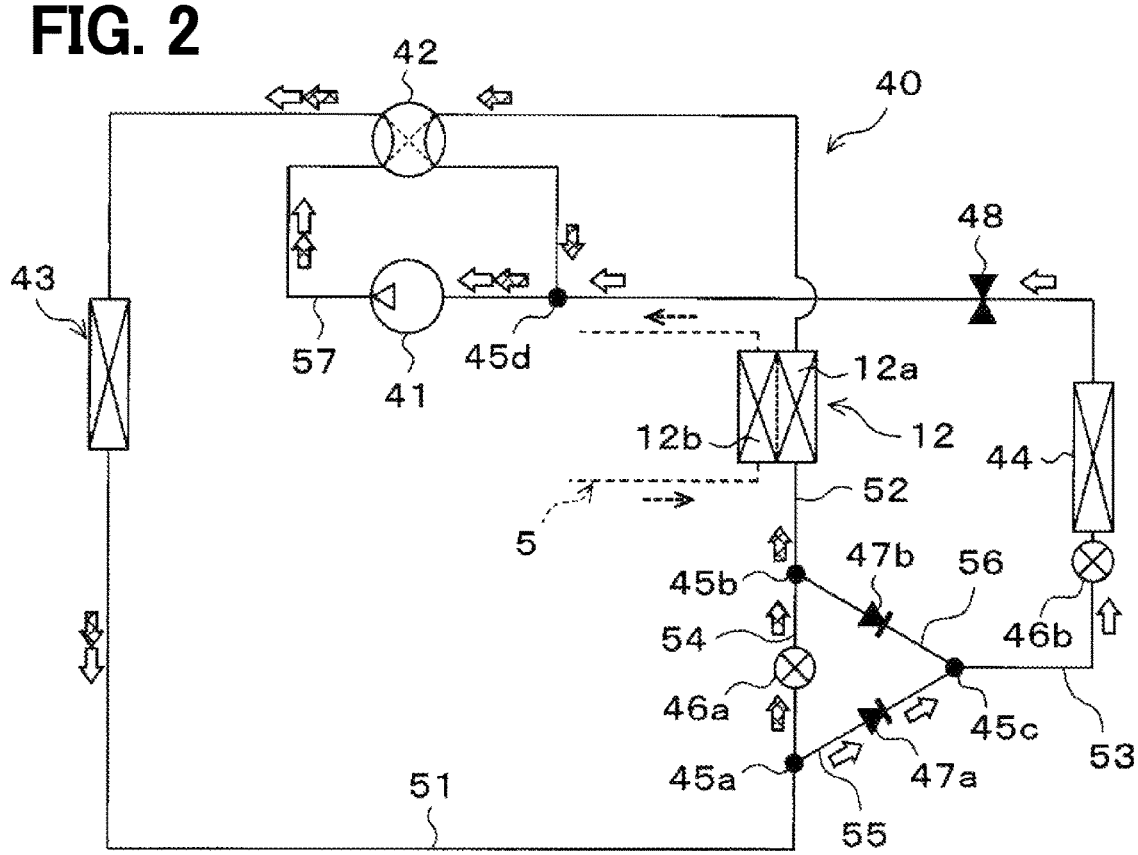
FIG. 2 is a configuration diagram of a refrigeration cycle constituting a heat management system.

Next, the configuration of the refrigeration cycle 40 in the heat management system 1 will be described with reference to FIG. 2. As illustrated in FIG. 2, the heat management system 1 adopts a hydrofluoroolefin (HFO) refrigerant (specifically, R1234yf) as a refrigerant circulating in the refrigeration cycle 40.

The refrigeration cycle 40 constitutes a vapor-compression subcritical refrigeration cycle in which the refrigerant pressure on the high-pressure side does not exceed the critical pressure of the refrigerant. Refrigerating machine oil for lubricating the compressor 41 disposed in the refrigeration cycle 40 is mixed in the refrigerant. A part of the refrigerating machine oil circulates in the refrigeration cycle 40 together with the refrigerant.

As illustrated in FIG. 2, a compressor 41, a four-way valve 42, an exterior heat exchanger 43, the refrigerant passage 12a of the water refrigerant heat exchanger 12, an interior evaporator 44, a first expansion valve 46a, a second expansion valve 46b, an evaporating pressure regulating valve 48, and the like are disposed in the refrigeration cycle 40.

In the refrigeration cycle 40, the compressor 41 sucks, compresses, and discharges the refrigerant. The compressor 41 is disposed in the drive device compartment. The drive device compartment forms a space for accommodating a motor-generator and the like on the front side of the vehicle interior. The compressor 41 is an electric compressor in which a fixed capacity type compression mechanism having a fixed discharge capacity is rotationally driven by an electric motor. The rotation speed (i.e., refrigerant discharge capacity) of the compressor 41 is controlled by a control signal output from a control device 70 to be described later.

A discharge port of the compressor 41 is connected to one refrigerant inflow/outflow port of the four-way valve 42 via a discharge-side refrigerant passage 57. The discharge-side refrigerant passage 57 is a refrigerant passage that connects the discharge port of the compressor 41 and one refrigerant inflow/outflow port of the four-way valve 42. The four-way valve 42 is a refrigerant circuit switching part that switches the circuit configuration of the refrigeration cycle 40. The operation of the four-way valve 42 is controlled by a control voltage output from control device 70.

More specifically, the four-way valve 42 can switch connection forms among the discharge port side of the compressor 41, the one refrigerant inlet/outlet side of the exterior heat exchanger 43, the suction port side of the compressor 41, the one refrigerant inlet/outlet side of the water refrigerant heat exchanger 12, and the refrigerant outlet side of the interior evaporator 44.

As illustrated in FIG. 2, the four-way valve 42 is switched to an aspect of connecting the discharge port side of the compressor 41 and the one refrigerant inlet/outlet side of the exterior heat exchanger 43 and connecting the suction port side of the compressor 41, the one refrigerant inlet/outlet side of the water refrigerant heat exchanger 12, and the refrigerant outlet side of the interior evaporator 44.

Figure 5:
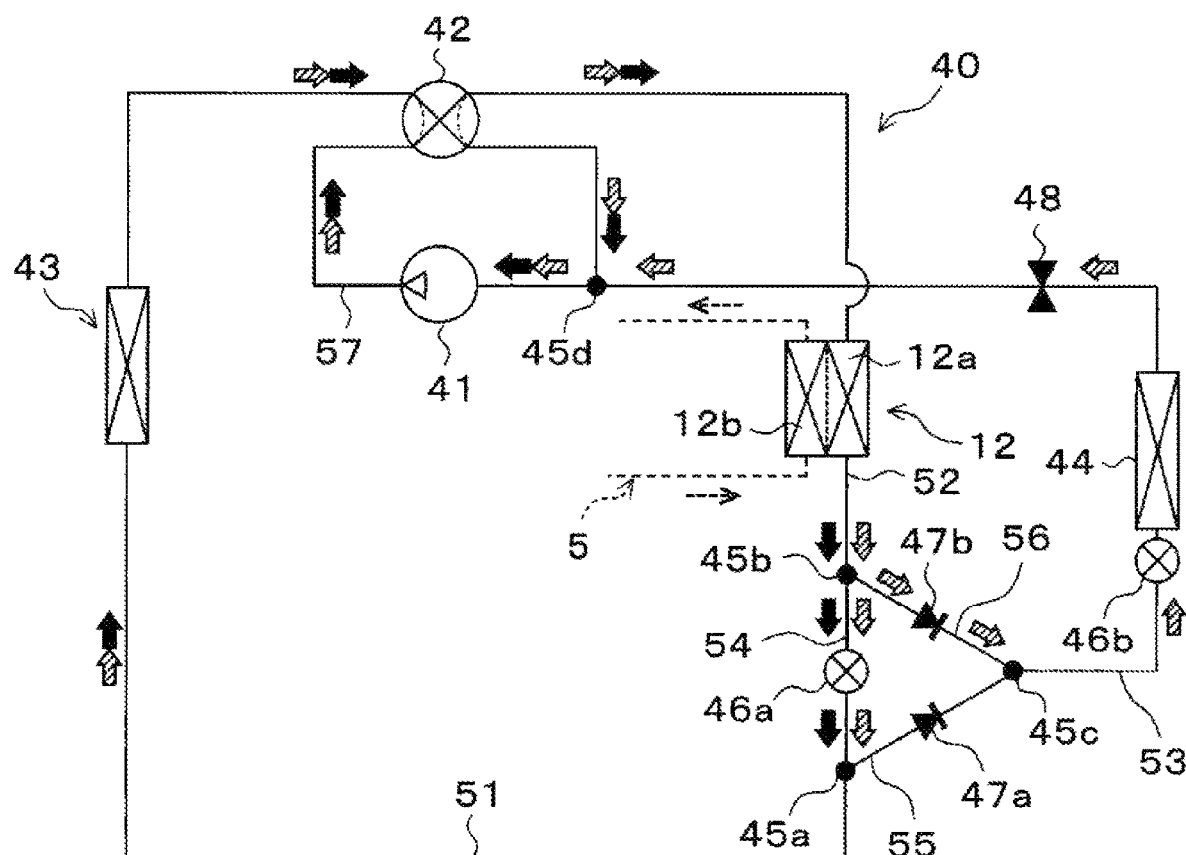
FIG. 5 is an explanatory diagram illustrating a flow of a refrigerant in a heating mode and the like of the refrigeration cycle.

As illustrated in FIG. 5, the four-way valve 42 is switched to a circuit configuration for connecting the discharge port side of the compressor 41 and the one refrigerant inlet/outlet side of the water refrigerant heat exchanger 12 and connects the suction port side of the compressor 41, the one refrigerant inflow port side of the exterior heat exchanger 43, and the refrigerant outlet side of the interior evaporator 44.

One refrigerant inlet/outlet side of the exterior heat exchanger 43 is connected to another refrigerant inflow/outflow port of the four-way valve 42. The exterior heat exchanger 43 is a heat exchanger that exchanges heat between the refrigerant and outside air blown from an outside air blower (not illustrated). The exterior heat exchanger 43 is disposed on the front side in the drive device compartment. Therefore, during the traveling of the vehicle, the traveling air flowing into the drive device compartment via an outside air inlet (so-called front grill) can be blown against the exterior heat exchanger 43.

One refrigerant inlet/outlet side of a first three-way joint 45a is connected to another refrigerant inflow/outflow port of the exterior heat exchanger 43. In the following description, for clarifying the description, another refrigerant inlet/outlet connected to the first three-way joint 45a side will be referred to as one refrigerant inlet/outlet of the exterior heat exchanger 43. One refrigerant inlet/outlet connected to the four-way valve 42 side will be referred to as the other refrigerant inlet/outlet of the exterior heat exchanger 43.

One refrigerant inlet/outlet side of a first three-way joint 45a having three refrigerant inflow/outflow ports communicating with each other is connected to one refrigerant inflow/outflow port of the exterior heat exchanger 43 via a first refrigerant passage 51.

The first three-way joint 45a is a first junction branch that joins or branches the flow of the refrigerant. As the first three-way joint 45a, one formed by joining a plurality of pipes, one formed by providing a plurality of refrigerant passages in a metal block or a resin block, or the like can be adopted.

When two of the three inflow/outflow ports are used as the inflow port, and the remaining one is used as the outflow port, the first three-way joint 45a serves as a junction that joins the flows of the refrigerant flowing in from the two inflow ports and causes the flows to flow out of one outflow port. When one of the three inflow/outflow ports is used as the inflow port, and the remaining two are used as the outflow port, the first three-way joint 45a serves as a branch that branches the flow of the refrigerant flowing in from the one inflow port and causes the flow of the refrigerant to flow out of the two outflow ports.

Further, the refrigeration cycle 40 of the first embodiment further includes a second three-way joint 45b and a third three-way joint 45c. The basic configurations of the second three-way joint 45b and the third three-way joint 45c are similar to those of the first three-way joint 45a. As illustrated in FIG. 2, one inflow/outflow port of each of the first three-way joint 45a, the second three-way joint 45b, and the third three-way joint 45c is are connected to each other.

One refrigerant inlet/outlet side of the water refrigerant heat exchanger 12 is connected to the remaining inflow/outflow port of the second three-way joint 45b via a second refrigerant passage 52. Hence, the second three-way joint 45b is a second junction branch. The remaining inflow/outflow port of the third three-way joint 45c is connected to the refrigerant inlet side of the interior evaporator 44 via a third refrigerant passage 53. Hence, the third three-way joint 45c is a third junction branch.

The first three-way joint 45a and the second three-way joint 45b are connected via a fourth refrigerant passage 54. The first three-way joint 45a and the third three-way joint 45c are connected via a fifth refrigerant passage 55. The second three-way joint 45b and the third three-way joint 45c are connected via a sixth refrigerant passage 56.

The first expansion valve 46a is disposed in the fourth refrigerant passage 54. The first expansion valve 46a decompresses the refrigerant flowing into the exterior heat exchanger 43 via the second three-way joint 45b and adjusts the flow rate (mass flow rate) of the refrigerant flowing into the exterior heat exchanger 43 at least in a heating mode for heating the vehicle interior. The first expansion valve 46a decompresses the refrigerant flowing into the water refrigerant heat exchanger 12 and adjusts the flow rate (mass flow rate) of the refrigerant flowing into the water refrigerant heat exchanger 12 at least in a medium-cool mode for cooling the heat medium circulating in the heat medium circuit 5.

The first expansion valve 46a is an electric variable throttle mechanism including a valve body configured to change a throttle opening and an electric actuator (specifically, a stepping motor) that changes the opening of the valve body. The operation of the first expansion valve 46a is controlled by a control signal (control pulse) output from the control device 70.

The first expansion valve 46a has a full-open function of fully opening the valve opening to function as a simple refrigerant passage with almost no refrigerant decompressing action, and a full-close function of fully closing the valve opening to close the refrigerant passage. The first expansion valve 46a can switch the circuit configuration of the refrigeration cycle 40 by the full-open function and the full-close function. Thus, the first expansion valve 46a also functions as a refrigerant circuit switching part.

The second expansion valve 46b is disposed in the third refrigerant passage 53. More specifically, the second expansion valve 46b is disposed at the end portion of the third refrigerant passage 53 on the interior evaporator 44 side via a dedicated connector.

The second expansion valve 46b decompresses the refrigerant flowing into the interior evaporator 44 and adjusts the flow rate (mass flow rate) of the refrigerant flowing into the interior evaporator 44 at least in the cooling mode for cooling the vehicle interior. The basic configuration of the second expansion valve 46b is similar to that of the first expansion valve 46a. Thus, the second expansion valve 46b also functions as a refrigerant circuit switching part.

A first refrigerant check valve 47a, which is a refrigerant circuit switching part, is disposed in the fifth refrigerant passage 55. The first refrigerant check valve 47a opens and closes a refrigerant passage connecting the first three-way joint 45a and the third three-way joint 45c. The first refrigerant check valve 47a allows the refrigerant to flow from the first three-way joint 45a side to the third three-way joint 45c side, and prohibits the refrigerant from flowing from the third three-way joint 45c side to the first three-way joint 45a side.

A second refrigerant check valve 47b, which is a refrigerant circuit switching part, is disposed in the sixth refrigerant passage 56. The second refrigerant check valve 47b opens and closes a refrigerant passage connecting the second three-way joint 45b and the third three-way joint 45c. The second refrigerant check valve 47b allows the refrigerant to flow from the side of the second three-way joint 45b to the side of the third three-way joint 45c and prohibits the refrigerant from flowing from the side of the third three-way joint 45c to the side of the second three-way joint 45b.

As described above, one refrigerant inlet/outlet side of the water refrigerant heat exchanger 12 is connected to the remaining inflow/outflow port of the second three-way joint 45b via the second refrigerant passage 52. The water refrigerant heat exchanger 12 is a heat exchanger that exchanges heat between the refrigerant and the heat medium circulating in the heat medium circuit 5. The water refrigerant heat exchanger 12 is disposed in the drive device compartment.

In the following description, for clarifying the description, a refrigerant inlet/outlet connected to the second three-way joint 45b side in the refrigerant passage 12a of the water refrigerant heat exchanger 12 will be referred to as one refrigerant inlet/outlet of the water refrigerant heat exchanger 12. One refrigerant inlet/outlet connected to the four-way valve 42 side will be referred to as the other refrigerant inlet/outlet of the water refrigerant heat exchanger 12.

As illustrated in FIG. 2, the interior evaporator 44 is a heat exchanger that exchanges heat between the refrigerant decompressed by the second expansion valve 46b and the ventilation air blown from the interior blower 62 toward the vehicle interior. The interior evaporator 44 can cool the ventilation air by evaporating the refrigerant decompressed by the second expansion valve 46b and causing the refrigerant to exert a heat absorbing action. The interior blower 62 and the interior evaporator 44 are disposed in the casing 61 of the interior air conditioning unit 60 to be described later.

The inlet side of the evaporating pressure regulating valve 48 is connected to a refrigerant outlet of the interior evaporator 44. The evaporating pressure regulating valve 48 is a pressure regulating valve that maintains the refrigerant evaporating pressure in the interior evaporator 44 at a predetermined reference pressure or higher.

The evaporating pressure regulating valve 48 is a mechanical variable throttle mechanism that increases the valve opening degree as the pressure of the refrigerant with an increase in pressure on the outlet side of the interior evaporator 44. The evaporating pressure regulating valve 48 thus maintains the refrigerant evaporating temperature in the interior evaporator 44 at a temperature equal to or higher than a frosting preventing temperature (e.g., 1° C.) at which frosting in the interior evaporator 44 can be prevented.

The suction port side of the compressor 41 is connected to the outlet of the evaporating pressure regulating valve 48 via a junction 45d. The basic configuration of the junction 45d is similar to that of the first three-way joint 45a or the like. Another refrigerant inflow/outflow port of the four-way valve 42 is connected to the other inflow port of the junction 45d.

Subsequently, the configuration of the interior air conditioning unit 60 in the heat management system 1 will be described with reference to FIG. 3. The interior air conditioning unit 60 is a unit in which a plurality of components are integrated in order to blow ventilation air, adjusted to an appropriate temperature for vehicle interior air-conditioning, to an appropriate location in the vehicle interior. The interior air conditioning unit 60 is disposed inside an instrument panel at the foremost portion of the vehicle interior.

Figure 3:
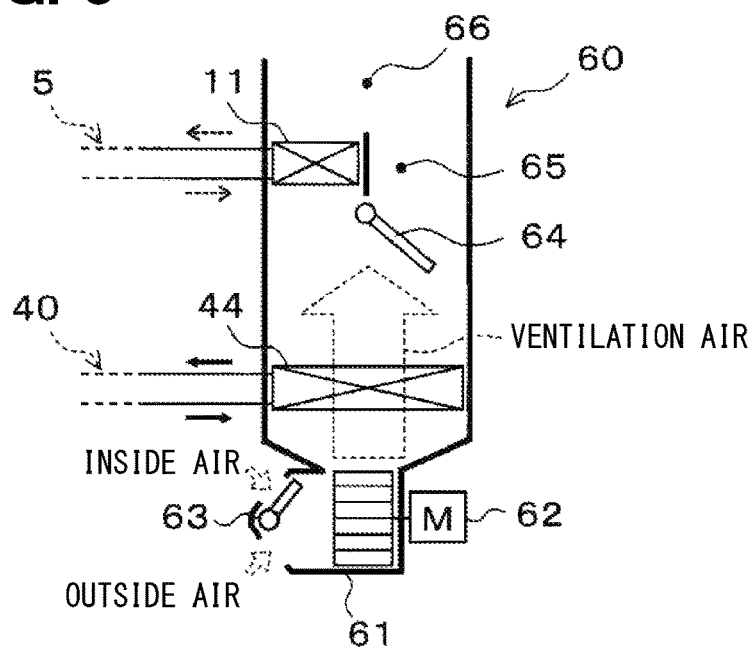
FIG. 3 is a schematic overall configuration diagram of an interior air conditioning unit in the heat management system.

As illustrated in FIG. 3, the interior air conditioning unit 60 accommodates the interior blower 62, the interior evaporator 44 of the refrigeration cycle 40, the heater core 11 of the heat medium circuit 5, and the like in the casing 61 that forms an air passage for ventilation air. The casing 61 is made of resin (e.g., polypropylene) having a certain degree of elasticity and excellent strength.

An inside/outside air switching device 63 is disposed on the most upstream side in the ventilation airflow of the casing 61. The inside/outside air switching device 63 switches between inside air (air inside the vehicle interior) and outside air (air outside the vehicle interior) and introduces the switched air into the casing 61. The operation of the inside/outside air switching device 63 is controlled by a control signal output from the control device 70.

The interior blower 62 is disposed on the ventilation airflow downstream side of the inside/outside air switching device 63. The interior blower 62 blows air sucked via the inside/outside air switching device 63 toward the vehicle interior. The rotation speed (i.e., air blowing capacity) of the interior blower 62 is controlled by a control voltage output from the control device 70.

On the ventilation airflow downstream side of the interior blower 62, the interior evaporator 44 and the heater core 11 are disposed in this order with respect to the flow of the ventilation air. That is, the interior evaporator 44 is disposed on the ventilation airflow upstream side of the heater core 11. In the casing 61, a cold air bypass passage 65 is formed to cause the ventilation air after passing through the interior evaporator 44 to detour around the heater core 11 and flow downstream.

An air mix door 64 is disposed on the ventilation airflow downstream side of the interior evaporator 44 and on the ventilation airflow upstream side of the heater core 11. The air mix door 64 is an air volume ratio adjustment part that adjusts an air volume ratio between the volume of air caused to pass through the heater core 11 and the volume of air caused to pass through the cold air bypass passage 65 in the ventilation air after passing through the interior evaporator 44. The operation of the electric actuator for driving the air mix door is controlled by a control signal output from the control device 70.

A mixing space 66 is provided on the ventilation airflow downstream side of the heater core 11 and the cold air bypass passage 65. The mixing space 66 is a space for mixing the ventilation air heated by the heater core 11 and the ventilation air passing through the cold air bypass passage 65 and not heated. Further, a plurality of opening holes for blowing the ventilation air, mixed and temperature-adjusted in the mixing space 66, into the vehicle interior are arranged in the ventilation airflow downstream portion of the casing 61.

Therefore, the temperature of the conditioned air mixed in the mixing space 66 is adjusted by the air mix door 64 adjusting the air volume ratio between the volume of air caused to pass through the heater core 11 and the volume of air caused to pass through the cold air bypass passage 65. Thereby, the temperature of the ventilation air blown from each outlet into the vehicle interior is adjusted.

Next, a control system of the heat management system 1 according to the first embodiment will be described with reference to FIG. 4. The control device 70 includes a known microcomputer including a central processing unit (CPU), a read-only memory (ROM), a read-only memory (RAM), and the like and peripheral circuits thereof. The control device 70 performs various operations and processing based on a control program stored in the ROM. Then, the control device 70 controls the operation of various equipment to be controlled which is connected to the output side, based on the calculation and processing results. The equipment to be controlled in the heat medium circuit 5 include the heater 13, the first pump 20a, the second pump 20b, the first heat-medium three-way valve 21a, and the second heat-medium three-way valve 21b.

The equipment to be controlled in the refrigeration cycle 40 includes the compressor 41, the four-way valve 42, the first expansion valve 46a, and the second expansion valve 46b. Further, the equipment to be controlled in the interior air conditioning unit 60 includes the interior blower 62, the inside/outside air switching device 63, and the electric actuators of the air mix door 64.

Figure 4:
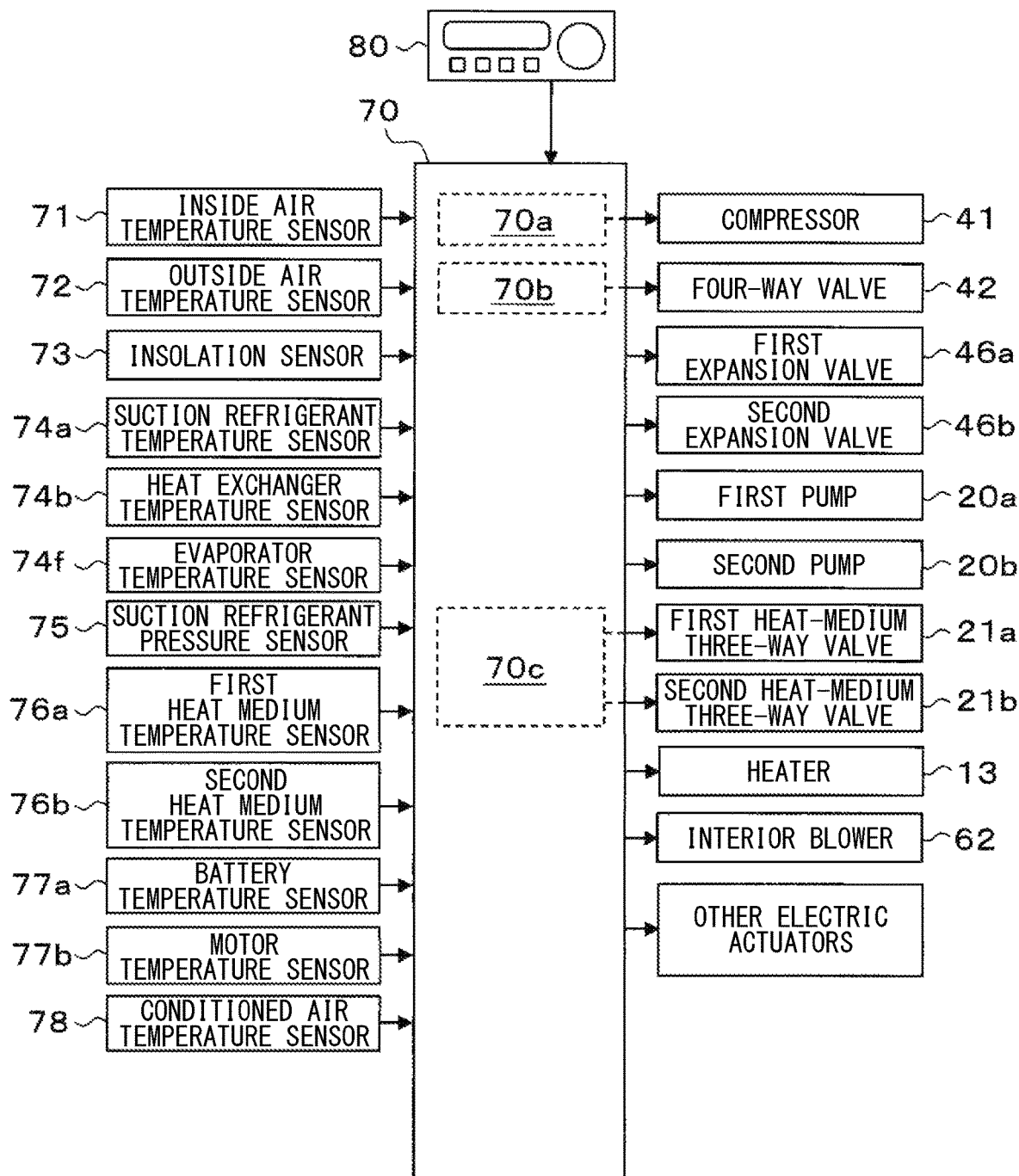
FIG. 4 is a block diagram illustrating a control system of the heat management system according to the first embodiment.

As illustrated in FIG. 4, various detection sensors for controlling the operation form of the heat management system 1 are connected to the input side of the control device 70. Thus, the detection signals of the various detection sensors are input to the control device 70.

The various detection sensors include an inside air temperature sensor 71, an outside air temperature sensor 72, and an insolation sensor 73. The inside air temperature sensor 71 is an inside air temperature detection part that detects a vehicle interior temperature (inside air temperature) Tr. The outside air temperature sensor 72 is an outside air temperature detection part that detects a vehicle exterior temperature (outside air temperature) Tam. The insolation sensor 73 is an insolation amount detection part that detects an insolation amount As with which the vehicle interior is irradiated.

As illustrated in FIG. 4, the various detection sensors include a suction refrigerant temperature sensor 74a, a heat exchanger temperature sensor 74b, an evaporator temperature sensor 74f, and a suction refrigerant pressure sensor 75. The suction refrigerant temperature sensor 74a is a suction refrigerant temperature detection part that detects a suction refrigerant temperature Ts of the suction refrigerant sucked into the compressor 41. The heat exchanger temperature sensor 74b is a heat exchanger temperature detection part that detects a temperature (heat exchanger temperature) TC of the refrigerant passing through water refrigerant heat exchanger 12. Specifically, the heat exchanger temperature sensor 74b detects a temperature of the outer surface of the water refrigerant heat exchanger 12.

The evaporator temperature sensor 74f is an evaporator temperature detection part that detects a refrigerant evaporating temperature (evaporator temperature) Tefin in the interior evaporator 44. Specifically, the evaporator temperature sensor 74f detects a temperature of a heat exchange fin of the interior evaporator 44. The suction refrigerant pressure sensor 75 is a suction refrigerant pressure detection part that detects a suction refrigerant pressure Ps of the suction refrigerant sucked into the compressor 41.

Further, the various detection sensors include a first heat medium temperature sensor 76a, a second heat medium temperature sensor 76b, a battery temperature sensor 77a, a heat generation equipment temperature sensor 77b, and a conditioned air temperature sensor 78.

The first heat medium temperature sensor 76a is a first heat medium temperature detection part that detects a temperature TW1 of a heat medium flowing into the heater core 11. The second heat medium temperature sensor 76b is a second heat medium temperature detection part that detects a temperature TW2 of a heat medium flowing into a heat medium passage 30a of the battery 30. The conditioned air temperature sensor 78 is a conditioned air temperature detection part that detects a ventilation air temperature TAV blown into the vehicle interior from the mixing space 66.

The battery temperature sensor 77a is a battery temperature detection part that detects a battery temperature TBA that is the temperature of the battery 30 mounted on the vehicle. The battery temperature sensor 77a includes a plurality of temperature detection parts and detects temperatures at a plurality of locations of the battery 30. Thus, the control device 70 can also detect a temperature difference of each part of the battery 30. Further, as the battery temperature TBA, an average value of detection values of a plurality of temperature sensors is adopted.

The heat generation equipment temperature sensor 77b is a heat generation equipment temperature detection part that detects a heat generation equipment temperature TMG which is the temperature of the heat generation equipment 16. The heat generation equipment temperature sensor 77b detects the temperature of the outer surface of the housing forming the outer shell of the heat generation equipment 16.

As illustrated in FIG. 4, an operation panel 80 is connected to the input side of the control device 70. The operation panel 80 is disposed near the instrument panel in the front portion of the vehicle interior and includes various operation switches. Thus, the operation signals from various operation switches are input to the control device 70.

Specifically, the various operation switches of the operation panel 80 include an automatic switch, an air conditioner switch, an air volume setting switch, a temperature setting switch, and the like. The automatic switch is operated when the automatic control operation of the heat management system 1 is set or released. The air conditioner switch is operated when the ventilation air is required to be cooled in the interior evaporator 44. The air volume setting switch is operated at the time of manually setting the air volume of the interior blower 62. The temperature setting switch is operated at the time of setting a target temperature Tset in the vehicle interior.

The control device 70 is integrally configured with a control part that controls various equipment to be controlled which is connected to the output side of the control device 70. Therefore, a configuration (hardware and software) for controlling the operation of each equipment to be controlled constitutes the control part that controls the operation of each equipment to be controlled.

For example, in the control device 70, a configuration for controlling the refrigerant discharge capacity of the compressor 41 (specifically, the rotation speed of the compressor 41) constitutes a discharge performance control part 70a. In the control device 70, a configuration for controlling the operation of the four-way valve 42, which is a refrigerant circuit switching part, constitutes a refrigerant circuit control part 70b.

In the control device 70, a configuration for controlling the operations of the first pump 20a, the second pump 20b, the first heat-medium three-way valve 21a, and the second heat-medium three-way valve 21b, which are circuit switching parts of the heat medium circuit 5, constitutes a heat-medium-circuit switching control part 70c. The heat-medium-circuit switching control part 70c functions as a circuit switching part in the heat medium circuit 5.

Subsequently, the operation of the refrigeration cycle 40 in the heat management system 1 configured as described above will be described with reference to FIGS. 2 and 5. In the refrigeration cycle 40 of the heat management system 1, a plurality of types of operation modes can be selectively switched in accordance with the state of the vehicle interior air-conditioning and the operation state of the heat generation equipment 16.

Specifically, the refrigeration cycle 40 can be switched to five operation modes of a heating mode, a cooling mode, a dehumidifying and heating mode, a medium-cool mode, and a medium-cool and cooling mode. The cooling mode is an operation mode for cooling the vehicle interior by blowing cooled ventilation air into the vehicle interior. The heating mode is an operation mode for heating the vehicle interior by blowing heated ventilation air into the vehicle interior.

The dehumidifying and heating mode is an operation mode for dehumidifying and heating the vehicle interior by reheating the cooled and dehumidified ventilation air and blowing the heated air into the vehicle interior. The medium-cool mode is an operation mode for cooling the heat medium circulating in the heat medium circuit 5. The medium-cool and cooling mode is an operation mode for cooling the vehicle interior while cooling the heat medium of the heat medium circuit 5.

The switching of each operation mode of the heat management system 1 is performed by executing a control program. The control program is executed when the automatic switch of the operation panel 80 is turned on (ON) and the automatic control operation is set.

In the main routine of the control program, the detection signals of the group of sensors for air-conditioning control and the operation signals from the various air-conditioning operation switches, described above, are read. Then, based on the read values of the detection signal and the operation signal, a target blowing temperature TAO, which is a target temperature of the blown air blown into the vehicle interior, is calculated based on the following formula F1.

Specifically, the target blowing temperature TAO is calculated by the following formula F1.

$$TAO = Kset \times Tset - Kr \times Tr - Kam \times Tam - Ks \times As + C \quad (F1)$$

Tset is a target temperature in the vehicle interior set by the temperature setting switch, Tr is an inside air temperature detected by the inside air temperature sensor 71, Tam is an outside air temperature detected by the outside air temperature sensor 72, and As is the insolation amount detected by the insolation sensor 73. Kset, Kr, Kam, and Ks are control gains, and C is a constant for correction.

In the control program, when the target blowing temperature TAO is lower than a predetermined cooling reference temperature a with the air conditioner switch of the operation panel 80 turned on, the operation mode is switched to the cooling mode.

In the control program, when the target blowing temperature TAO is equal to or higher than the cooling reference temperature a with the air conditioner switch of the operation panel 80 turned on, the operation mode is switched to the dehumidifying and heating mode. When the target blowing temperature TAO is equal to or higher than the cooling reference temperature a with the air conditioner switch not turned on, the operation mode is switched to the heating mode.

In the control program, when the temperature of the heat medium circulating in the heat medium circuit 5 satisfies a predetermined temperature condition, the operation mode is switched to the medium-cool mode. For example, when the heat generation equipment temperature TMG becomes equal to or higher than a reference heat generation equipment temperature KTMG, the mode is switched to the medium-cool mode.

(a) Cooling Mode

In the cooling mode, the control device 70 operates the four-way valve 42 so as to connect the discharge port side of the compressor 41 and one refrigerant inlet/outlet side of the exterior heat exchanger 43. With the operation of the four-way valve 42, the suction port side of the compressor 41, one refrigerant inlet/outlet side of the water refrigerant heat exchanger 12, and the refrigerant outlet side of the interior evaporator 44 are connected to each other in the four-way valve 42. Further, the control device 70 brings the first expansion valve 46a into a full-close state and brings the second expansion valve 46b into a throttling state that exerts a refrigerant decompression effect.

Therefore, in the cooling mode of the refrigeration cycle 40, a vapor-compression refrigeration cycle, in which the refrigerant circulates in the order indicated by outlined arrows, in FIG. 2 is configured. That is, in the refrigeration cycle 40 in the cooling mode, the refrigerant circulates through the discharge port of the compressor 41, the four-way valve 42, the exterior heat exchanger 43, the first refrigerant check valve 47a, the second expansion valve 46b, the interior evaporator 44, the evaporating pressure regulating valve 48, and the suction port of the compressor 41 in this order.

With this circuit configuration, the control device 70 appropriately controls the operation of other equipment to be controlled. For example, the rotation speed (i.e., refrigerant discharge capacity) of the compressor 41 is controlled such that an evaporator temperature Tefin detected by the evaporator temperature sensor 74f approaches a target evaporator temperature TEO for the cooling mode.

The target evaporator temperature TEO is determined based on the target blowing temperature TAO with reference to a control map stored in advance in the control device 70. In this control map, the target evaporator temperature TEO is determined to decrease as the target blowing temperature TAO decreases.

The throttle opening of the second expansion valve 46b is controlled such that a superheating degree SH of the suction refrigerant sucked into the compressor 41 approaches a predetermined reference superheating degree KSH. The superheating degree SH is calculated based on the suction refrigerant temperature Ts detected by the suction refrigerant temperature sensor 74*a* and the suction refrigerant pressure Ps detected by the suction refrigerant pressure sensor 75.

Therefore, in the refrigeration cycle 40 in the cooling mode, the high-pressure refrigerant discharged from the compressor 41 flows into the other refrigerant inlet/outlet of the exterior heat exchanger 43 via the four-way valve 42. The refrigerant flowing into the exterior heat exchanger 43 exchanges heat with the outside air blown from the outside air blower and condenses. The condensed refrigerant flows out of one refrigerant inlet/outlet of the exterior heat exchanger 43.

The refrigerant flowing out of one refrigerant inlet/outlet of the exterior heat exchanger 43 flows into the second expansion valve 46*b* via the first three-way joint 45*a*, the first refrigerant check valve 47*a*, and the third three-way joint 45*c* and is decompressed. The throttle opening of the second expansion valve 46*b* is adjusted such that the superheating degree SH of the suction refrigerant approaches the reference degree of the reference superheating degree KSH.

The low-pressure refrigerant decompressed by the second expansion valve 46*b* flows into the interior evaporator 44, absorbs heat from the ventilation air blown from the interior blower 62, and evaporates. Hence, the ventilation air is cooled. The refrigerant flowing out of the interior evaporator 44 is sucked into the compressor 41 via the evaporating pressure regulating valve 48 and the junction 45*d* and is compressed again. Thereby, in the refrigeration cycle 40 in the cooling mode, since the ventilation air can be cooled and supplied into the vehicle interior, the vehicle interior can be cooled.

(b) Heating Mode

In the heating mode, the control device 70 operates the four-way valve 42 so as to connect a discharge port side of the compressor 41 and one refrigerant inlet/outlet side of the water refrigerant heat exchanger 12. With the operation of the four-way valve 42, in the four-way valve 42, the suction port side of the compressor 41, one refrigerant inflow port side of the exterior heat exchanger 43, and a refrigerant outlet side of the interior evaporator 44 are connected. Further, the control device 70 brings the first expansion valve 46*a* into the throttling state and brings the second expansion valve 46*b* into the full-close state.

Therefore, in the refrigeration cycle 40 in the heating mode, a vapor-compression refrigeration cycle, in which the refrigerant circulates in the order indicated by black arrows in FIG. 5, is configured. That is, in the refrigeration cycle 40 in the heating mode, the refrigerant circulates through the discharge port of the compressor 41, the four-way valve 42, the water refrigerant heat exchanger 12, the first expansion valve 46*a*, the exterior heat exchanger 43, the four-way valve 42, and the suction port of the compressor 41 in this order.

With this circuit configuration, the control device 70 appropriately controls the operation of other equipment to be controlled. For example, the rotation speed of the compressor 41 is controlled such that a heat exchanger temperature TC detected by the heat exchanger temperature sensor 74*b* approaches a target heat exchanger temperature TCO1 for the heating mode.

The target heat exchanger temperature TCO1 is determined based on the target blowing temperature TAO with reference to a control map stored in advance in the control device 70. In this control map, the target heat exchanger temperature TCO1 is determined to increase as the target blowing temperature TAO increases. The throttle opening of the first expansion valve 46*a* is controlled such that the superheating degree SH of the suction refrigerant sucked into the compressor 41 approaches the reference superheating degree KSH.

Thereby, in the refrigeration cycle 40 in the heating mode, the high-pressure refrigerant discharged from the compressor 41 flows into the other refrigerant inlet/outlet of the refrigerant passage 12*a* of the water refrigerant heat exchanger 12 via the four-way valve 42. The refrigerant flowing into the water refrigerant heat exchanger 12 exchanges heat with the heat medium circulating through the heat medium passage 12*b* and condenses when circulating through refrigerant passage 12*a*. Thereby, the heat medium circulating through the heat medium passage 12*b* is heated.

The refrigerant condensed in the refrigerant passage 12*a* flows out of one refrigerant inlet/outlet of the water refrigerant heat exchanger 12, flows into the first expansion valve 46*a* via the second three-way joint 45*b*, and is decompressed. At this time, the throttle opening of the first expansion valve 46*a* is adjusted such that the superheating degree SH of the suction refrigerant approaches the reference superheating degree KSH.

The low-pressure refrigerant decompressed at the first expansion valve 46*a* flows into one refrigerant inlet/outlet of the exterior heat exchanger 43 via the first three-way joint 45*a*, absorbs heat from outside air, and evaporates. The refrigerant flowing out of the other refrigerant inlet/outlet of the exterior heat exchanger 43 is sucked into the compressor 41 via the four-way valve 42 and the junction 45*d* and compressed again.

Thus, in the refrigeration cycle 40 in the heating mode, the ventilation air can be heated via the heat medium heated by the water refrigerant heat exchanger 12, and so that the vehicle interior can be heated.

(c) Dehumidifying and Heating Mode

In the dehumidifying and heating mode, the control device 70 operates the four-way valve 42 as in the heating mode. Further, the control device 70 brings the first expansion valve 46*a* into the throttling state and brings the second expansion valve 46*b* into the throttling state.

Therefore, in the refrigeration cycle 40 in the dehumidifying and heating mode, a vapor-compression refrigeration cycle, in which the refrigerant circulates in the order indicated by hatched arrows in FIG. 5, is configured. That is, in the refrigeration cycle 40 in the dehumidifying and heating mode, the refrigerant circulates through the discharge port of the compressor 41, the four-way valve 42, the water refrigerant heat exchanger 12, the second refrigerant check valve 47*b*, the second expansion valve 46*b*, the interior evaporator 44, the evaporating pressure regulating valve 48, and the suction port of the compressor 41 in this order. At the same time, the refrigerant circulates through the discharge port of the compressor 41, the four-way valve 42, the water refrigerant heat exchanger 12, the first expansion valve 46*a*, the exterior heat exchanger 43, the four-way valve 42, and the suction port of the compressor 41 in this order.

That is, in the refrigeration cycle 40 in the dehumidifying and heating mode, a refrigeration cycle, in which the exterior heat exchanger 43 and the interior evaporator 44 are connected in parallel with respect to the flow of the refrigerant flowing out of the water refrigerant heat exchanger 12.

With this circuit configuration, the control device 70 appropriately controls the operation of other equipment to be controlled. For example, as in the heating mode, the rotation speed of the compressor 41 is controlled such that the heat exchanger temperature TC approaches the target heat exchanger temperature TCO1.

The throttle opening of the first expansion valve 46a is controlled so as to be a predetermined throttle opening for the dehumidifying and heating mode. As in the heating mode, the second expansion valve 46b is controlled such that the superheating degree SH of the suction refrigerant sucked into the compressor 41 approaches the reference superheating degree KSH.

Thereby, in the refrigeration cycle 40 in the dehumidifying and heating mode, the high-pressure refrigerant discharged from the compressor 41 flows into the refrigerant passage 12a of the water refrigerant heat exchanger 12 as in the heating mode. The refrigerant flowing into the water refrigerant heat exchanger 12 exchanges heat with the heat medium circulating through the heat medium passage 12b and condenses when circulating through refrigerant passage 12a. Thereby, the heat medium circulating through the heat medium passage 12b is heated.

The refrigerant flowing out of the water refrigerant heat exchanger 12 branches into two flows at the second three-way joint 45b. One refrigerant branched at the second three-way joint 45b flows into the second expansion valve 46b via the second refrigerant check valve 47b and the third three-way joint 45c and is decompressed.

The low-pressure refrigerant decompressed by the second expansion valve 46b flows into the interior evaporator 44 as in the cooling mode. The low-pressure refrigerant flowing into the interior evaporator 44 absorbs heat from the ventilation air supplied from the interior blower 62 and evaporates. Thereby, the ventilation air is cooled and dehumidified. The refrigerant flowing out of the interior evaporator 44 flows into the junction 45d via the evaporating pressure regulating valve 48.

The other refrigerant branched at the second three-way joint 45b flows into the first expansion valve 46a and is decompressed as in the heating mode. As in the heating mode, the low-pressure refrigerant flowing out of the first expansion valve 46a flows into the exterior heat exchanger 43, absorbs heat from outside air, and evaporates.

The refrigerant flowing out of the exterior heat exchanger 43 flows into the junction 45d via the four-way valve 42. At the junction 45d, the refrigerant flowing out of the evaporating pressure regulating valve 48 is joined with the refrigerant flowing out of the other refrigerant inlet/outlet of the exterior heat exchanger 43. The refrigerant joined at the junction 45d is sucked into the compressor 41 and compressed again.

Thereby, in the dehumidifying and heating mode, the ventilation air can be cooled and dehumidified in the interior evaporator 44 as in the cooling mode. As in the heating mode, the heat medium can be heated by the water refrigerant heat exchanger 12, so that the ventilation air dehumidified by heater core 11 can be heated. In other words, the refrigeration cycle 40 in the dehumidifying and heating mode makes it possible to achieve the dehumidification and the heating of the vehicle interior.

(d) Medium-Cool Mode

In the medium-cool mode, the control device 70 operates the four-way valve 42 as in the cooling mode. Further, the control device 70 brings the first expansion valve 46a into the throttling state and brings the second expansion valve 46b into the full-close state.

Therefore, in the refrigeration cycle 40 in the medium-cool mode, a vapor-compression refrigeration cycle, in which the refrigerant circulates in the order indicated by hatched arrows in FIG. 2, is configured. That is, in the refrigeration cycle 40 in the medium-cool mode, the refrigerant circulates through the discharge port of the compressor 41, the four-way valve 42, the exterior heat exchanger 43, the first expansion valve 46a, the water refrigerant heat exchanger 12, the four-way valve 42, and the suction port of the compressor 41 in this order.

With this circuit configuration, the control device 70 appropriately controls the operation of other equipment to be controlled. For example, the rotation speed of the compressor 41 is controlled such that the heat exchanger temperature TC approaches a predetermined target heat exchanger temperature TCO2 for the medium-cool mode. The throttle opening of the first expansion valve 46a is controlled such that the superheating degree SH of the suction refrigerant sucked into the compressor 41 approaches the predetermined reference superheating degree KSH.

Therefore, in the refrigeration cycle 40 in the medium-cool mode, the high-pressure refrigerant discharged from the compressor 41 flows into the other refrigerant inlet/outlet of the exterior heat exchanger 43 as in the cooling mode. The refrigerant flowing into the exterior heat exchanger 43 exchanges heat with the outside air, condenses, and flows out. The refrigerant flowing out of the exterior heat exchanger 43 flows into the first expansion valve 46a via the first three-way joint 45a and is decompressed. The opening degree of the first expansion valve 46a is adjusted such that the superheating degree SH of the suction refrigerant approaches the reference superheating degree KSH.

The low-pressure refrigerant decompressed at the first expansion valve 46a flows into one refrigerant inlet/outlet of the water refrigerant heat exchanger 12 via the second three-way joint 45b. The low-pressure refrigerant flowing into the water refrigerant heat exchanger 12 exchanges heat with the heat medium circulating through the heat medium passage 12b and evaporates when circulating through refrigerant passage 12a. As a result, the heat medium circulating through the heat medium passage 12b is cooled. The refrigerant flowing out of the other refrigerant inlet/outlet of the water refrigerant heat exchanger 12 is sucked into the compressor 41 via the four-way valve 42 and the junction 45d and compressed again.

Thus, the refrigeration cycle 40 in the medium-cool mode makes it possible to cool the heat medium circulating in the heat medium circuit 5 by the latent heat of vaporization of the refrigerant and adjust the temperature of the components of the heat medium circuit 5 by using the low-temperature heat medium.

(e) Medium-Cool and Cooling Mode

In the medium-cool and cooling mode, the control device 70 operates the four-way valve 42 as in the cooling mode. Further, the control device 70 brings the first expansion valve 46a and the second expansion valve 46b into the throttling state.

Therefore, in the refrigeration cycle 40 in the medium-cool and cooling mode, a vapor-compression refrigeration cycle, in which the refrigerant circulates in the order indicated by both outlined arrows and hatched arrows in FIG. 2, is configured. That is, in the refrigeration cycle 40 in the medium-cool and cooling mode, the refrigerant circulates through the discharge port of the compressor 41, the four-way valve 42, the exterior heat exchanger 43, the first refrigerant check valve 47a, the second expansion valve 46b, the interior evaporator 44, the evaporating pressure regulating valve 48, and the suction port of the compressor 41 in this order. At the same time, the refrigerant circulates through the discharge port of the compressor 41, the four-way valve 42, the exterior heat exchanger 43, the first expansion valve 46a, the water refrigerant heat exchanger 12, the four-way valve 42, and the suction port of the compressor 41 in this order.

That is, in the refrigeration cycle 40 in the medium-cool and cooling mode, a refrigeration cycle, in which the interior evaporator 44 and the water refrigerant heat exchanger 12 are connected in parallel with respect to the flow of the refrigerant flowing out of the exterior heat exchanger 43.

With this circuit configuration, the control device 70 appropriately controls the operation of other equipment to be controlled. For example, as in the cooling mode, the rotation speed of the compressor 41 is controlled such that the evaporator temperature Tefin approaches the target evaporator temperature TEO.

The throttle opening degree of the first expansion valve 46a is controlled so as to be a predetermined throttle opening degree for the medium-cool and cooling mode. As in the cooling mode, the second expansion valve 46b is controlled such that the superheating degree SH of the suction refrigerant sucked into the compressor 41 approaches the reference superheating degree KSH.

Therefore, in the refrigeration cycle 40 in the medium-cool and cooling mode, the flow of the refrigerant in the refrigeration cycle 40 in the cooling mode and the flow of the refrigerant in the refrigeration cycle 40 in the medium-cool mode are generated in parallel. Thus, in the medium-cool and cooling mode, the water refrigerant heat exchanger 12 can cool the heat medium passing through the heat medium passage 12b, and the interior evaporator 44 can cool the ventilation air. That is, the refrigeration cycle 40 in the medium-cool and cooling mode makes it possible to cool the heat generation equipment 16 via the heat medium while cooling the vehicle interior.

Next, the operation mode of the heat management system 1 configured as described above will be described with reference to FIGS. 6 to 12. The heat management system 1 according to the first embodiment can switch a plurality of types of operation modes in accordance with the state of the vehicle interior air-conditioning and the operation state of the heat generation equipment 16.

Specifically, when the operation mode of the heat management system 1 is switched, the operations of the heater 13, the first pump 20a, the second pump 20b, the first heat-medium three-way valve 21a, and the second heat-medium three-way valve 21b are controlled.

In the following description, the first to seventh operation modes will be described as operation modes of the heat management system 1 according to the first embodiment. Since the operation mode of the refrigeration cycle 40 has already been described with reference to FIGS. 2 and 5, the circuit configuration and the like of the heat medium circuit 5 will be mainly described in detail.

(1) First Operation Mode

The first operation mode is an operation mode executed by the heat management system 1 at the time of cooling the heat generation equipment 16 (e.g., PCU), for example, in summer (the outside air temperature is 25° C. or higher). In the first operation mode, the control device 70 brings the first pump 20a into a stopped state and operates the second pump 20b. The control device 70 stops the operations of the heater 13 and the refrigeration cycle 40 (i.e., compressor 41).

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Figure 6:
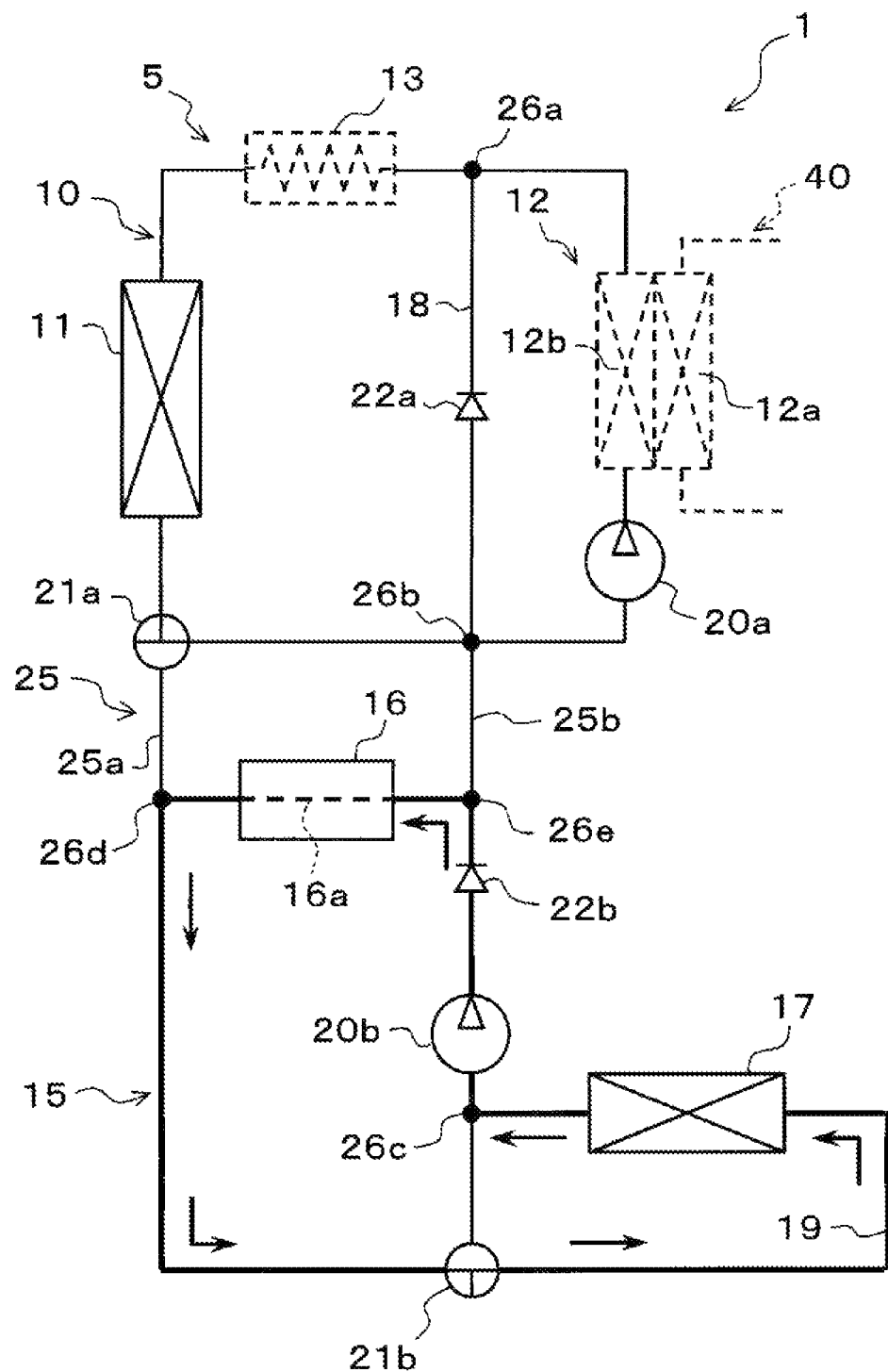
FIG. 6 is an explanatory diagram of a first operation mode of the heat management system according to the first embodiment.

Thereby, in the heat medium circuit 5 in the first operation mode, the heat medium circulates as indicated by thick arrows in FIG. 6. Specifically, in the heat medium circuit 5 in the first operation mode, the heat medium circulates through the second pump 20b, the second heat-medium check valve 22b, the heat generation equipment 16, the second heat-medium three-way valve 21b, the radiator 17, and the second pump 20b in this order.

With the circuit configuration of the heat medium circuit 5 in the first operation mode, the heat medium discharged from the second pump 20b flows into the heat medium passage 16a of the heat generation equipment 16 via the second heat-medium check valve 22b. The heat medium absorbs the heat of the heat generation equipment 16 when passing through the heat medium passage 16a and flows out.

The heat medium flowing out of the heat generation equipment 16 flows into the radiator 17 via the second heat-medium three-way valve 21b. The heat medium flowing into the radiator 17 exchanges heat with the outside air and dissipates the heat absorbed when passing through the heat medium passage 16a to the outside air. The heat medium flowing out of the radiator 17 is again sucked into the second pump 20b and pumped.

That is, according to the heat management system 1 in the first operation mode, the heat medium heated by the heat generation equipment 16 is circulated so as to go through the radiator 17, and the flows of the heat medium into and out of the water refrigerant heat exchanger 12 are restricted. Thus, in the first operation mode, the heat of the heat generation equipment 16 generated by the operation is dissipated to the outside air via the heat medium, and the temperature of the heat generation equipment 16 can be adjusted such that the temperature of the heat generation equipment 16 falls within a proper temperature range.

As illustrated in FIG. 6, in the first operation mode, the heat medium does not circulate via the water refrigerant heat exchanger 12, and the refrigeration cycle 40 is also stopped. Therefore, according to the heat management system 1 in the first operation mode, energy saving can be achieved with respect to the temperature adjustment of the heat generation equipment 16.

(2) Second Operation Mode

The second operation mode is executed by the heat management system 1 when a total amount of the amount of waste heat generated in the heat generation equipment 16 and the amount of heat dissipated in the water refrigerant heat exchanger 12 is equal to or smaller than a heating required amount of heat set by a user, for example, in spring, autumn (the outside air temperature is 10° C. to 25° C.), or the like In the second operation mode, the control device 70 operates the first pump 20a and brings the second pump 20b into the stopped state. The control device 70 stops the heater 13 and operates the refrigeration cycle 40 in the dehumidifying and heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the third connection 26c side with the inflow/outflow port on the radiator 17 side and to close the inflow/outflow port on the fourth connection 26d side.

Figure 7:
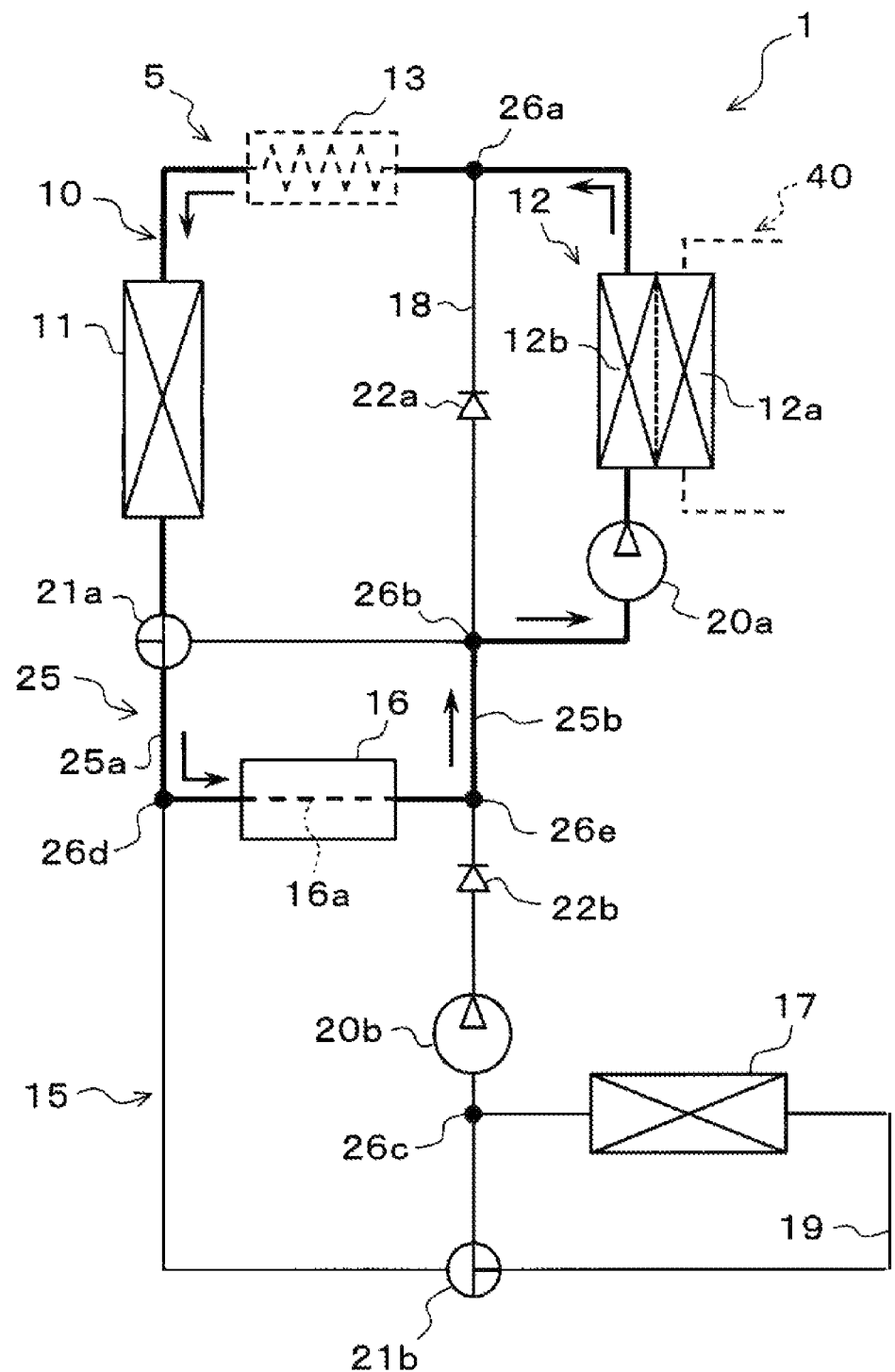
FIG. 7 is an explanatory diagram of a second operation mode of the heat management system according to the first embodiment.

Thereby, in the heat medium circuit 5 in the second operation mode, the heat medium circulates as indicated by thick arrows in FIG. 7. Specifically, in the heat medium circuit 5 in the second operation mode, the heat medium circulates through the first pump 20a, the water refrigerant heat exchanger 12, the heater 13, the heater core 11, the first heat-medium three-way valve 21a, the heat generation equipment 16, and the first pump 20a in this order.

With the circuit configuration of the heat medium circuit 5 in the second operation mode, the heat medium discharged from the first pump 20a is heated by heat exchange with the high-pressure refrigerant passing through the refrigerant passage 12a when passing through the heat medium passage 12b of the water refrigerant heat exchanger 12. The heat medium flowing out of the water refrigerant heat exchanger 12 flows into the heater core 11 via the heater 13 in the stopped state.

In the heater core 11, the heat medium exchanges heat with the ventilation air dehumidified by the interior evaporator 44 to heat the ventilation air. Thereby, in the second operation mode, the vehicle interior can be dehumidified and heated.

The heat medium flowing out of the heater core 11 flows into the heat medium passage 16a of the heat generation equipment 16 via the first heat-medium three-way valve 21a. The heat medium absorbs the heat of the heat generation equipment 16 when passing through the heat medium passage 16a and flows out. When flowing out of the heat medium passage 16a of the heat generation equipment 16, the heat medium is again sucked into the first pump 20a and pumped.

That is, according to the heat management system 1 in the second operation mode, the heat medium heated by the heat generation equipment 16 and the water refrigerant heat exchanger 12 is circulated so as to go through the heater core 11. Thereby, in the second operation mode, in addition to the heat of the refrigerant of the refrigeration cycle 40, the heat of the heat generation equipment 16 generated by the operation is used via the heat medium, whereby the ventilation air supplied to the vehicle interior can be heated. That is, the waste heat of the heat generation equipment 16 can be effectively used to improve the heating efficiency in the heat management system 1.

In the heat management system 1 in the second operation mode, the waste heat of the heat generation equipment 16 is used for heating the ventilation air without passing through another medium of the heat medium of the heat medium circuit 5. Specifically, when the waste heat of the heat generation equipment 16 is used for heating the ventilation air, the refrigerant of the refrigeration cycle 40 does not intervene in addition to the heat medium. Thus, the waste heat of the heat generation equipment 16 can be efficiently used as a heating source without being affected by the heat exchange efficiency between the heat medium and the refrigerant.

According to the heat management system 1 in the second operation mode, the temperature of the heat medium is increased by the waste heat of the heat generation equipment 16, so that the ventilation air can be heated to a desired temperature even when the amount of heat heated by the refrigeration cycle 40 is kept low.

That is, the heat management system 1 in the second operation mode can efficiently use the waste heat of the heat generation equipment 16 with respect to the heating of the ventilation air to reduce the operating amount of the compressor 41 in the refrigeration cycle 40 and achieve energy saving.

(3) Third Operation Mode

The third operation mode is executed by the heat management system 1 when a total amount of the amount of waste heat generated in the heat generation equipment 16 and the amount of heat dissipated in the water refrigerant heat exchanger 12 is larger than the heating required amount of heat set by the user, for example, in spring, autumn (the outside air temperature is 10° C. to 25° C.), or the like A state where the total amount of the waste heat generated in heat generation equipment 16 and the heat radiation amount in water refrigerant heat exchanger 12 is larger than the heating required amount of heat set by the user is an example of the high-temperature condition in the present disclosure.

In the third operation mode, the control device 70 operates the first pump 20a and the second pump 20b at the respective predetermined pumping capacities. The control device 70 stops the heater 13 and operates the refrigeration cycle 40 in the dehumidifying and heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Figure 8:
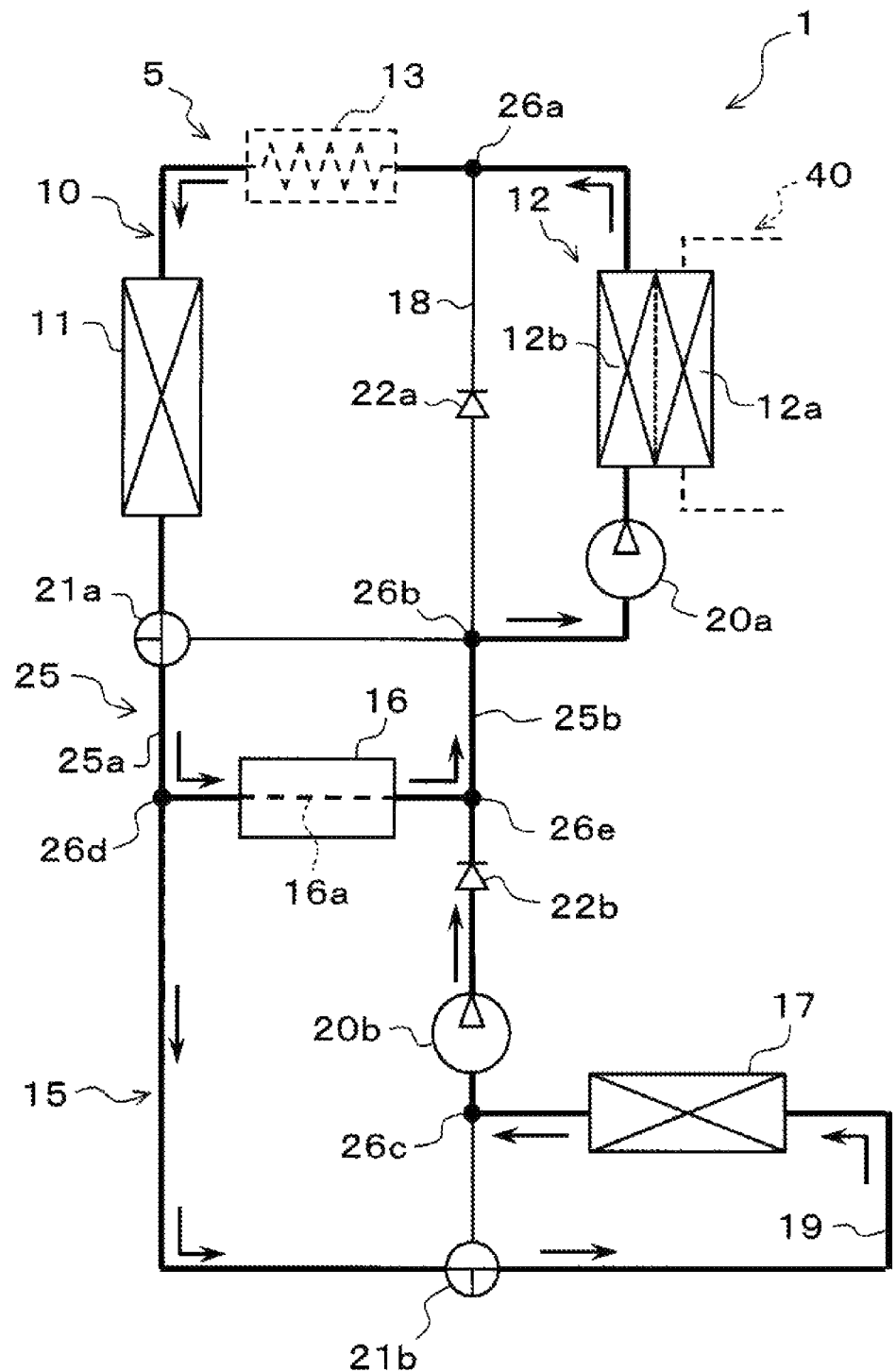
FIG. 8 is an explanatory diagram of a third operation mode of the heat management system according to the first embodiment.

Thereby, in the heat medium circuit 5 in the third operation mode, the heat medium circulates as indicated by thick arrows in FIG. 8. Specifically, in the heat medium circuit 5 in the third operation mode, the heat medium circulates through the first pump 20a, the water refrigerant heat exchanger 12, the heater 13, the heater core 11, the first heat-medium three-way valve 21a, the heat generation equipment 16, and the first pump 20a in this order.

At the same time, the heat medium circulates through the second pump 20b, the second heat-medium check valve 22b, the first pump 20a, the water refrigerant heat exchanger 12, the heater 13, the heater core 11, the first heat-medium three-way valve 21a, the second heat-medium three-way valve 21b, the radiator 17, and the second pump 20b in this order.

That is, in the third operation mode, a circulation path is formed in which the flow of the heat medium passing through the water refrigerant heat exchanger 12 and the heater core 11 and the flow of the heat medium passing through the heat generation equipment 16 and the radiator 17 are connected in parallel with respect to the flow of the heat medium discharged from the second pump 20b.

With the circuit configuration of the heat medium circuit 5 in the third operation mode, the heat medium discharged from the first pump 20a is heated by heat exchange with the high-pressure refrigerant passing through the refrigerant passage 12a when passing through the heat medium passage 12b of the water refrigerant heat exchanger 12. The heat medium flowing out of the water refrigerant heat exchanger 12 flows into the heater core 11 via the heater 13 in the stopped state.

In the heater core 11, the heat medium exchanges heat with the ventilation air dehumidified by the interior evaporator 44 to heat the ventilation air. Thereby, in the third operation mode, the vehicle interior can be dehumidified and heated.

The heat medium flowing out of the heater core 11 passes through the first heat-medium three-way valve 21a and branches into two flows at the fourth connection 26d. One of the heat mediums branched at the fourth connection 26d flows into the heat medium passage 16a of the heat generation equipment 16, absorbs the heat of the heat generation equipment 16, and flows out. When flowing out of the heat medium passage 16a of the heat generation equipment 16, the heat medium is again sucked into the first pump 20a and pumped.

Then, the other heat medium branched by the fourth connection 26d flows into the radiator 17 via the second heat-medium three-way valve 21b. The heat medium flowing into the radiator 17 exchanges heat with the outside air to dissipate the heat of the heat medium to the outside air. The heat medium flowing out of the radiator 17 is again sucked into the second pump 20b and pumped.

As described above, in the third operation mode, the amount of heat applied to the heat medium by the water refrigerant heat exchanger 12 and the heat generation equipment 16 is larger than the heating required amount of heat, so that the excessive amount of heat can be radiated to the outside air by the radiator 17.

That is, according to the heat management system 1 of the third operation mode, as in the second operation mode, in addition to the heat of the refrigerant of the refrigeration cycle 40, the heat of the heat generation equipment 16 generated by the operation can be used via the heat medium, and the heating efficiency in the heat management system 1 can be improved.

According to the heat management system 1 of the third operation mode, the heat medium is circulated so as to go through the radiator 17 in addition to the heat generation equipment 16, the water refrigerant heat exchanger 12, and the heater core 11. As a result, excessive heat from the water refrigerant heat exchanger 12, the heat generation equipment 16, and the like can be dissipated to the outside air, so that the temperature of the heat medium circulating through the heat medium circuit 5 can be appropriately adjusted from the viewpoint of the vehicle interior air-conditioning and the temperature adjustment of the heat generation equipment 16.

(4) Fourth Operation Mode

The fourth operation mode is executed by the heat management system 1 when the temperature of the heat medium circulating in the heat medium circuit 5 becomes equal to or higher than a predetermined first reference water temperature (e.g., 60° C.), for example, in spring, autumn (the outside air temperature is 10° C. to 25° C.), or the like.

In the fourth operation mode, the control device 70 operates the first pump 20a and the second pump 20b at the respective predetermined pumping capacities. The control device 70 stops the heater 13 and operates the refrigeration cycle 40 in the dehumidifying and heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Figure 9:
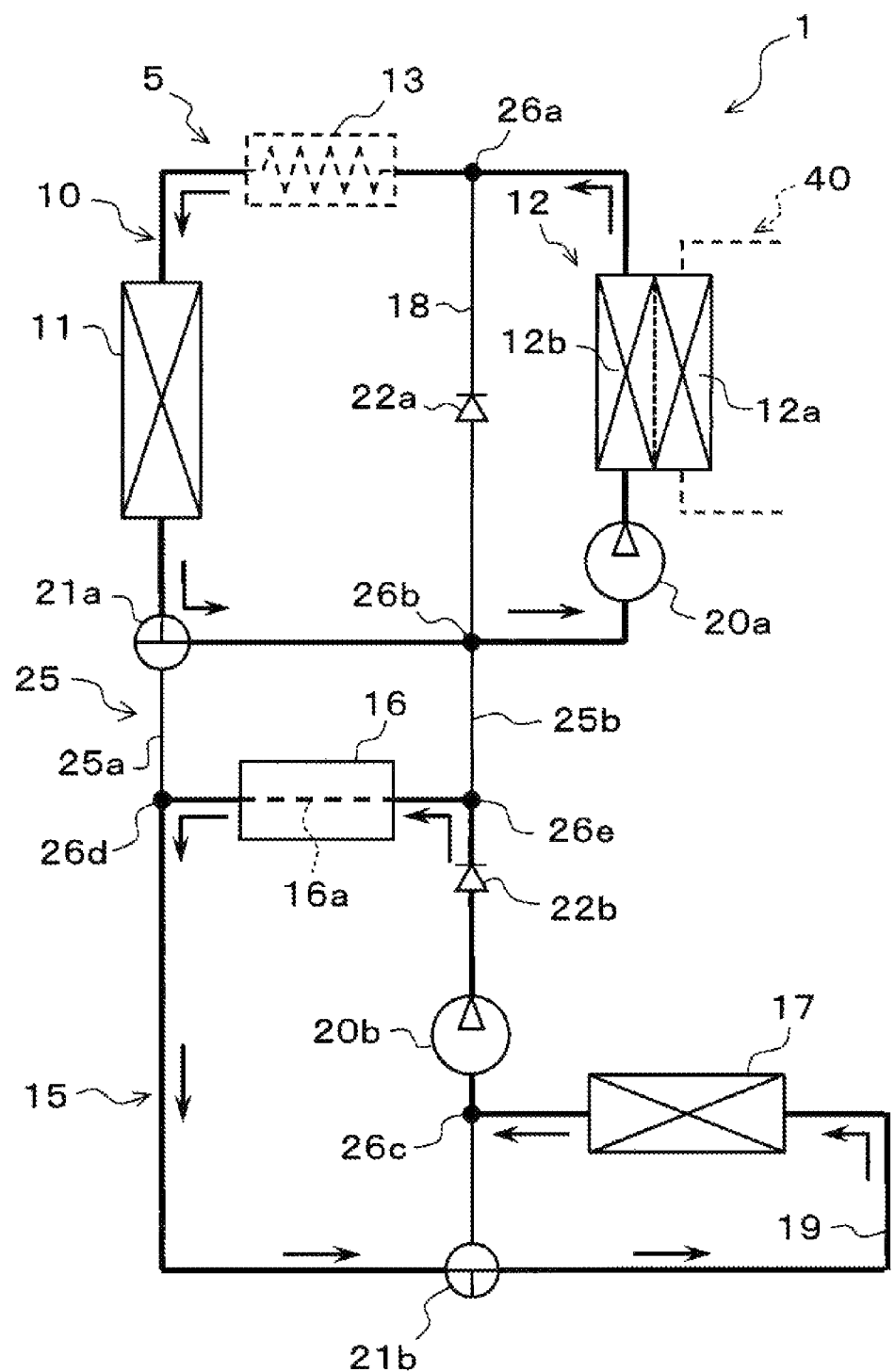
FIG. 9 is an explanatory diagram of a fourth operation mode of the heat management system according to the first embodiment.

Thereby, in the heat medium circuit 5 in the fourth operation mode, the heat medium circulates as indicated by thick arrows in FIG. 9. Specifically, in the heat medium circuit 5 in the fourth operation mode, the heat medium circulates through the first pump 20a, the water refrigerant heat exchanger 12, the heater 13, the heater core 11, the first heat-medium three-way valve 21a, and the first pump 20a in this order. At the same time, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the fourth operation mode, the circulation path of the heat medium via the water refrigerant heat exchanger 12 and the heater core 11 and the circulation path of the heat medium via the heat generation equipment 16 and the radiator 17 are formed independently.

With the circuit configuration of the heat medium circuit 5 in the fourth operation mode, the heat medium discharged from the first pump 20a is heated by heat exchange with the high-pressure refrigerant passing through the refrigerant passage 12a when passing through the heat medium passage 12b of the water refrigerant heat exchanger 12. The heat medium flowing out of the water refrigerant heat exchanger 12 flows into the heater core 11 via the heater 13 in the stopped state.

In the heater core 11, the heat medium exchanges heat with the ventilation air dehumidified by the interior evaporator 44 to heat the ventilation air. As a result, dehumidification heating in the vehicle interior can be performed. Then, the heat medium flowing out of the heater core 11 is again sucked into the first pump 20a via the first heat-medium three-way valve 21a and pumped.

On the other hand, the heat medium discharged from the second pump 20b flows into the heat medium passage 16a of the heat generation equipment 16 via the second heat-medium check valve 22b. The heat medium absorbs the heat of the heat generation equipment 16 when passing through the heat medium passage 16a and flows out. When flowing out of the heat generation equipment 16, the heat medium flows into the radiator 17 via the second heat-medium three-way valve 21b.

The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b.

As a result, according to the heat management system 1 in the fourth operation mode, the heat medium heated by the water refrigerant heat exchanger 12 is circulated so as to go through the heater core 11. Therefore, according to the fourth operation mode, the vehicle interior can be heated using only the refrigerant of the refrigeration cycle 40 as a heat source.

Here, in the fourth operation mode, since the temperature of the heat medium is equal to or higher than the first reference water temperature, it is conceivable that when the temperature of the heat medium further increases, the temperature exceeds a proper temperature range related to each component of the heat generation equipment 16 and becomes a factor of malfunction.

In this regard, in the fourth operation mode, the heat medium is circulated via the heat generation equipment 16 independently of the circulation path of the heat medium via the heater core 11. Thus, in the fourth operation mode, the heat medium passing through the heat generation equipment 16 can be reduced in temperature rise by being made independent of the circulation of the heat medium related to the heating in the vehicle interior.

According to the fourth operation mode, since the radiator 17 is included in the circulation path of the heat medium via the heat generation equipment 16, the heat of the heat generation equipment 16 generated by the operation can be dissipated to the outside air through the heat medium. Thereby, in the fourth operation mode, the heat generation equipment 16 can be cooled by heat dissipation from the outside air, and the malfunction of the heat generation equipment 16 caused by the influence of heat can be prevented.

In the fourth operation mode, as illustrated in FIG. 9, since the circulation of the heat medium via the water refrigerant heat exchanger 12 and the heater core 11 and the circulation of the heat medium via the heat generation equipment 16 and the radiator 17 are independent of each other, the vehicle interior air-conditioning and the temperature adjustment of the heat generation equipment 16 can be controlled independently. Therefore, in the fourth operation mode, it is possible to appropriately control the vehicle interior air-conditioning and the temperature adjustment of the heat generation equipment 16.

(5) Fifth Operation Mode

The fifth operation mode is executed by the heat management system 1 in a case where the vehicle interior is heated, for example, in winter (the outside air temperature is 10° C. or lower).

In the fifth operation mode, the control device 70 operates the first pump 20a with a predetermined pumping capacity and brings the second pump 20b into the stopped state. The control device 70 operates the heater 13 so as to have a set calorific value and operates the refrigeration cycle 40 in the heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the third connection 26c side with the inflow/outflow port on the radiator 17 side and to close the inflow/outflow port on the fourth connection 26d side.

Figure 10:
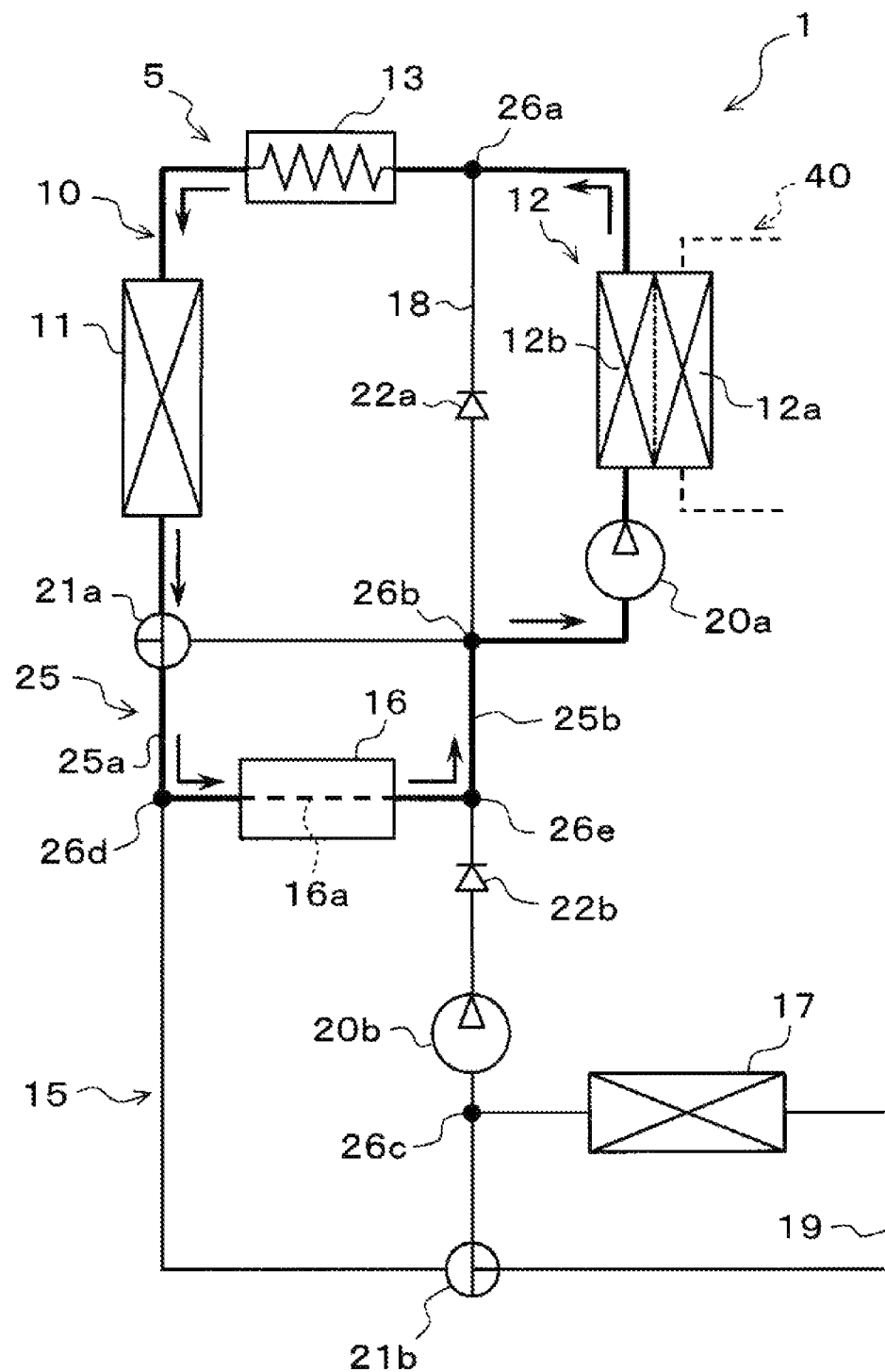
FIG. 10 is an explanatory diagram of a fifth operation mode of the heat management system according to the first embodiment.

Thereby, in the heat medium circuit 5 in the fifth operation mode, the heat medium circulates as indicated by thick arrows in FIG. 10. Specifically, in the heat medium circuit 5 in the fifth operation mode, the heat medium circulates through the first pump 20a, the water refrigerant heat exchanger 12, the heater 13, the heater core 11, the first heat-medium three-way valve 21a, the heat generation equipment 16, and the first pump 20a in this order.

With the circuit configuration of the heat medium circuit 5 in the fifth operation mode, the heat medium discharged from the first pump 20a is heated by heat exchange with the high-pressure refrigerant passing through the refrigerant passage 12a when passing through the heat medium passage 12b of the water refrigerant heat exchanger 12.

The heat medium flowing out of the water refrigerant heat exchanger 12 flows into the heating passage of the heater 13 and is heated by the heat generation part. The heat medium heated by the water refrigerant heat exchanger 12 and the heater 13 flows into the heater core 11 when flowing out of the heater 13. In the heater core 11, the heat medium exchanges heat with the ventilation air blown by the interior blower 62 to heat the ventilation air. Thereby, the vehicle interior can be heated.

Then, the heat medium flowing out of the heater core 11 flows into the heat medium passage 16a of the heat generation equipment 16 via the first heat-medium three-way valve 21a. The heat medium absorbs the heat of the heat generation equipment 16 when passing through the heat medium passage 16a and flows out. When the heat medium flows out of the heat generation equipment 16, the heat medium is sucked into the first pump 20a again and pumped.

That is, according to the heat management system 1 in the fifth operation mode, the heat generation equipment 16 and the heat medium heated by the water refrigerant heat exchanger 12 are circulated so as to go through the heater core 11. Thereby, in the fifth operation mode, the heat of the refrigerant of the refrigeration cycle 40, the heat of the heat generation equipment 16 generated by the operation, and the heat by the operation of the heater 13 can be used for heating the vehicle interior via the heat medium.

Thus, in the fifth operation mode, the heater 13 is used to cope with a higher heating capability than in the second operation mode. In the fifth operation mode as well, the waste heat of the heat generation equipment 16 is effectively used, so that the heating efficiency of the heat management system 1 can be improved as in the second operation mode.

In the heat management system 1 in the fifth operation mode, the waste heat of the heat generation equipment 16 is used for heating the ventilation air without passing through another medium of the heat medium of the heat medium circuit 5. Thus, the waste heat of the heat generation equipment 16 can be efficiently used as a heating source without being affected by the heat exchange efficiency between the heat medium and the refrigerant.

According to the heat management system 1 in the fifth operation mode, the temperature of the heat medium is increased by the waste heat of the heat generation equipment 16, so that the ventilation air can be heated to a desired temperature even when the amount of heat heated by the refrigeration cycle 40 is kept low. That is, by efficiently using the waste heat of the heat generation equipment 16 with respect to the heating of the ventilation air, the operating amount of the refrigeration cycle 40 can be reduced to achieve energy saving.

(6) Sixth Operation Mode

The sixth operation mode is executed by the heat management system 1 when the temperature of the heat medium circulating in the heat medium circuit 5 is required to be equal to or higher than a predetermined second reference water temperature (e.g., 70° C.), for example, in winter (the outside air temperature is 10° C. or lower). Specifically, a case of defrosting a window in the vehicle or the like is assumed, and the second reference water temperature is set higher than the first reference water temperature described above.

In the sixth operation mode, the control device 70 operates the first pump 20a and the second pump 20b at the respective predetermined pumping capacities. The control device 70 operates the heater 13 so as to have a set calorific value and operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Figure 11:
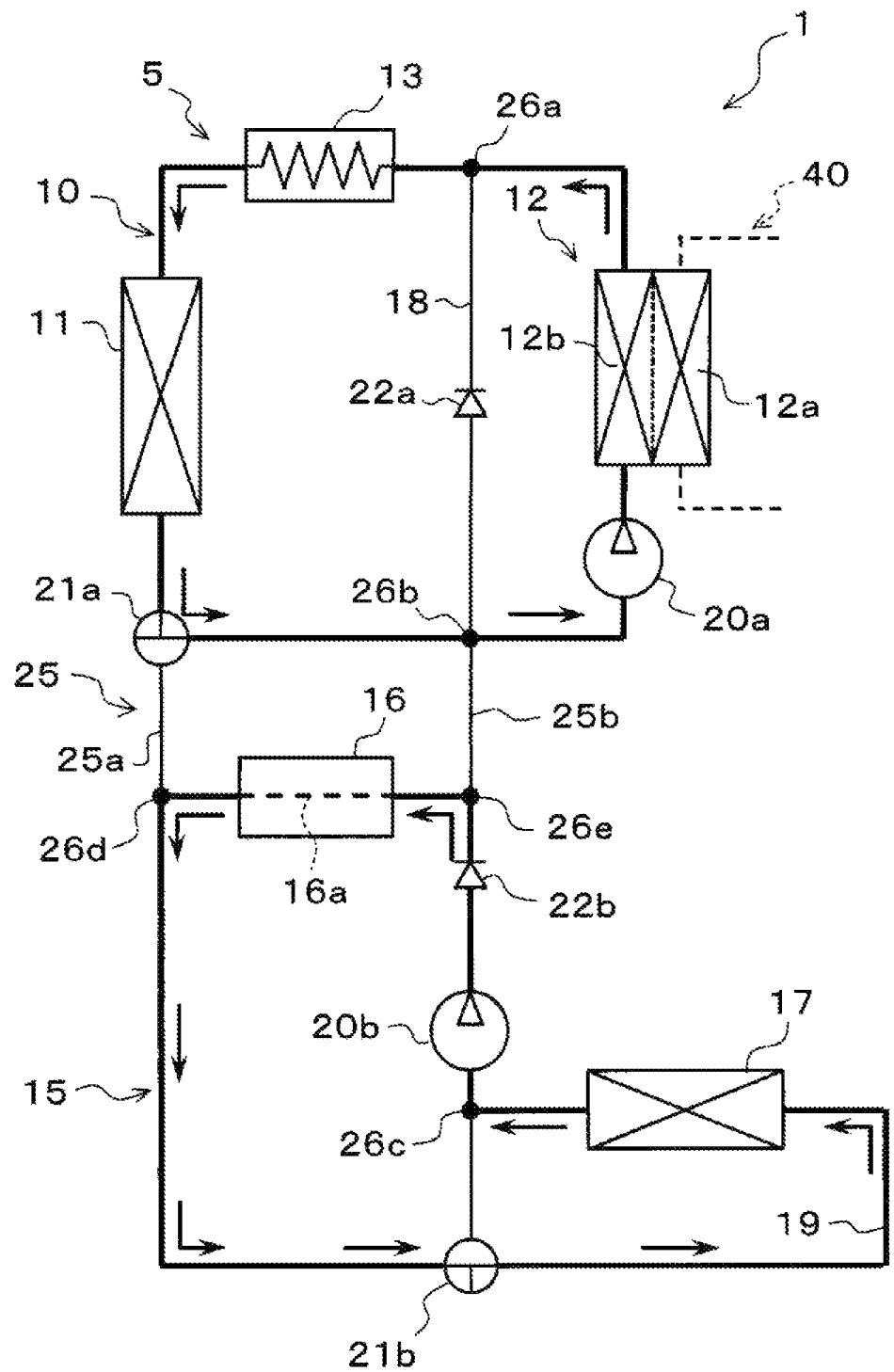
FIG. 11 is an explanatory diagram of a sixth operation mode of the heat management system according to the first embodiment.

Thereby, in the heat medium circuit 5 in the sixth operation mode, the heat medium circulates as indicated by thick arrows in FIG. 11. Specifically, in the heat medium circuit 5 in the sixth operation mode, the heat medium circulates through the first pump 20a, the water refrigerant heat exchanger 12, the heater 13, the heater core 11, the first heat-medium three-way valve 21a, and the first pump 20a in this order. At the same time, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the sixth operation mode, the circulation path of the heat medium via the water refrigerant heat exchanger 12, the heater 13, and the heater core 11 and the circulation path of the heat medium via the heat generation equipment 16 and the radiator 17 are formed independently.

With the circuit configuration of the heat medium circuit 5 in the sixth operation mode, the heat medium discharged from the first pump 20a is heated by heat exchange with the high-pressure refrigerant passing through the refrigerant passage 12a when passing through the heat medium passage 12b of the water refrigerant heat exchanger 12.

The heat medium flowing out of the water refrigerant heat exchanger 12 flows into the heating passage of the heater 13 and is heated by the heat generation part. The heat medium heated by the water refrigerant heat exchanger 12 and the heater 13 flows into the heater core 11 when flowing out of the heater 13.

In the heater core 11, the heat medium exchanges heat with the ventilation air blown by the interior blower 62 to heat the ventilation air. Thereby, the vehicle interior can be heated. Then, the heat medium flowing out of the heater core 11 is again sucked into the first pump 20a via the first heat-medium three-way valve 21a and pumped.

On the other hand, the heat medium discharged from the second pump 20b flows into the heat medium passage 16a of the heat generation equipment 16 via the second heat-medium check valve 22b. The heat medium absorbs the heat of the heat generation equipment 16 when passing through the heat medium passage 16a and flows out. When flowing out of the heat generation equipment 16, the heat medium flows into the radiator 17 via the second heat-medium three-way valve 21b.

The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b.

As a result, according to the heat management system 1 in the sixth operation mode, the heat medium heated by the water refrigerant heat exchanger 12 and the heater 13 is circulated so as to go through the heater core 11. Thus, in the sixth operation mode, the vehicle interior can be heated using the heat generation part of the heater 13 as a heat source in addition to the refrigerant of the refrigeration cycle 40. Therefore, according to the sixth operation mode, it is possible to respond to a request for a higher heating capacity than in the case of the fourth operation mode, and for example, it is possible to realize a defroster of a window in the vehicle.

In the sixth operation mode, with the second reference water temperature being required as the temperature of the heat medium, it is conceivable that the temperature of the heat medium increases in order to cope with the vehicle interior air-conditioning. At this time, when the heat generation equipment 16 is included on the circulation path of the heat medium via the heater core 11, the heater 13, and the like, the high-temperature heat medium passes through the heat generation equipment 16. Hence, it is conceivable that the temperature exceeds a proper temperature range related to each component of the heat generation equipment 16 to become a factor of malfunction.

In this regard, in the sixth operation mode, the heat medium is circulated via the heat generation equipment 16 independently of the circulation path of the heat medium via the heater core 11. Thus, in the sixth operation mode, the heat medium passing through the heat generation equipment 16 can be reduced in temperature rise by being made independent of the circulation of the heat medium related to the heating in the vehicle interior.

Further, since the radiator 17 is included in the circulation path via the heat generation equipment 16, the heat of the heat generation equipment 16 generated by the operation can be dissipated to the outside air via the heat medium. Thereby, in the sixth operation mode, it is possible to cool the heat generation equipment 16 while responding to the request for the heat medium temperature related to the vehicle interior air-conditioning, and it is possible to prevent the malfunction of the heat generation equipment 16 due to the influence of heat.

(7) Seventh Operation Mode

The seventh operation mode is executed by the heat management system 1 at the time of defrosting the exterior heat exchanger 43 in the refrigeration cycle 40

Here, the frosting of the exterior heat exchanger 43 will be described. As illustrated in FIG. 5, when the refrigeration cycle 40 is operated in the heating mode or the dehumidifying and heating mode, the exterior heat exchanger 43 exchanges heat between the outside air and the low-pressure refrigerant to absorb heat from the outside air.

At this time, when the outside air has a low temperature and high humidity as in winter, it is assumed that the surface of the exterior heat exchanger 43 is frosted. When the exterior heat exchanger 43 is frosted, an amount of heat absorbed from the outside air in the exterior heat exchanger 43 is reduced, so that the heating performance of the refrigeration cycle 40 is reduced.

The seventh operation mode is executed to sufficiently ensure the amount of heat absorbed from the outside air in the exterior heat exchanger 43 by defrosting the exterior heat exchanger 43, thus maintaining the heating performance of the refrigeration cycle 40

In the seventh operation mode, the control device 70 operates the first pump 20a with a predetermined pumping capacity and then brings the second pump 20b into the stopped state. The control device 70 brings the heater 13 into the stopped state and operates the refrigeration cycle 40 in the medium-cool mode described above.

As illustrated in FIG. 2, in the medium-cool mode, the water refrigerant heat exchanger 12 functions as a heat absorber that causes the refrigerant to absorb heat from the heat medium passing through the heat medium passage 16a. In the medium-cool mode, the high-pressure refrigerant compressed by compressor 41 flows into the exterior heat exchanger 43 via the four-way valve 42.

At this time, the control device 70 controls the operation of the air mix door 64 such that the cold air bypass passage 65 is fully opened. Hence, the heat exchange between the heat medium and the ventilation air in the heater core 11 is reduced, and the heater core 11 performs the same function as the heat medium passage.

Then, the control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Figure 12:
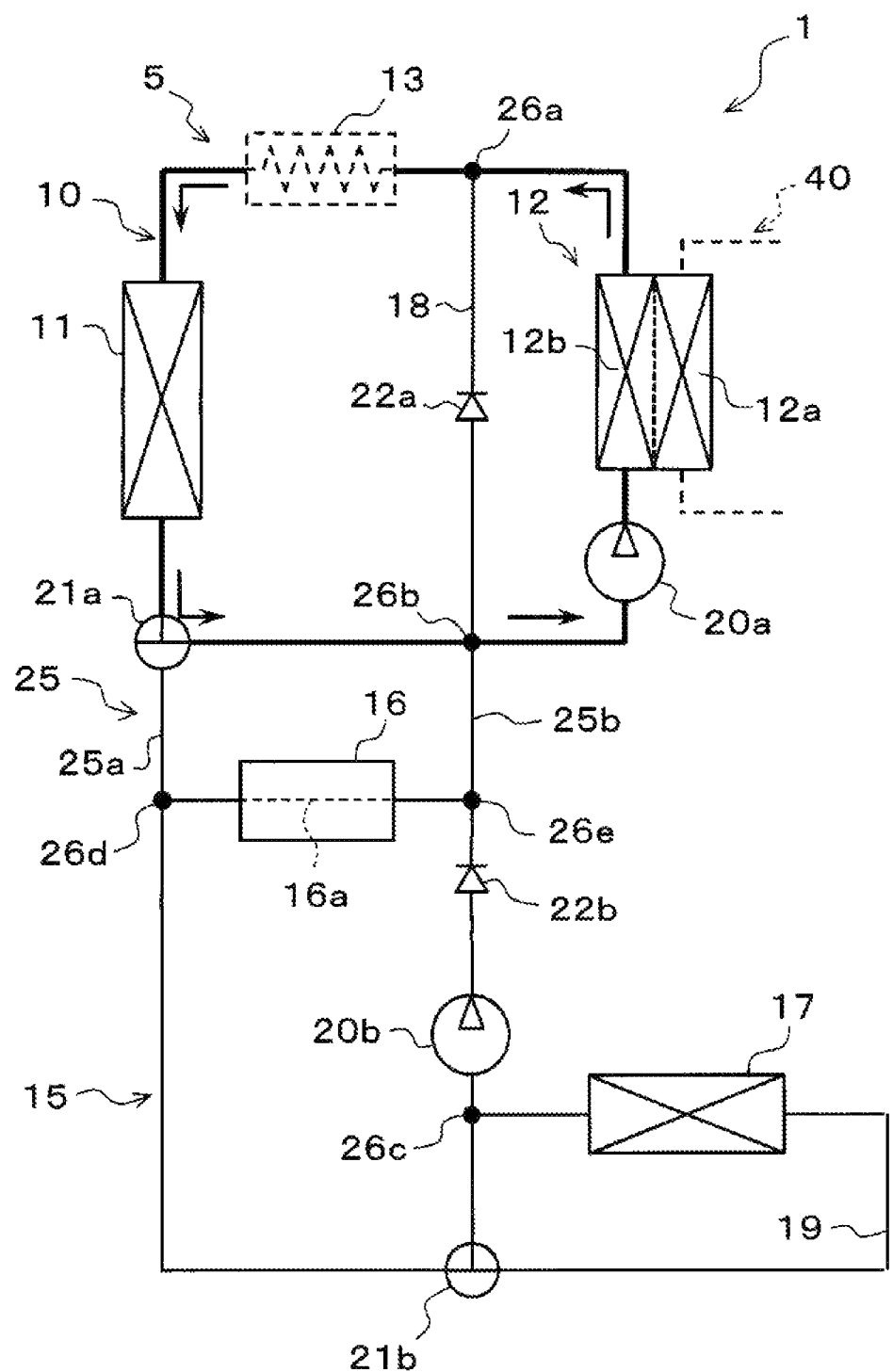
FIG. 12 is an explanatory diagram of a seventh operation mode of the heat management system according to the first embodiment.

Thereby, in the heat medium circuit 5 in the seventh operation mode, the heat medium circulates as indicated by thick arrows in FIG. 12. Specifically, in the heat medium circuit 5 in the seventh operation mode, the heat medium circulates through the first pump 20a, the water refrigerant heat exchanger 12, the heater 13, the heater core 11, the first heat-medium three-way valve 21a, and the first pump 20a in this order.

With the circuit configuration of the heat medium circuit 5 in the seventh operation mode, the heat medium discharged from the first pump 20a exchanges heat with the low-pressure refrigerant passing through the refrigerant passage 12a to evaporate the low-pressure refrigerant when passing through the heat medium passage 12b of the water refrigerant heat exchanger 12. That is, in the water refrigerant heat exchanger 12, the heat medium is cooled by absorbing heat by the latent heat of vaporization of the low-pressure refrigerant.

The heat medium flowing out of the heat medium passage 12b of the water refrigerant heat exchanger 12 passes through the heater 13 and the heater core 11. As described above, since the heater 13 is in the stopped state and the heat exchange between the ventilation air and the heat medium in the heater core 11 is restricted, the heat medium directly flows into the first heat-medium three-way valve 21a. The heat medium flowing out of the first heat-medium three-way valve 21a is sucked into the first pump 20a and pumped toward the heat medium passage 12b of the water refrigerant heat exchanger 12.

Thus, according to the seventh operation mode, the heat of the heat medium circulating in the heat medium circuit 5 can be absorbed by the refrigerant of the refrigeration cycle 40 by the heat exchange in the water refrigerant heat exchanger 12. Since the refrigeration cycle 40 in this case is operated in the medium-cool mode, heat drawn from the heat medium in the water refrigerant heat exchanger 12 is supplied to the exterior heat exchanger 43.

That is, according to the heat management system 1 in the seventh operation mode, the heat medium is circulated via the water refrigerant heat exchanger 12 and the heater core 11, and the flows of the heat medium into and out of the heat generation equipment 16 are restricted. The refrigeration cycle 40 absorbs the heat of the heat medium in the water refrigerant heat exchanger 12 and supplies the heat to the exterior heat exchanger 43.

That is, according to the seventh operation mode, the heat of the heat medium of the heat medium circuit 5 is pumped up by the refrigeration cycle 40 and supplied to the exterior heat exchanger 43, whereby the exterior heat exchanger 43 can be defrosted.

In the seventh operation mode, when it is determined that the heat of the heat medium in the heat medium circuit 5 is not sufficient based on the detection result of the first heat medium temperature sensor 76a and the like, the heater 13 may be operated to supplement the heat used for defrosting the exterior heat exchanger 43.

As described above, according to the heat management system 1 of the first embodiment, the heat medium heated by the water refrigerant heat exchanger 12 can be circulated so as to go through the heater core 11 as in the fourth and sixth operation modes with respect to the vehicle interior air-conditioning that is the space to be air conditioned. As in the second and fifth operation modes, the heat medium heated by the heat generation equipment 16 and the water refrigerant heat exchanger 12 can be circulated so as to go through the heater core 11.

By switching the operation mode in this manner, the heat management system 1 can switch the use or non-use of the waste heat of the heat generation equipment with respect to the heating of the ventilation air. According to the heat management system 1, since the waste heat of the heat generation equipment 16 is used for heating the space to be air conditioned via the heat medium without using the refrigerant of the refrigeration cycle 40, the heat loss associated with the heat exchange efficiency or the like can be reduced to improve the heating efficiency.

The heat medium heated by the heat generation equipment 16 and the water refrigerant heat exchanger 12 is circulated so as to go through the heater core 11, and the waste heat of the heat generation equipment 16 is used for heating, whereby the operating amount (e.g., the operating amount of the compressor 41) of the refrigeration cycle 40 can be kept low. As a result, the heat management system 1 can improve the heating efficiency of the space to be air conditioned from the viewpoint of energy consumption.

The heat management system 1 can circulate the heat medium via the heat generation equipment 16 independently of the circulation path passing through which the heated heat medium circulates so as to go through the heater core 11 as in the fourth and sixth operation modes.

As a result, according to the heat management system 1, the heat medium passing through the heat generation equipment 16 can be reduced in temperature rise by being made independent of the circulation of the heat medium related to the heating in the vehicle interior. Therefore, the heat management system 1 can heat the vehicle interior, which is the space to be air conditioned, and adjust the temperature of the heat generation equipment 16 in parallel.

In the fourth and sixth operation modes, the radiator 17 is included in the circulation path of the heat medium via the heat generation equipment 16. Thus, the heat of the heat generation equipment 16 generated by the operation can be dissipated to the outside air via the heat medium.

As a result, in the fourth and sixth operation modes, it is possible to cool the heat generation equipment 16 while responding to the request for the heat medium temperature related to the vehicle interior air-conditioning, and it is possible to prevent the malfunction of the heat generation equipment 16 due to the influence of heat.

In the heat management system 1, by performing switching to the seventh operation mode, in the heat medium circuit 5, the heat medium is circulated via the water refrigerant heat exchanger 12 and the heater core 11, and the flows of the heat medium into and out of the heat generation equipment 16 are restricted. Further, the refrigeration cycle 40 is operated in the medium-cool mode.

According to the seventh operation mode, the heat of the heat medium of the heat medium circuit 5 can be pumped up by the refrigeration cycle 40 and supplied to the exterior heat exchanger 43, and the exterior heat exchanger 43 can be defrosted. Therefore, the heat management system 1 can maintain the heating capacity of the refrigeration cycle 40 in a high state.

As in the first operation mode, the heat management system 1 can circulate the heat medium heated by the heat generation equipment 16 so as to go through the radiator 17 and can restrict the flows of the heat medium into and out of the water refrigerant heat exchanger 12.

By performing switching to the first operation mode, the heat of the heat generation equipment 16 generated by the operation is dissipated to the outside air through the heat medium, and the temperature of the heat generation equipment 16 can be adjusted such that the temperature of the heat generation equipment 16 falls within the proper temperature range.

When the high-temperature condition related to the temperature of the heat medium is satisfied, and switching is performed to the third operation mode, the heat management system 1 causes the heat medium to circulate so as to go through the radiator 17 in addition to the heat generation equipment 16, the water refrigerant heat exchanger 12, and the heater core 11.

As a result, the heat management system 1 can use the heat of the heat generation equipment 16 generated by the operation via the heat medium in addition to the heat of the refrigerant of the refrigeration cycle 40 and can improve the heating efficiency in the heat management system 1. In addition, excessive heat from the water refrigerant heat exchanger 12, the heat generation equipment 16, and the like can be dissipated to the outside air, so that the temperature of the heat medium circulating through the heat medium circuit 5 can be appropriately adjusted from the viewpoint of the vehicle interior air-conditioning and the temperature adjustment of the heat generation equipment 16.

When the temperature of the heat medium is required to be equal to or higher than a predetermined second reference water temperature (e.g., 70° C.), and switching is performed to the sixth operation mode, the heat management system 1 circulates the heat medium via the water refrigerant heat exchanger 12 and the heater core 11. At the same time, in the sixth operation mode, the heat medium is circulated via the heat generation equipment 16 and the radiator 17 independently of the circulation path of the heat medium including the water refrigerant heat exchanger 12 and the heater core 11.

According to the sixth operation mode, the heating of the vehicle interior and the temperature adjustment of the heat generation equipment 16 can be performed in parallel. The heat medium passing through the heat generation equipment 16 can be reduced in temperature rise since being independent of the circulation of the heat medium related to the heating in the vehicle interior.

Further, since the radiator 17 is included in the circulation path via the heat generation equipment 16, the heat of the heat generation equipment 16 generated by the operation can be dissipated to the outside air via the heat medium. Thereby, in the sixth operation mode, it is possible to cool the heat generation equipment 16 while responding to the request for the heat medium temperature related to the vehicle interior air-conditioning, and it is possible to prevent the malfunction of the heat generation equipment 16 due to the influence of heat.

The heat medium circuit 5 of the heat management system 1 includes the heater 13 at heats the heat medium flowing into the heater core 11 in accordance with the operation. Since the heater 13 is configured to be able to arbitrarily adjust the amount of heat for heating the heat medium, the temperature of the heat medium can be adjusted to a desired temperature. Thus, the heat management system 1 can appropriately manage the temperature of the heat medium in accordance with the use such as heating of the vehicle interior by using the heater 13.

Second Embodiment

Next, a heat management system 1 according to a second embodiment will be described with reference to FIGS. 13 to 23. The heat management system 1 according to the second embodiment is obtained by changing the configuration of the heat medium circuit 5 from the first embodiment described above.

Therefore, in the heat management system 1 according to the second embodiment, the configurations of the refrigeration cycle 40 and the interior air conditioning unit 60 and the control system of the control device 70 are similar to those in the first embodiment, and hence the detailed description thereof will be omitted. In the following description of the second embodiment, differences from the first embodiment will be described.

Figure 13:
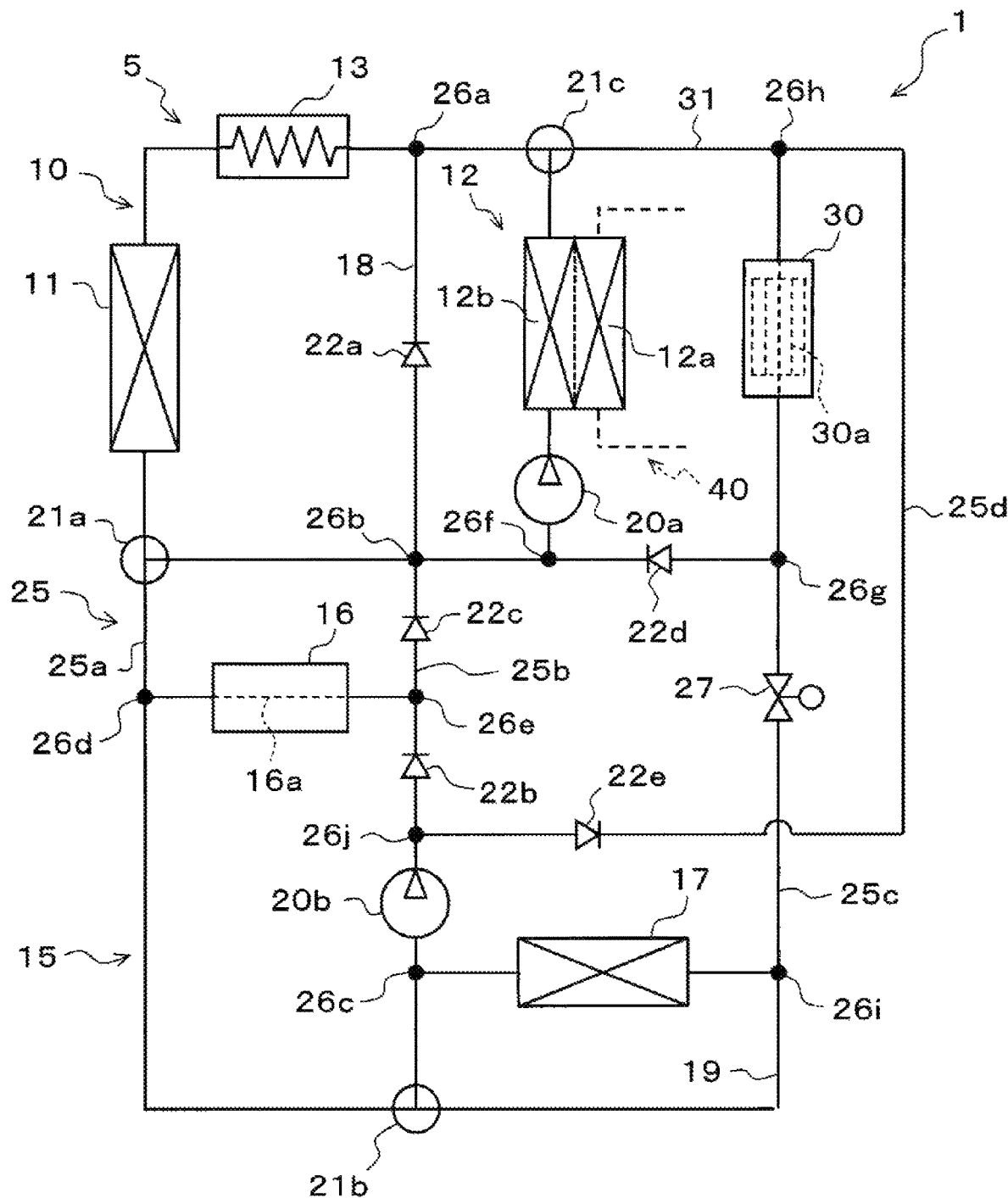
FIG. 13 is an overall configuration diagram of a heat management system according to a second embodiment.

As illustrated in FIG. 13, in the heat management system 1 according to the second embodiment, the heat medium circuit 5 includes a battery 30 as equipment subjected to temperature adjustment, a third heat-medium three-way valve 21c constituting a circuit switching part, a heat-medium switching valve 27, and the like.

The heat medium circuit 5 according to the second embodiment is further configured by adding a battery-side passage 31, a third connection passage 25c, a fourth connection passage 25d, a third heat-medium check valve 22c, a fourth heat-medium check valve 22d, and a fifth heat-medium check valve 22e to the heat medium circuit 5 according to the first embodiment.

In the heat medium circuit 5 according to the second embodiment, the third heat-medium three-way valve 21c is disposed between the outlet of the heat medium passage 12b of the water refrigerant heat exchanger 12 and the first connection 26a. A basic configuration of the third heat-medium three-way valve 21c is similar to that of the first heat-medium three-way valve 21a and is configured by a three-way flow rate adjustment value. The operation of the third heat-medium three-way valve 21c is controlled by a control signal output from the control device 70.

The inflow port of the third heat-medium three-way valve 21c is connected to the outlet side of the heat medium passage 12b of the water refrigerant heat exchanger 12. To one of the outflow ports of the third heat-medium three-way valve 21c, a heat medium pipe extending toward the first connection 26a is connected. The other outflow port of the third heat-medium three-way valve 21c is connected to a heat medium passage 30a of the battery 30 via the battery-side passage 31.

Therefore, the third heat-medium three-way valve 21c can continuously adjust the flow rate ratio between the flow rate of the heat medium flowing out to the heat medium passage 30a side of the battery 30 and the flow rate of the heat medium flowing out to the first connection 26a and the heater 13 side in the heat medium flowing out of the heat medium passage 12b.

Further, the third heat-medium three-way valve 21c can cause the total flow rate of the heat medium flowing out of the heat medium passage 12b to flow out to either the heat medium passage 30a side or the first connection 26a side of the battery 30. Thereby, the third heat-medium three-way valve 21c can switch the circuit configuration of the heat medium circuit 5 and functions as a part of the circuit switching part of the heat medium circuit 5.

As described above, one end side of the battery-side passage 31 is connected to the other side of the outflow port of the third heat-medium three-way valve 21c. The other end side of the battery-side passage 31 is connected to a pipe between the suction port of the first pump 20a and the second connection 26b and constitutes a sixth connection 26f.

The heat medium passage 30a of the battery 30 is disposed in the battery-side passage 31. The battery 30 is a secondary battery (e.g., lithium-ion battery) that stores electric power supplied to a motor-generator or the like. The battery 30 is an assembled battery formed by connecting a plurality of battery cells in series or in parallel. The battery 30 generates heat during charging and discharging.

The heat medium passage 30a of the battery 30 is a heat medium passage for adjusting the temperature of the battery 30 by circulating the heat medium and constitutes an equipment heat exchange part. That is, the heat medium passage 30a of the battery 30 is connected such that the heat medium of the heat medium circuit 5 can flow in and out.

The heat medium passage 30a of the battery 30 functions as a cooling part that cools the battery 30 using the low-temperature heat medium as a cold source when the heat medium cooled by the water refrigerant heat exchanger 12 circulates. In addition, the heat medium passage 30a of the battery 30 functions as a heating part that warms the battery 30 using the high-temperature heat medium as a heat source when the high-temperature heat medium circulates.

The heat medium passage 30a of the battery 30 is formed in a dedicated case of the battery 30. The passage configuration of the heat medium passage 30a of the battery 30 is a passage configuration in which a plurality of passages are connected in parallel inside the dedicated case.

Thereby, the heat medium passage 30a can uniformly exchange heat with the heat medium in the entire area of the battery 30. For example, the heat medium passage 30a is formed so as to uniformly absorb the heat of all the battery cells and uniformly cool all the battery cells.

A fourth heat-medium check valve 22d is disposed between the outlet of the heat medium passage 30a of the battery 30 and the sixth connection 26f. The fourth heat-medium check valve 22d allows the heat medium to flow from the outlet side of the heat medium passage 30a of the battery 30 to the sixth connection 26f side and prohibits the heat medium from flowing from the sixth connection 26f side to the outlet side of the heat medium passage 30a.

In the heat medium circuit 5 according to the second embodiment, the third heat-medium check valve 22c is disposed in the second connection passage 25b. The third heat-medium check valve 22c allows the heat medium to flow from a fifth connection 26e side to the second connection 26b side and prohibits the heat medium from flowing from the second connection 26b side to the fifth connection 26e side.

As illustrated in FIG. 13, one end side of the third connection passage 25c is connected to a pipe between an outflow port in the heat medium passage 30a of the battery 30 and an inflow port of the fourth heat-medium check valve 22d. A connection portion with the third connection passage 25c between the outflow port of the battery 30 in the heat medium passage 30a and the inflow port of the fourth heat-medium check valve 22d constitutes a seventh connection 26g.

On the other hand, the other end side of the third connection passage 25c is connected between one of the outflow ports of the second heat-medium three-way valve 21b and the heat medium inlet of the radiator 17. A connection portion with the third connection passage 25c between one of the outflow ports of the second heat-medium three-way valve 21b and the heat medium inlet of the radiator 17 constitutes a ninth connection 26i.

The heat-medium switching valve 27 is disposed in the third connection passage 25c. The heat-medium switching valve 27 opens and closes the heat medium passage in the third connection passage 25c to switch the presence or absence of the flow of the heat medium in the third connection passage 25c. The heat-medium switching valve 27 is an electromagnetic valve with its operation controlled by a control voltage output from the control device 70. Hence, the heat-medium switching valve 27 constitutes a part of a circuit switching part that switches the circuit configuration of the heat medium circuit 5.

As illustrated in FIG. 13, one end side of the fourth connection passage 25d is connected between the other outflow port of the third heat-medium three-way valve 21c and the inflow port of the heat medium passage 30a of the battery 30. A connection portion with the fourth connection passage 25d between the other outflow port of the third heat-medium three-way valve 21c and the inflow port in the heat medium passage 30a of the battery 30 constitutes an eighth connection 26h.

The other end side of the fourth connection passage 25d is connected between the discharge port of the second pump 20b and the heat medium inlet of the second heat-medium check valve 22b. A connection portion with the fourth connection passage 25d between the discharge port of the second pump 20b and the heat medium inlet of the second heat-medium check valve 22b constitutes a tenth connection 26j.

The fifth heat-medium check valve 22e is disposed in the fourth connection passage 25d. The fifth heat-medium check valve 22e allows the heat medium to flow from the tenth connection 26j side to the eighth connection 26h side and prohibits the heat medium from flowing from the eighth connection 26h side to the tenth connection 26j side.

In the heat management system 1 according to the second embodiment configured as described above, the circuit connection part 25 includes the first connection passage 25a, the second connection passage 25b, the third connection passage 25c, and the fourth connection passage 25d.

The heat-medium-circuit switching control part 70c according to the second embodiment is configured to control the operations of the first heat-medium three-way valve 21a, the second heat-medium three-way valve 21b, the third heat-medium three-way valve 21c, and the heat-medium switching valve 27, which are circuit switching parts, in the control device 70.

According to the heat management system 1 of the second embodiment, it is possible to perform the vehicle interior air-conditioning, the temperature adjustment of the heat generation equipment 16, and the temperature adjustment of the battery 30 by switching the circuit configuration of the heat medium circuit 5.

Next, the operation of the heat management system 1 of the second embodiment will be described. In the heat management system 1 of the second embodiment as well, various operation modes are switched as in the first embodiment. The operation of the refrigeration cycle 40 in each of the various operation modes is basically similar to that in the first embodiment. Thus, in the following description, the operation of the heat medium circuit 5 will be mainly described.

The heat management system 1 according to the second embodiment is obtained by adding various configurations to the heat medium circuit 5 of the first embodiment described above. Therefore, the heat management system 1 in the second embodiment can realize the first operation mode to the seventh operation mode in the first embodiment.

The heat management system 1 according to the second embodiment can further realize an eighth operation mode to an eighteenth operation mode. Hereinafter, the eighth operation mode to the eighteenth operation mode will be described with reference to the drawings.

(8) Eighth Operation Mode

The eighth operation mode is executed by the heat management system 1 in a case where the cooling of the battery 30 and the temperature adjustment of the heat generation equipment 16 are performed while the vehicle interior is cooled, for example, in summer (the outside air temperature is 25° C. or higher).

In the eighth operation mode, the control device 70 operates the first pump 20a and the second pump 20b at respectively predetermined pumping capacities. The control device 70 brings the heater 13 into the stopped state and operates the refrigeration cycle 40 in the medium-cool and cooling mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Also, the control device 70 controls the operation of the third heat-medium three-way valve 21c so as to communicate the inflow/outflow port of the water refrigerant heat exchanger 12 on the heat medium passage 12b side with the inflow/outflow port on the eighth connection 26h side and to close the inflow/outflow port on the first connection 26a side. Further, the control device 70 controls the operation of the heat-medium switching valve 27 so as to close the heat medium passage of the third connection passage 25c.

Figure 14:
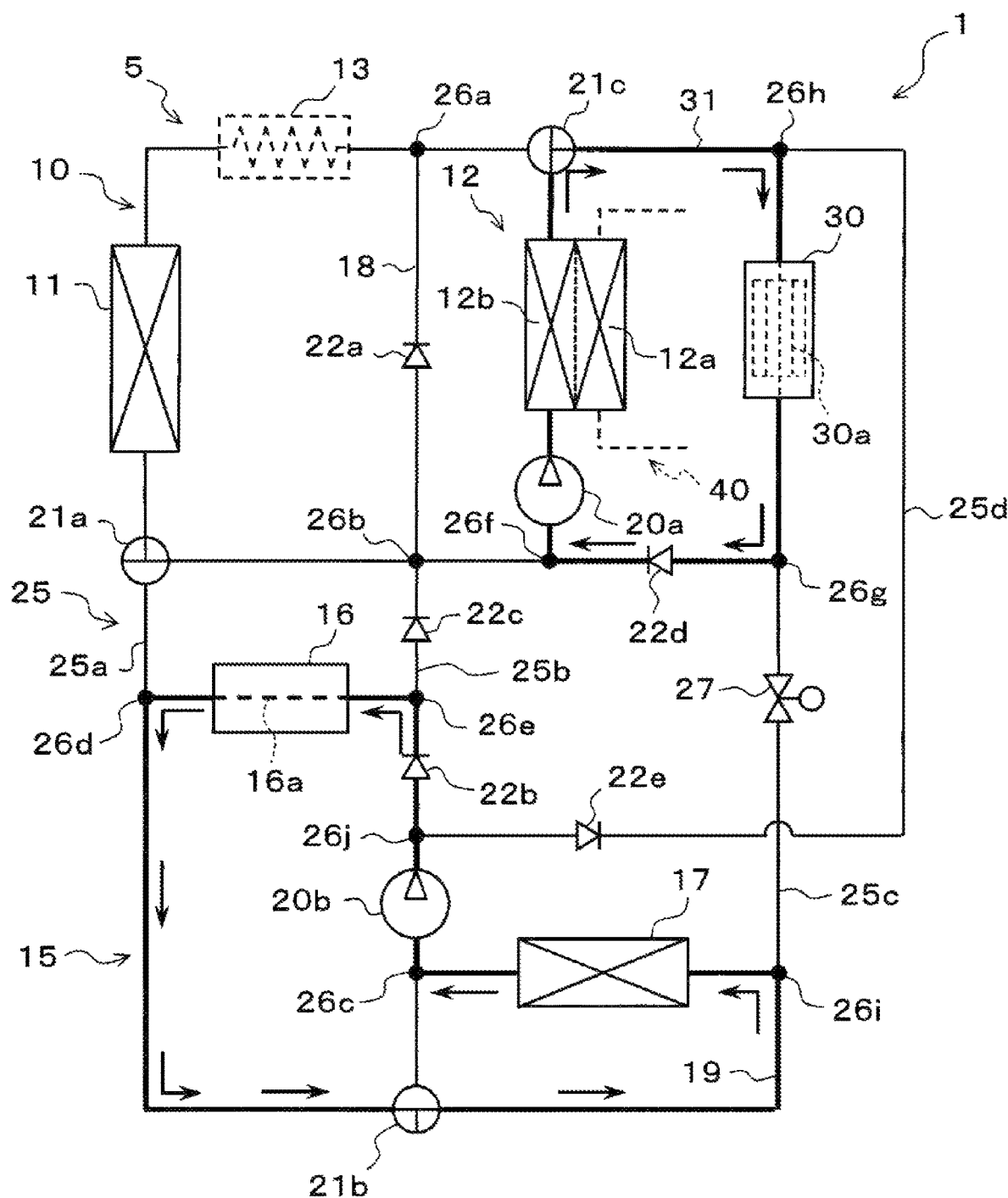
FIG. 14 is an explanatory diagram of an eighth operation mode of the heat management system according to the second embodiment.

Thereby, in the heat medium circuit 5 in the eighth operation mode, the heat medium circulates as indicated by thick arrows in FIG. 14. Specifically, in the heat medium circuit 5 in the eighth operation mode, the heat medium circulates through the first pump 20a, the water refrigerant heat exchanger 12, the third heat-medium three-way valve 21c, the battery 30, the fourth heat-medium check valve 22d, and the first pump 20a in this order. At the same time, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the eighth operation mode, the circulation path of the heat medium via the water refrigerant heat exchanger 12 and the battery 30 and the circulation path of the heat medium via the heat generation equipment 16 and the radiator 17 are formed independently.

With the circuit configuration of the heat medium circuit 5 in the eighth operation mode, the heat medium discharged from the first pump 20a is cooled by exchanging heat with the low-pressure refrigerant passing through the refrigerant passage 12a when passing through the heat medium passage 12b of the water refrigerant heat exchanger 12.

The heat medium flowing out of the water refrigerant heat exchanger 12 flows into the heat medium passage 30a of the battery 30 via the third heat-medium three-way valve 21c. When passing through the heat medium passage 30a of the battery 30, the cooled heat medium exchanges heat with each battery cell of the battery 30 and absorbs heat from the battery 30. Thereby, the battery 30 can be cooled in the eighth operation mode. The heat medium flowing out of the battery 30 is again sucked into the first pump 20a via the fourth heat-medium check valve 22d and pumped.

On the other hand, the heat medium discharged from the second pump 20b flows into the heat medium passage 16a of the heat generation equipment 16 via the second heat-medium check valve 22b. The heat medium absorbs the heat of the heat generation equipment 16 when passing through the heat medium passage 16a and flows out. When flowing out of the heat generation equipment 16, the heat medium flows into the radiator 17 via the second heat-medium three-way valve 21b.

The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b.

As described above, since the refrigeration cycle 40 in the eighth operation mode operates in the medium-cool and cooling mode, the vehicle interior can be cooled by causing the ventilation air to be operated by the interior blower 62 and to pass through the interior evaporator 44.

In the heat management system 1 in the eighth operation mode, the heat medium is circulated such that the heat medium cooled by the water refrigerant heat exchanger 12 passes so as to go through the battery 30. Thus, in the eighth operation mode, the battery 30 can be cooled using the refrigerant of the refrigeration cycle 40 as a cold source.

In the eighth operation mode, the heat medium is circulated so as to go through the heat generation equipment 16 and the radiator 17 independently of the circulation path of the heat medium via the water refrigerant heat exchanger 12 and the heat medium passage 30a of the battery 30.

Therefore, according to the eighth operation mode, the cooling of the battery 30 using the refrigerant of the refrigeration cycle 40 and the cooling of the heat generation equipment 16 by the outside air heat radiation in the radiator 17 can be independently performed in parallel. As a result, according to the eighth operation mode, the heat generation equipment 16 and the battery 30 can be adjusted to appropriate temperature ranges.

In the eighth operation mode, the refrigeration cycle 40 is in the medium-cool and cooling mode but may be in the medium-cool mode. The heat management system 1 in this case can perform the temperature adjustment of the heat generation equipment 16 and the cooling of the battery 30 in parallel without cooling the vehicle interior.

(9) Ninth Operation Mode

The ninth operation mode is executed by the heat management system 1 when the temperature of the heat medium circulating through the heat medium circuit 5 is lower than the first reference water temperature at the time of slightly heating the vehicle interior in rainy weather, for example, in summer (the outside air temperature is 25° C. or higher).

In the ninth operation mode, the control device 70 operates the first pump 20a and the second pump 20b at the respectively predetermined pumping capacities. The control device 70 brings the heater 13 into the stopped state and operates the refrigeration cycle 40 in the medium-cool mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Also, the control device 70 controls the operation of the third heat-medium three-way valve 21c so as to communicate the inflow/outflow port of the water refrigerant heat exchanger 12 on the heat medium passage 12b side with the inflow/outflow port on the eighth connection 26h side and to close the inflow/outflow port on the first connection 26a side. Further, the control device 70 controls the operation of the heat-medium switching valve 27 so as to close the heat medium passage of the third connection passage 25c.

Figure 15:
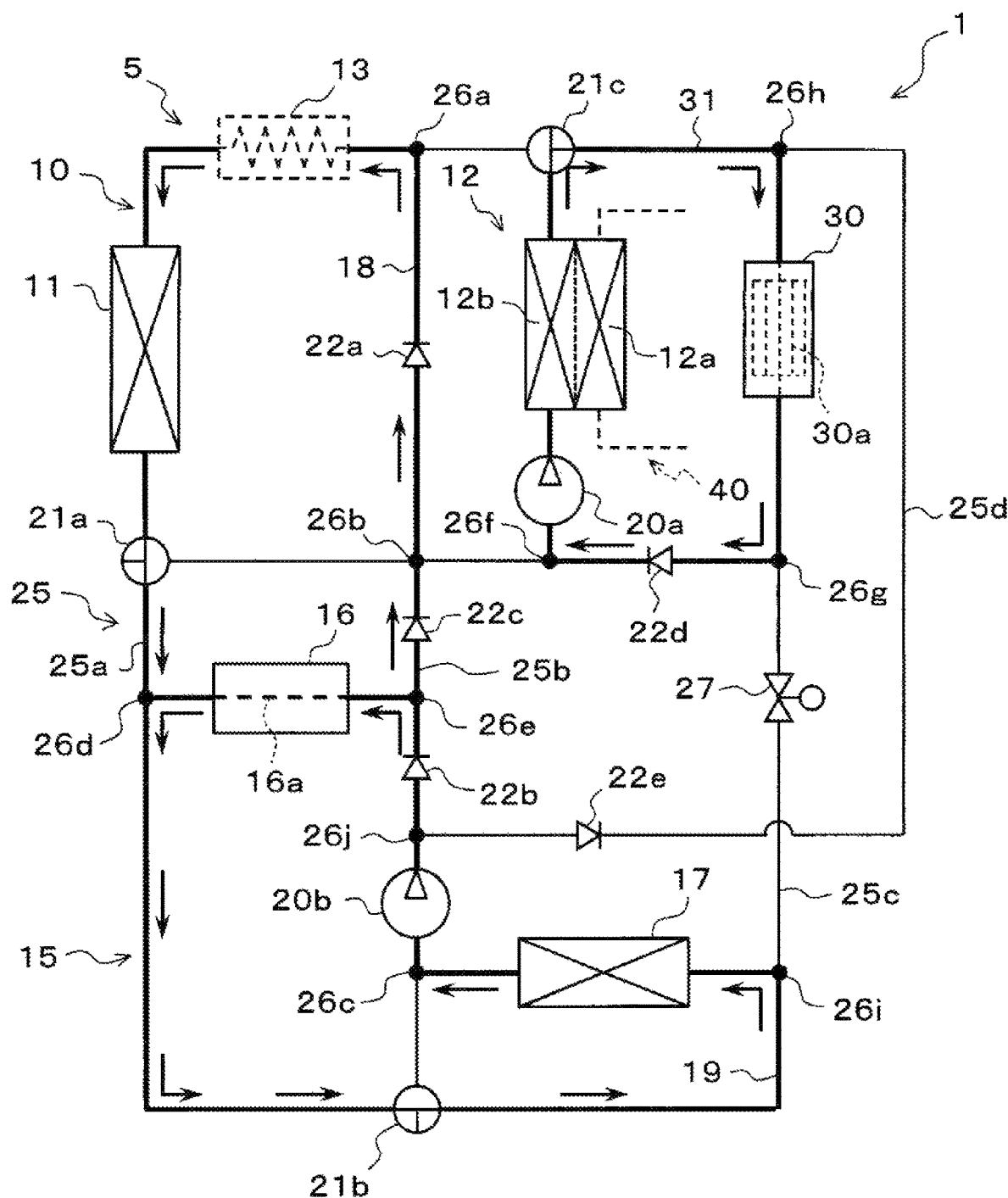
FIG. 15 is an explanatory diagram of a ninth operation mode of the heat management system according to the second embodiment.

Thereby, in the heat medium circuit 5 in the ninth operation mode, the heat medium circulates as indicated by thick arrows in FIG. 15. Specifically, in the heat medium circuit 5 in the ninth operation mode, the heat medium circulates through the first pump 20a, the water refrigerant heat exchanger 12, the third heat-medium three-way valve 21c, the battery 30, the fourth heat-medium check valve 22d, and the first pump 20a in this order.

At the same time, the heat medium circulates through the second pump 20b, the second heat-medium check valve 22b, the third heat-medium check valve 22c, the first heat-medium check valve 22a, the heater 13, the heater core 11, the first heat-medium three-way valve 21a, the second heat-medium three-way valve 21b, the radiator 17, and the second pump 20b in this order.

Further, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the ninth operation mode, the circulation path of the heat medium via the water refrigerant heat exchanger 12 and the battery 30 and the circulation path of the heat medium via the heater core 11, the heater 13, the heat generation equipment 16, and the radiator 17 are formed independently.

In the circulation path of the heat medium via the radiator 17 and the like, a circulation path is formed in which the flow of the heat medium passing through the heater 13 and the heater core 11 and the flow of the heat medium passing through the heat generation equipment 16 are connected in parallel with respect to the flow of the heat medium passing through the radiator 17.

With the circuit configuration of the heat medium circuit 5 in the ninth operation mode, the heat medium discharged from the first pump 20a is cooled by exchanging heat with the low-pressure refrigerant passing through the refrigerant passage 12a when passing through the heat medium passage 12b of the water refrigerant heat exchanger 12.

The heat medium flowing out of the water refrigerant heat exchanger 12 flows into the heat medium passage 30a of the battery 30 via the third heat-medium three-way valve 21c. When passing through the heat medium passage 30a of the battery 30, the cooled heat medium exchanges heat with each battery cell of the battery 30 and absorbs heat from the battery 30. Thereby, the battery 30 can be cooled in the ninth operation mode. The heat medium flowing out of the battery 30 is again sucked into the first pump 20a via the fourth heat-medium check valve 22d and the first heat-medium three-way valve 21a and pumped.

Then, the heat medium discharged from the second pump 20b branches into two flows at the fifth connection 26e via the second heat-medium check valve 22b. The heat medium on one side branched at the fifth connection 26e flows into the heat medium passage 16a of the heat generation equipment 16. The heat medium absorbs the heat of the heat generation equipment 16 when passing through the heat medium passage 16a and flows out.

When the heat medium heated by the heat of the heat generation equipment 16 flows out of the heat medium passage 16a of the heat generation equipment 16, the heat medium is joined at the fourth connection 26d with the flow of the heat medium on the other side branched at the fifth connection 26e.

On the other hand, the heat medium on the other side branched at the fifth connection 26e flows into the heater 13 via the third heat-medium check valve 22c and the first heat-medium check valve 22a. In the ninth operation mode, since the heater 13 is in the stopped state, the heating passage of the heater 13 functions as a heat medium passage.

The heat medium having passed through the heater 13 as it is flows into the heater core 11 and exchanges heat with the ventilation air blown by the interior blower 62. As a result, in the ninth operation mode, the ventilation air can be warmed by the heat medium heated by the waste heat of the heat generation equipment 16, and the vehicle interior can be heated. Then, the heat medium flowing out of the heater core 11 is joined with the flow on one side at the fourth connection 26d via the first heat-medium three-way valve 21a.

The heat medium joined at the fourth connection 26d flows into the radiator 17 via the second heat-medium three-way valve 21b. The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b. Thus, according to the ninth operation mode, the excessive heat of the heat medium can be dissipated to the outside air when passing through the radiator 17.

As described above, in the ninth operation mode, the refrigeration cycle 40 operates in the medium-cool mode, and the heat medium in the heat medium circuit 5 circulates via the battery 30 and the water refrigerant heat exchanger 12. Therefore, according to the ninth operation mode, the battery 30 can be cooled using the refrigerant of the refrigeration cycle 40 as a cold source.

In the ninth operation mode, the heat medium is circulated so as to go through the heater core 11, the heat generation equipment 16, and the radiator 17 independently of the circulation path of the heat medium via the water refrigerant heat exchanger 12 and the heat medium passage 30a of the battery 30.

Therefore, according to the ninth operation mode, the ventilation air can be heated by the heater core 11 using the heat medium heated by the waste heat of the heat generation equipment 16 as a heat source, and the vehicle interior can be heated. In the ninth operation mode, a part of the heat medium heated by the waste heat of the heat generation equipment 16 can pass through the radiator 17, so that the excessive heat for heating in the vehicle interior can be dissipated to the outside air.

According to the ninth operation mode, the cooling of the battery 30 using the refrigerant of the refrigeration cycle 40 can be performed independently in parallel with the cooling of the heat generation equipment 16 by the heat radiation of the outside air in the radiator 17 and the heating of the vehicle interior using the waste heat of the heat generation equipment 16. Thus, according to the ninth operation mode, the temperature adjustment of the heat generation equipment 16, the heating of the vehicle interior, and the cooling of the battery 30 can each be performed appropriately.

(10) Tenth Operation Mode

The tenth operation mode is executed by the heat management system 1 when the temperature of the heat medium circulating through the heat medium circuit 5 is lower than the first reference water temperature at the time of heating the vehicle interior in rainy weather, for example, in summer (the outside air temperature is 25° C. or higher). In the tenth operation mode, higher heating capability than in the ninth operation mode is required for heating the vehicle interior.

In the tenth operation mode, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the medium-cool mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the fourth connection 26d side with the inflow/outflow port on the third connection 26c side and to close the inflow/outflow port on the radiator 17 side.

Also, the control device 70 controls the operation of the third heat-medium three-way valve 21c so as to communicate the inflow/outflow port of the water refrigerant heat exchanger 12 on the heat medium passage 12b side with the inflow/outflow port on the eighth connection 26h side and to close the inflow/outflow port on the first connection 26a side. Further, the control device 70 controls the operation of the heat-medium switching valve 27 so as to close the heat medium passage of the third connection passage 25c.

Figure 16:
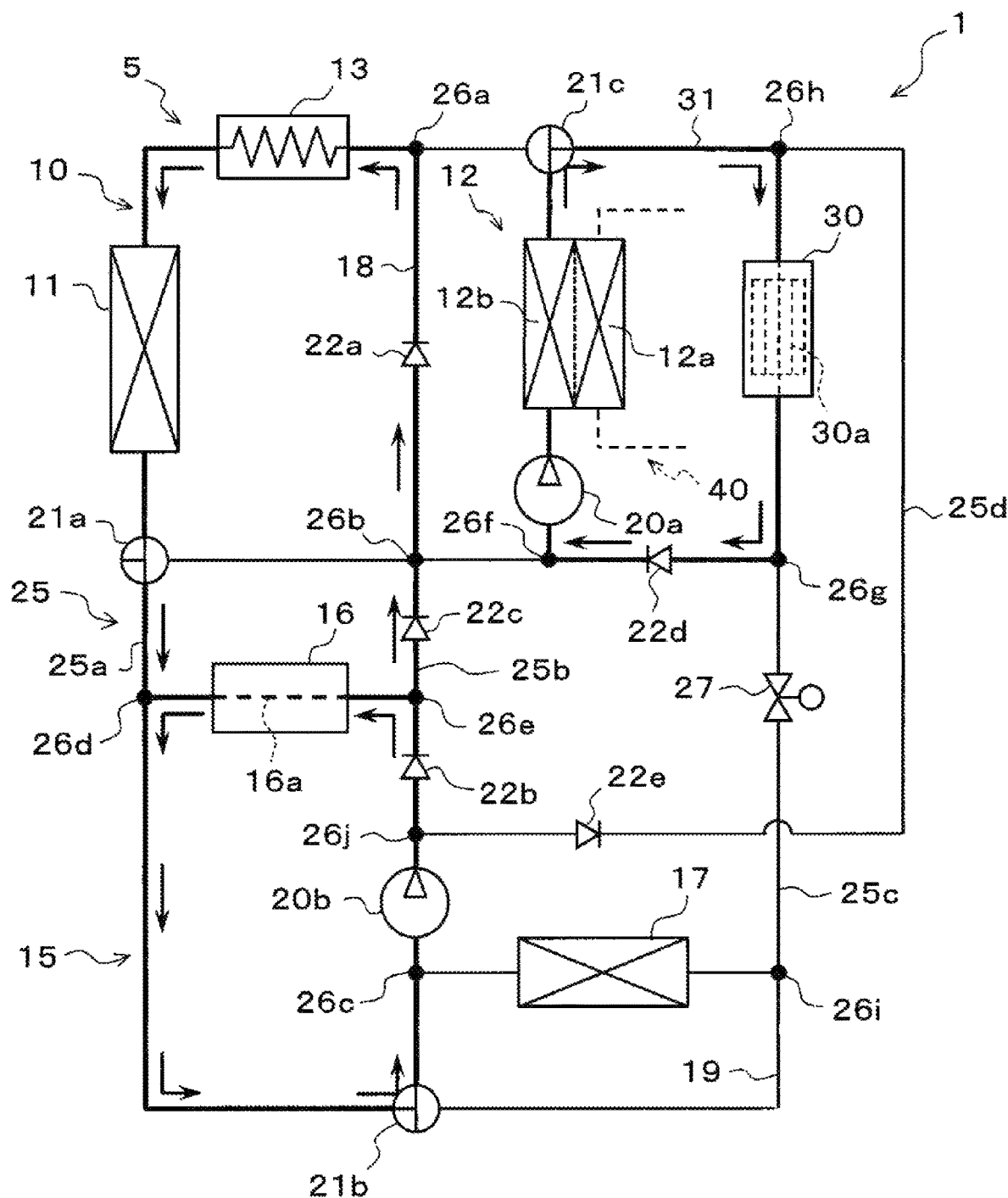
FIG. 16 is an explanatory view of a tenth operation mode of the heat management system according to the second embodiment.

Thereby, in the heat medium circuit 5 in the tenth operation mode, the heat medium circulates as indicated by thick arrows in FIG. 16. Specifically, in the heat medium circuit 5 in the tenth operation mode, the heat medium circulates through the first pump 20a, the water refrigerant heat exchanger 12, the third heat-medium three-way valve 21c, the battery 30, the fourth heat-medium check valve 22d, and the first pump 20a in this order.

At the same time, the heat medium circulates through the second pump 20b, the second heat-medium check valve 22b, the third heat-medium check valve 22c, the first heat-medium check valve 22a, the heater 13, the heater core 11, the first heat-medium three-way valve 21a, the second heat-medium three-way valve 21b, and the second pump 20b in this order. Further, the heat medium circulates through the second pump 20b, the second heat-medium check valve 22b, the heat generation equipment 16, the second heat-medium three-way valve 21b, and the second pump 20b in this order.

That is, in the heat medium circuit 5 in the tenth operation mode, the circulation path of the heat medium via the water refrigerant heat exchanger 12 and the battery 30 and the circulation path of the heat medium via the heater core 11, the heater 13, and the heat generation equipment 16 are formed independently.

In the circulation path of the heat medium discharged by the second pump 20b, a circulation path is formed in which the flow of the heat medium passing through the heater 13 and the heater core 11 and the flow of the heat medium passing through the heat generation equipment 16 are connected in parallel with respect to the flow of the heat medium passing through the second pump 20b.

With the circuit configuration of the heat medium circuit 5 in the tenth operation mode, the heat medium discharged from the first pump 20a circulates via the heat medium passage 12b of the water refrigerant heat exchanger 12 and the heat medium passage 30a of the battery 30. Therefore, as in the ninth operation mode, the battery 30 can be cooled by the heat medium cooled by the water refrigerant heat exchanger 12.

Then, the heat medium discharged from the second pump 20b branches into two flows at the fifth connection 26e via the second heat-medium check valve 22b. The heat medium on one side branched at the fifth connection 26e flows into the heat medium passage 16a of the heat generation equipment 16. The heat medium absorbs the heat of the heat generation equipment 16 when passing through the heat medium passage 16a and flows out.

When the heat medium heated by the heat of the heat generation equipment 16 flows out of the heat medium passage 16a of the heat generation equipment 16, the heat medium is joined at the fourth connection 26d with the flow of the heat medium on the other side branched at the fifth connection 26e.

On the other hand, the heat medium on the other side branched at the fifth connection 26e flows into the heater 13 via the third heat-medium check valve 22c and the first heat-medium check valve 22a. Since the heater 13 operates in the tenth operation mode, the heat medium is heated by the heat generation part when passing through the heating passage of the heater 13.

The heat medium heated by the heater 13 flows into the heater core 11 and exchanges heat with the ventilation air blown by the interior blower 62. Thereby, in the tenth operation mode, the ventilation air can be warmed by the heat medium heated by the waste heat of the heat generation part of the heater 13 and the heat generation equipment 16, and the vehicle interior can be heated. Then, the heat medium flowing out of the heater core 11 is joined with the flow on one side at the fourth connection 26d via the first heat-medium three-way valve 21a.

The heat medium joined at the fourth connection 26d is again sucked into the second pump 20b via the second heat-medium three-way valve 21b and pumped toward the second heat-medium check valve 22b. Thereby, according to the tenth operation mode, it is possible to heat the vehicle interior using the waste heat of the heat generation equipment 16. By heating the heat medium in the heat generation part of the heater 13, a required heating capacity can be realized, and comfort due to the heating of the vehicle interior can be improved.

That is, according to the tenth operation mode, the cooling of the battery 30 using the refrigerant of the refrigeration cycle 40 can be performed independently in parallel with the heating of the vehicle interior using the waste heat of the heat generation equipment 16. Thus, according to the tenth operation mode, the temperature adjustment of the heat generation equipment 16, the heating of the vehicle interior, and the cooling of the battery 30 can each be performed appropriately.

In the tenth operation mode, the heat generation part of the heater 13 is used as a heating source related to the heating of the vehicle interior in addition to the waste heat of the heat generation equipment 16. Thereby, the tenth operation mode can also cope with a case where high heating capacity is required as the heating of the vehicle interior.

(11) Eleventh Operation Mode

The eleventh operation mode is executed by the heat management system 1 in a case where the temperature of the battery 30 is adjusted while heating the vehicle interior, for example, in spring, autumn (the outside air temperature is 10° C. to 25° C.), or the like In the eleventh operation mode, the control device 70 operates the first pump 20a and the second pump 20b at the respectively predetermined pumping capacities. The control device 70 brings the heater 13 into the stopped state and operates the refrigeration cycle 40 in the heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to close all the inflow/outflow port on the fourth connection 26d side, the inflow/outflow port on the third connection 26c side, and the inflow/outflow port on the radiator 17 side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to open the heat medium passage of the third connection passage 25c.

Figure 17:
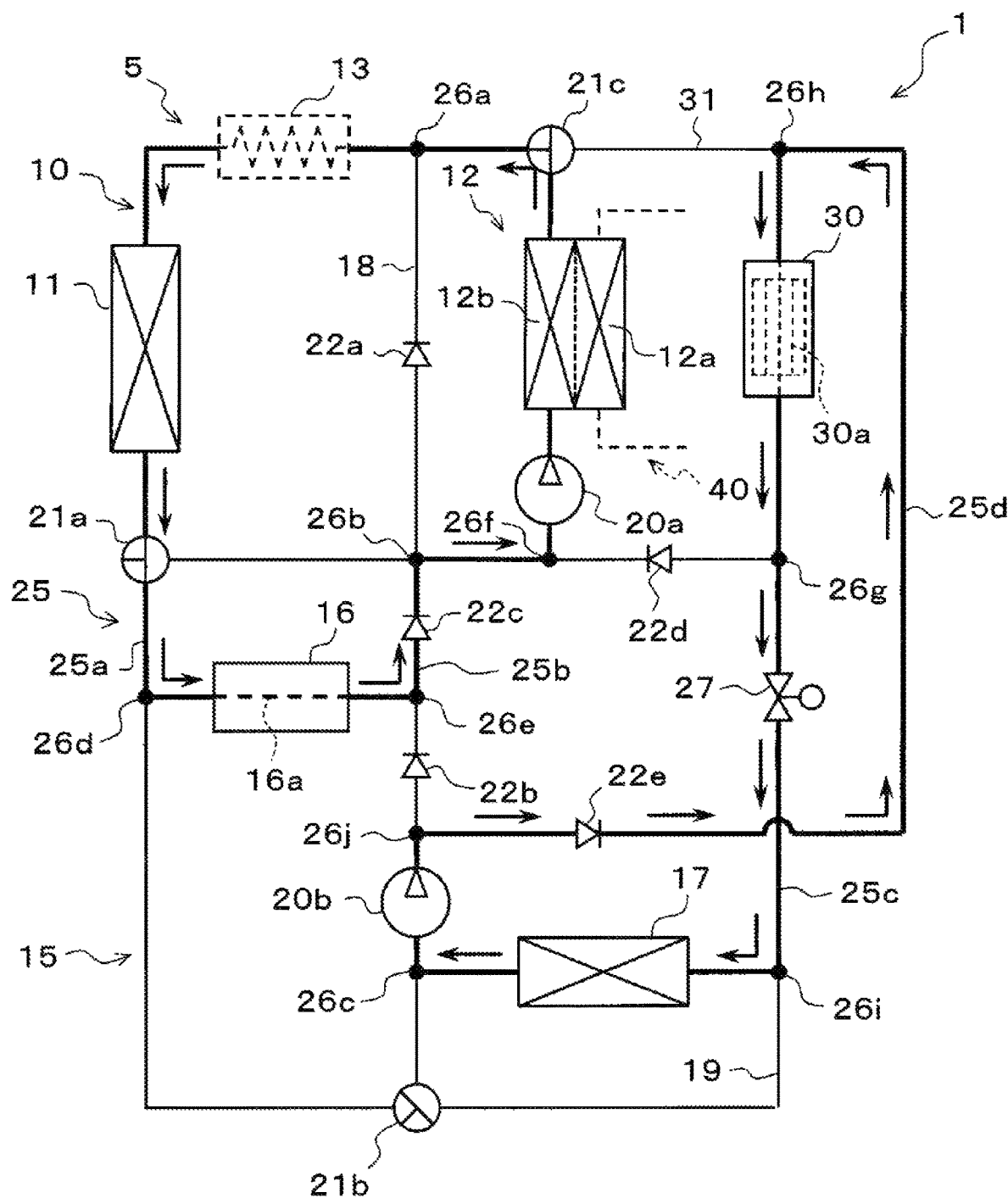
FIG. 17 is an explanatory view of an eleventh operation mode of the heat management system according to the second embodiment.

Thereby, in the heat medium circuit 5 in the eleventh operation mode, the heat medium circulates as indicated by thick arrows in FIG. 17. Specifically, in the eleventh operation mode, the heat medium circulates through the first pump 20a, the water refrigerant heat exchanger 12, the third heat-medium three-way valve 21c, the heater 13, the heater core 11, the first heat-medium three-way valve 21a, the heat generation equipment 16, the third heat-medium check valve 22c, and the first pump 20a in this order.

At the same time, the heat medium circulates through the second pump 20b, the fifth heat-medium check valve 22e, the battery 30, the heat-medium switching valve 27, the radiator 17, and the second pump 20b in this order. That is, in the heat medium circuit 5 in the eleventh operation mode, the circulation path of the heat medium via the water refrigerant heat exchanger 12, the heater core 11, and the heat generation equipment 16 and the circulation path of the heat medium via the battery 30 and the radiator 17 are formed independently.

With the circuit configuration of the heat medium circuit 5 in the eleventh operation mode, the heat medium discharged from the first pump 20a is heated by heat exchange with the high-pressure refrigerant passing through the refrigerant passage 12a when passing through the heat medium passage 12b of the water refrigerant heat exchanger 12.

The heat medium flowing out of the water refrigerant heat exchanger 12 flows into the heating passage of the heater 13 via the third heat-medium three-way valve 21c. In the eleventh operation mode, since the heater 13 is in the stopped state, the heating passage functions as a heat medium passage.

The heat medium flowing out of the heater 13 flows into the heater core 11 and exchanges heat with the ventilation air blown by the interior blower 62. Thereby, in the eleventh operation mode, the ventilation air can be warmed by the heat of the heat medium, and the vehicle interior can be heated. Then, the heat medium flowing out of the heater core 11 flows into the heat medium passage 16a of the heat generation equipment 16 via the first heat-medium three-way valve 21a. The heat medium absorbs the heat of the heat generation equipment 16 when passing through the heat medium passage 16a and flows out.

When the heat medium heated by the heat of the heat generation equipment 16 flows out of the heat medium passage 16a of the heat generation equipment 16, the heat medium is again sucked into the first pump 20a via the third heat-medium check valve 22c and is pumped. As described above, in the eleventh operation mode, the vehicle interior can be heated using the refrigerant of the refrigeration cycle 40 and the waste heat of the heat generation equipment 16 as heat sources.

Then, the heat medium discharged from the second pump 20b flows into the heat medium passage 30a of the battery 30 via the fifth heat-medium check valve 22e. When passing through the heat medium passage 30a of the battery 30, the heat medium exchanges heat with each battery cell of the battery 30 and absorbs heat from the battery 30. Thereby, the battery 30 can be cooled in the eleventh operation mode.

The heat medium flowing out of the heat medium passage 30a of the battery 30 flows into the radiator 17 via the heat-medium switching valve 27. The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b. Thus, according to the eleventh operation mode, the battery 30 can be cooled by radiating heat to the outside air in the radiator 17.

As described above, in the eleventh operation mode, the refrigeration cycle 40 operates in the heating mode, and the heat medium in the heat medium circuit 5 circulates via the water refrigerant heat exchanger 12, the heat generation equipment 16, and the heater core 11. Therefore, according to the eleventh operation mode, the vehicle interior can be heated using the refrigerant of the refrigeration cycle 40 and the waste heat of the heat generation equipment 16 as heating sources. At this time, the waste heat of the heat generation equipment 16 is absorbed by the heat medium, so that the temperature of the heat generation equipment 16 can be adjusted.

In the eleventh operation mode, the circulation path of the heat medium via the battery 30 and the radiator 17 is formed independently of the circulation path of the heat medium via the water refrigerant heat exchanger 12, the heat generation equipment 16, and the heater core 11. As a result, in the eleventh operation mode, the heat absorbed from the battery 30 via the heat medium can be dissipated to the outside air by the radiator 17, so that the temperature of the battery 30 can be adjusted.

According to the eleventh operation mode, the temperature adjustment of the battery 30 by heat radiation from the outside air in the radiator 17 and the heating of the vehicle interior using the refrigerant of the refrigeration cycle 40 and waste heat of the heat generation equipment 16 can be performed independently of and in parallel with each other. Thus, according to the eleventh operation mode, the heating of the vehicle interior and the temperature adjustment of the battery 30 can each be performed appropriately.

(12) Twelfth Operation Mode

The twelfth operation mode is executed by the heat management system 1 when the temperature of the heat medium in the heat medium circuit 5 becomes equal to or higher than the first reference water temperature described above at the time of adjusting the temperature of the battery 30 while heating the vehicle interior, for example, in spring, autumn (the outside air temperature is 10° C. to 25° C.), or the like In the twelfth operation mode, the control device 70 operates the first pump 20a and the second pump 20b at the respectively predetermined pumping capacities. The control device 70 brings the heater 13 into the stopped state and operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to open the heat medium passage of the third connection passage 25c.

Figure 18:
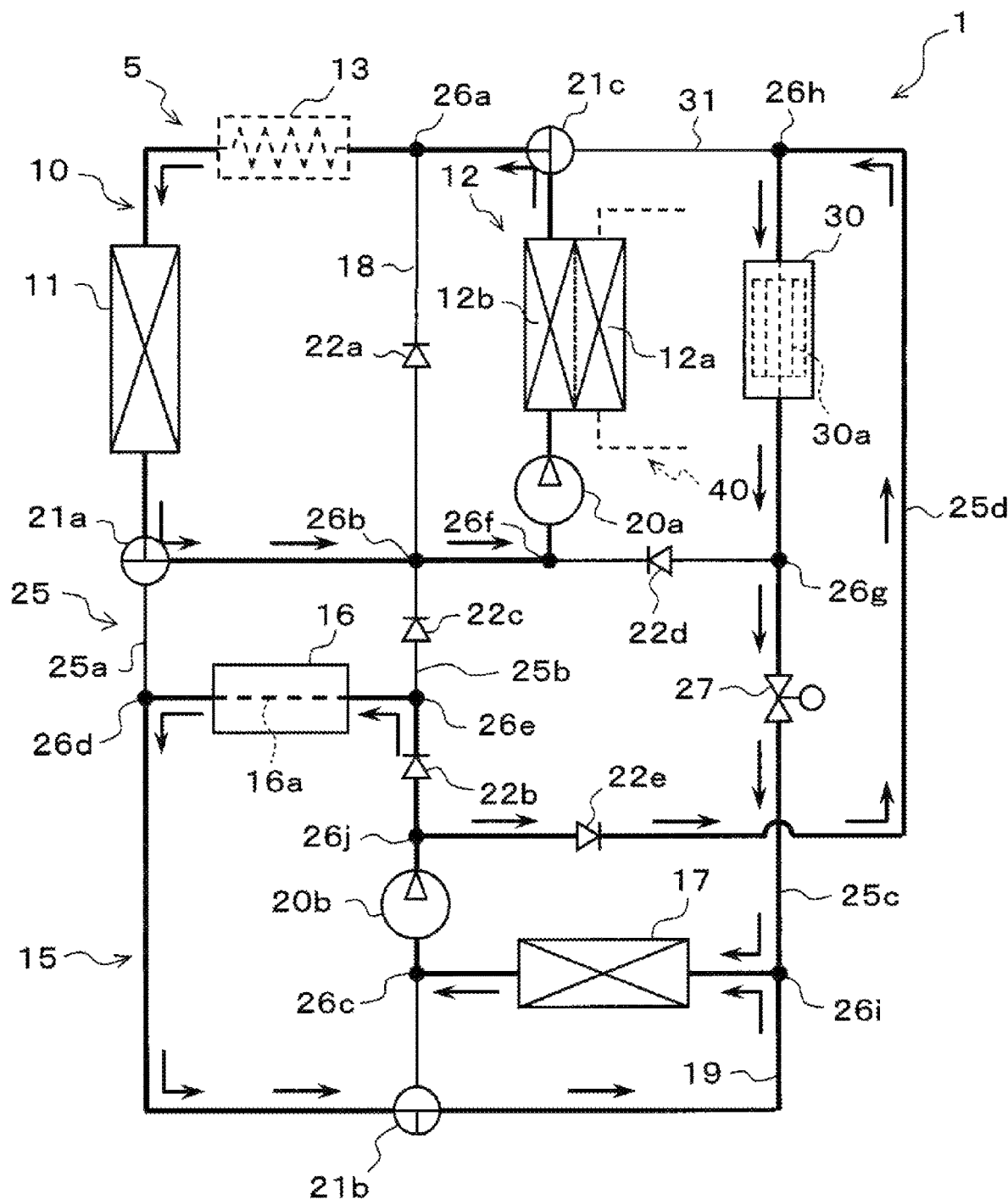
FIG. 18 is an explanatory view of a twelfth operation mode of the heat management system according to the second embodiment.

Thereby, in the heat medium circuit 5 in the twelfth operation mode, the heat medium circulates as indicated by thick arrows in FIG. 18. Specifically, in the twelfth operation mode, the heat medium circulates through the first pump 20a, the water refrigerant heat exchanger 12, the third heat-medium three-way valve 21c, the heater 13, the heater core 11, the first heat-medium three-way valve 21a, and the first pump 20a in this order.

At the same time, the heat medium circulates through the second pump 20b, the fifth heat-medium check valve 22e, the battery 30, the heat-medium switching valve 27, the radiator 17, and the second pump 20b in this order. Further, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the twelfth operation mode, the circulation path of the heat medium via the water refrigerant heat exchanger 12 and the heater core 11 and the circulation path of the heat medium via the battery 30, the heat generation equipment 16, and the radiator 17 are formed independently.

In the circulation path of the heat medium discharged by the second pump 20b, a circulation path is formed in which the flow of the heat medium passing through the battery 30 and the flow of the heat medium passing through the heat generation equipment 16 are connected in parallel with respect to the flow of the heat medium passing through the second pump 20b and the radiator 17.

With the circuit configuration of the heat medium circuit 5 in the twelfth operation mode, the heat medium discharged from the first pump 20a is heated by heat exchange with the high-pressure refrigerant passing through the refrigerant passage 12a when passing through the heat medium passage 12b of the water refrigerant heat exchanger 12.

The heat medium flowing out of the water refrigerant heat exchanger 12 passes through the heating passage in the heater 13 in the stopped state via the third heat-medium three-way valve 21c. The heat medium flowing out of the heater 13 flows into the heater core 11 and exchanges heat with the ventilation air blown by the interior blower 62.

The heat medium flowing out of the heater core 11 is again sucked into the first pump 20a via the first heat-medium three-way valve 21a and pumped. As described above, in the twelfth operation mode, the vehicle interior can be heated using the refrigerant of the refrigeration cycle 40 as a heat source.

The heat medium discharged from the second pump 20b is branched into two flows at tenth connection 26j. The heat medium on one side branched at the tenth connection 26j flows into the heat medium passage 30a of the battery 30 via the fifth heat-medium check valve 22e. Thereby, the heat medium exchanges heat with each battery cell of the battery 30 to cool the battery 30. The heat medium flowing out of the battery 30 reaches the ninth connection 26i via the heat-medium switching valve 27.

On the other hand, the heat medium on the other side branched at the tenth connection 26j flows into the heat medium passage 16a of the heat generation equipment 16 via the second heat-medium check valve 22b, absorbs the heat of the heat generation equipment 16, and flows out. When flowing out of the heat generation equipment 16, the heat medium reaches the ninth connection 26i via the second heat-medium three-way valve 21b.

At the ninth connection 26i, the heat medium having passed through the heat-medium switching valve 27 is joined with the heat medium having passed through the second heat-medium three-way valve 21b. The heat medium joined at the ninth connection 26i flows into the radiator 17 and exchanges heat with the outside air. As a result, the heat of the heat medium is dissipated to the outside air. The heat medium flowing out of the radiator 17 is again sucked into the second pump 20b and pumped toward the tenth connection 26j.

In the twelfth operation mode, the refrigeration cycle 40 operates in the heating mode, and the heat medium in the heat medium circuit 5 circulates via the water refrigerant heat exchanger 12 and the heater core 11. Therefore, according to the twelfth operation mode, the vehicle interior can be heated using the refrigerant of the refrigeration cycle 40 as a heating source.

In the twelfth operation mode, the circulation path of the heat medium via the heat generation equipment 16, the battery 30, and the radiator 17 is formed independently of the circulation path of the heat medium via the water refrigerant heat exchanger 12 and the heater core 11. Thereby, in the twelfth operation mode, the radiator 17 can radiate heat absorbed from the heat generation equipment 16 and the battery 30 via the heat medium to the outside air, so that the temperatures of the heat generation equipment 16 and the battery 30 can be adjusted.

According to the twelfth operation mode, the temperature adjustment of the heat generation equipment 16 and the battery 30 by heat radiation from the outside air in the radiator 17 and the heating of the vehicle interior using the refrigerant of the refrigeration cycle 40 can be performed independently of and in parallel with each other. Thus, according to the twelfth operation mode, the heating of the vehicle interior and the temperature adjustment of the heat generation equipment 16 and the battery 30 can each be performed appropriately.

(13) Thirteenth Operation Mode

The thirteenth operation mode is executed by the heat management system 1 when the temperature of the heat generation equipment 16 is adjusted while heating the vehicle interior, for example, in winter (the outside air temperature is 10° C. or lower).

In the thirteenth operation mode, the control device 70 operates the first pump 20a with a predetermined pumping capacity and brings the second pump 20b into the stopped state. Also, the control device 70 operates the heater 13 so as to generate heat with a calorific value determined in advance by the user. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to communicate the inflow/outflow port on the third connection 26c side with the inflow/outflow port on the radiator 17 side and to close the inflow/outflow port on the fourth connection 26d side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to close the heat medium passage of the third connection passage 25c.

Figure 19:
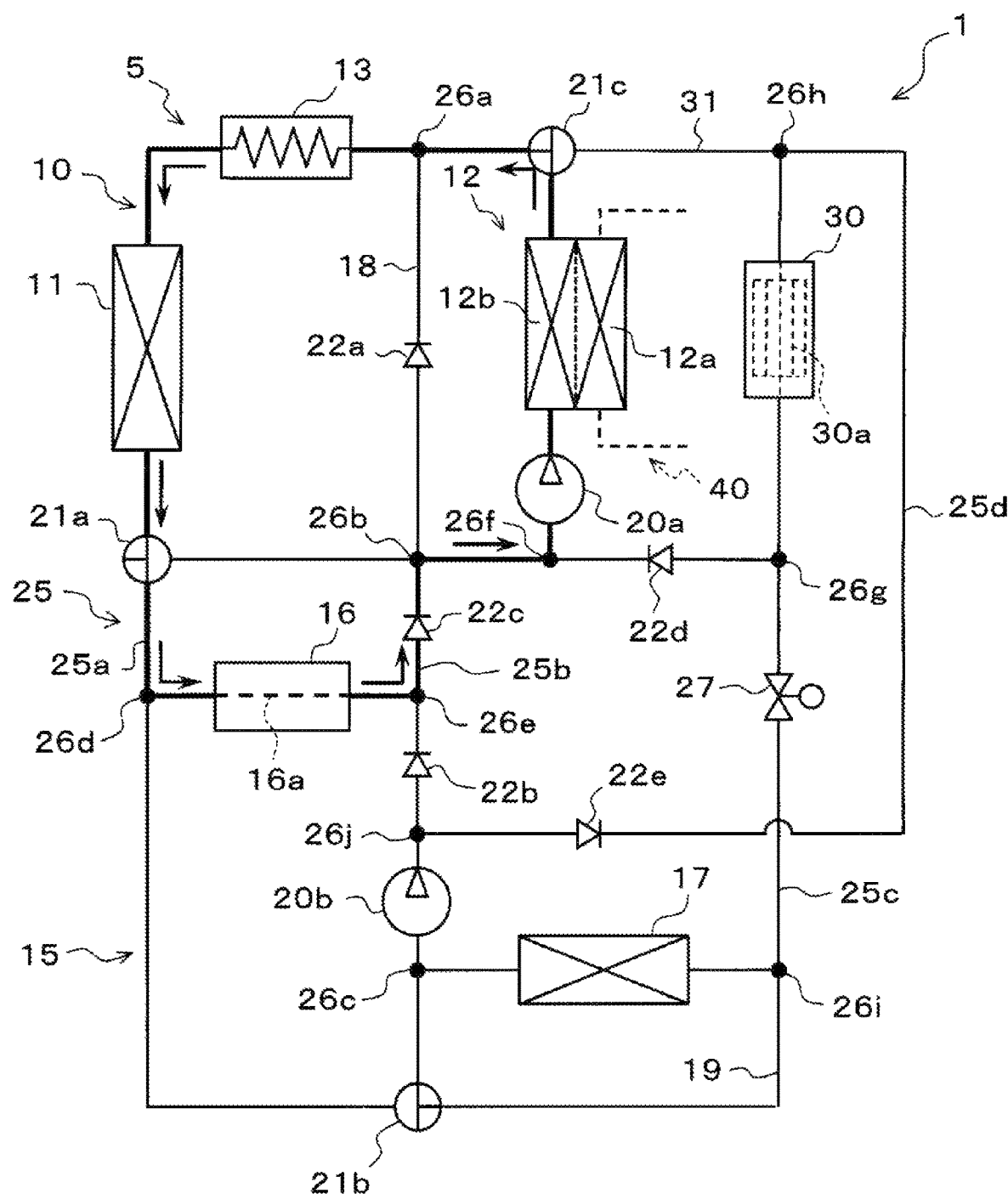
FIG. 19 is an explanatory view of a thirteenth operation mode of the heat management system according to the second embodiment.

Thereby, in the heat medium circuit 5 in the thirteenth operation mode, the heat medium circulates as indicated by thick arrows in FIG. 19. Specifically, in the thirteenth operation mode, the heat medium circulates through the first pump 20a, the water refrigerant heat exchanger 12, the third heat-medium three-way valve 21c, the heater 13, the heater core 11, the first heat-medium three-way valve 21a, the heat generation equipment 16, the third heat-medium check valve 22c, and the first pump 20a in this order. That is, in the heat medium circuit 5 in the thirteenth operation mode, the circulation path of the heat medium via the heater core 11, the heater 13, and the heat generation equipment 16 is formed alone.

With the circuit configuration of the heat medium circuit 5 in the thirteenth operation mode, the heat medium discharged from the first pump 20a is heated by heat exchange with the high-pressure refrigerant passing through the refrigerant passage 12a when passing through the heat medium passage 12b of the water refrigerant heat exchanger 12. The heat medium flowing out of the water refrigerant heat exchanger 12 flows into the heating passage of the heater 13 via the third heat-medium three-way valve 21c and is heated by the heat generation part.

The heat medium flowing out of the heater 13 flows into the heater core 11 and exchanges heat with the ventilation air blown by the interior blower 62. Thereby, in the thirteenth operation mode, the ventilation air can be warmed by the heat of the heat medium, and the vehicle interior can be heated.

Then, the heat medium flowing out of the heater core 11 flows into the heat medium passage 16a of the heat generation equipment 16 via the first heat-medium three-way valve 21a. The heat medium absorbs the heat of the heat generation equipment 16 when passing through the heat medium passage 16a and flows out.

The heat medium heated by the heat of the heat generation equipment 16 is sucked again to the first pump 20a via the third heat-medium check valve 22c and pumped. As described above, in the thirteenth operation mode, the vehicle interior can be heated using the heat generation part of the heater 13, the refrigerant of the refrigeration cycle 40, and the waste heat of the heat generation equipment 16 as heat sources.

In the thirteenth operation mode, as illustrated in FIG. 19, the heat medium is not circulated via the heat medium passage 30a of the battery 30. According to the thirteenth operation mode, the vehicle interior can be heated without actively adjusting the temperature of the battery 30.

According to the thirteenth operation mode, the refrigerant of the refrigeration cycle 40, the heat generation part of the heater 13, and the waste heat of the heat generation equipment 16 can be used as heating sources for heating the vehicle interior. Thereby, the thirteenth operation mode can also cope with a case where a request for heating capacity related to the heating of the vehicle interior is high.

(14) Fourteenth Operation Mode

The fourteenth operation mode is executed by the heat management system 1 when it is necessary to cool the battery 30 together with the temperature adjustment of the heat generation equipment 16 while heating the vehicle interior, for example, in winter (the outside air temperature is 10° C. or lower).

In the fourteenth operation mode, the control device 70 operates the first pump 20a and the second pump 20b at the respectively predetermined pumping capacities. Then, the control device 70 operates the heater 13 to generate heat with a calorific value determined in advance by the user. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side.

Then, the control device 70 controls the operation of the second heat-medium three-way valve 21b so as to close all the inflow/outflow port on the fourth connection 26d side, the inflow/outflow port on the third connection 26c side, and the inflow/outflow port on the radiator 17 side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to open the heat medium passage of the third connection passage 25c.

Figure 20:
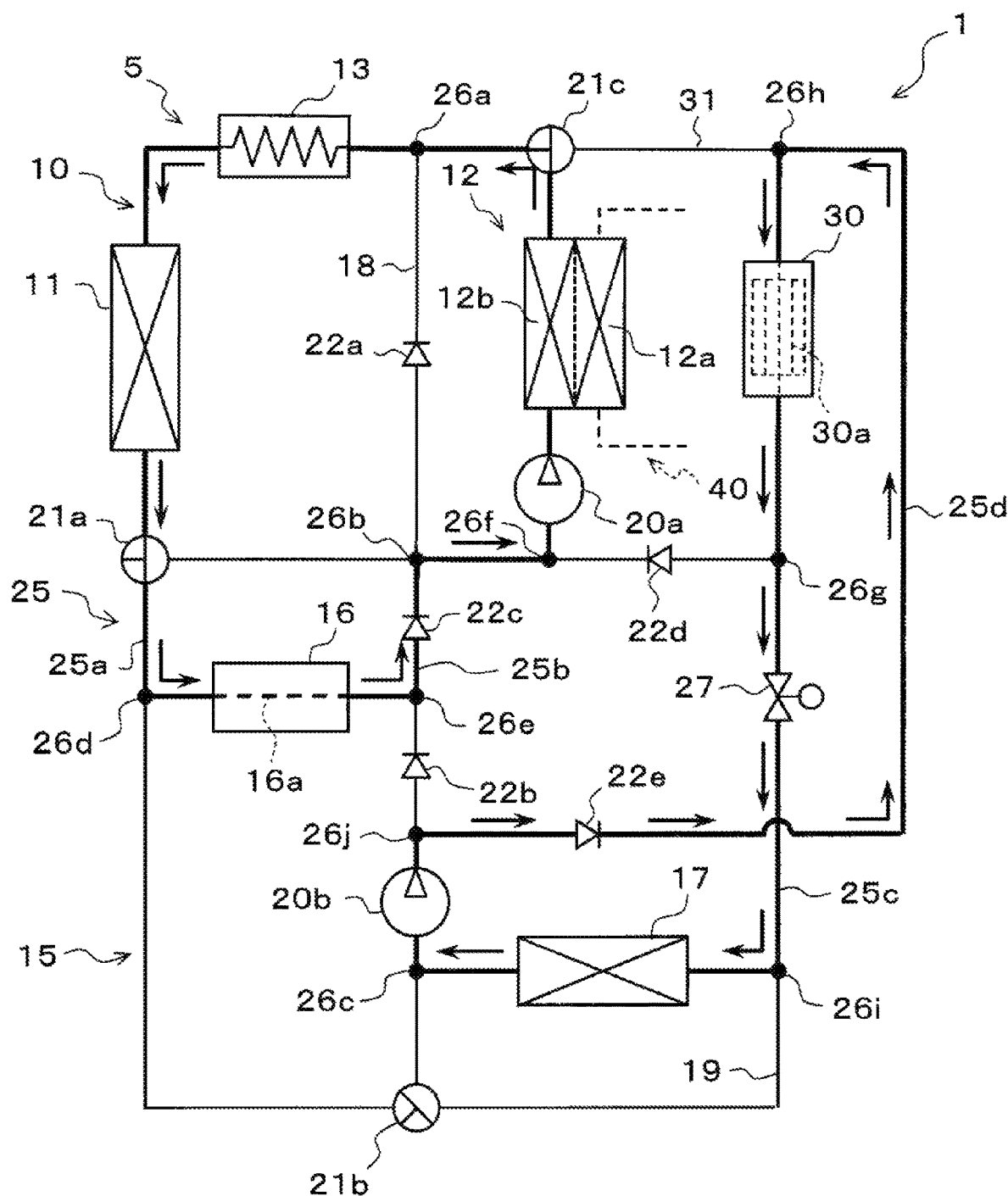
FIG. 20 is an explanatory view of a fourteenth operation mode of the heat management system according to the second embodiment.

Thereby, in the heat medium circuit 5 in the fourteenth operation mode, the heat medium circulates as indicated by thick arrows in FIG. 20. Specifically, in the fourteenth operation mode, the heat medium circulates through the first pump 20a, the water refrigerant heat exchanger 12, the third heat-medium three-way valve 21c, the heater 13, the heater core 11, the first heat-medium three-way valve 21a, the heat generation equipment 16, the third heat-medium check valve 22c, and the first pump 20a in this order.

At the same time, the heat medium circulates through the second pump 20b, the fifth heat-medium check valve 22e, the battery 30, the heat-medium switching valve 27, the radiator 17, and the second pump 20b in this order. That is, in the heat medium circuit 5 in the fourteenth operation mode, the circulation path of the heat medium via the water refrigerant heat exchanger 12, the heater 13, the heater core 11, and the heat generation equipment 16 and the circulation path of the heat medium via the battery 30 and the radiator 17 are formed independently.

With the circuit configuration of the heat medium circuit 5 in the fourteenth operation mode, the heat medium discharged from the first pump 20a exchanges heat with the high-pressure refrigerant passing through the refrigerant passage 12a of the water refrigerant heat exchanger 12. The heat medium flowing out of the water refrigerant heat exchanger 12 flows into the heating passage of the heater 13 via the third heat-medium three-way valve 21c and is heated by the heat generation part.

The heat medium flowing out of the heater 13 flows into the heater core 11 and exchanges heat with the ventilation air blown by the interior blower 62 to heat the ventilation air. The heat medium flowing out of the heater core 11 passes through the heat medium passage 16a of the heat generation equipment 16 via the first heat-medium three-way valve 21a.

At this time, the heat medium absorbs the heat of the heat generation equipment 16 and flows out. The heat medium heated by the heat of the heat generation equipment 16 is sucked again to the first pump 20a via the third heat-medium check valve 22c and pumped.

As described above, in the fourteenth operation mode, as in the thirteenth operation mode, the vehicle interior can be heated using the heat generation part of the heater 13, the refrigerant of the refrigeration cycle 40, and the waste heat of the heat generation equipment 16 as heat sources.

The heat medium discharged from the second pump 20b flows into the heat medium passage 30a of the battery 30 via the fifth heat-medium check valve 22e and absorbs heat from each battery cell of the battery 30. The heat medium flowing out of the heat medium passage 30a of the battery 30 flows into the radiator 17 via the heat-medium switching valve 27.

The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b. As a result, according to the fourteenth operation mode, the heat of the battery 30 can be dissipated to the outside air via the heat medium, so that the battery 30 can be cooled.

In the fourteenth operation mode, the refrigeration cycle 40 operates in the heating mode, and the heat medium in the heat medium circuit 5 circulates via the water refrigerant heat exchanger 12, the heater 13, the heat generation equipment 16, and the heater core 11. Therefore, according to the fourteenth operation mode, the vehicle interior can be heated using the refrigerant of the refrigeration cycle 40, the heat generation part of the heater 13, and the waste heat of the heat generation equipment 16 as heating sources.

In the fourteenth operation mode, since the circulation path of the heat medium via the battery 30 and the radiator 17 is formed, the battery 30 can be cooled by heat dissipation to the outside air through the heat medium.

In the fourteenth operation mode, the circulation path of the heat medium via the battery 30 and the radiator 17 is formed independently of the circulation path of the heat medium via the water refrigerant heat exchanger 12, the heater 13, the heat generation equipment 16, and the heater core 11.

Therefore, according to the fourteenth operation mode, the temperature adjustment of the battery 30 by heat radiation from the outside air in the radiator 17 and the heating of the vehicle interior using the refrigerant of the refrigeration cycle 40, waste heat of the heat generation equipment 16, and the heat generation part of the heater 13 can be performed independently of and in parallel with each other. Thereby, the heating of the vehicle interior and the temperature adjustment of battery 30 can each be performed appropriately.

(15) Fifteenth Operation Mode

The fifteenth operation mode is executed by the heat management system 1 in a case where the temperature of the heat medium is required to be equal to or higher than the above-described second reference water temperature (e.g., 70° C.) and the temperature of the heater 13 is adjusted regarding the vehicle interior air-conditioning, for example, in winter (the outside air temperature is 10° C. or lower). Specifically, a case of defrosting a window in the vehicle or the like is assumed, and the second reference water temperature is set higher than the first reference water temperature described above.

In the fifteenth operation mode, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to close the heat medium passage of the third connection passage 25c.

Figure 21:
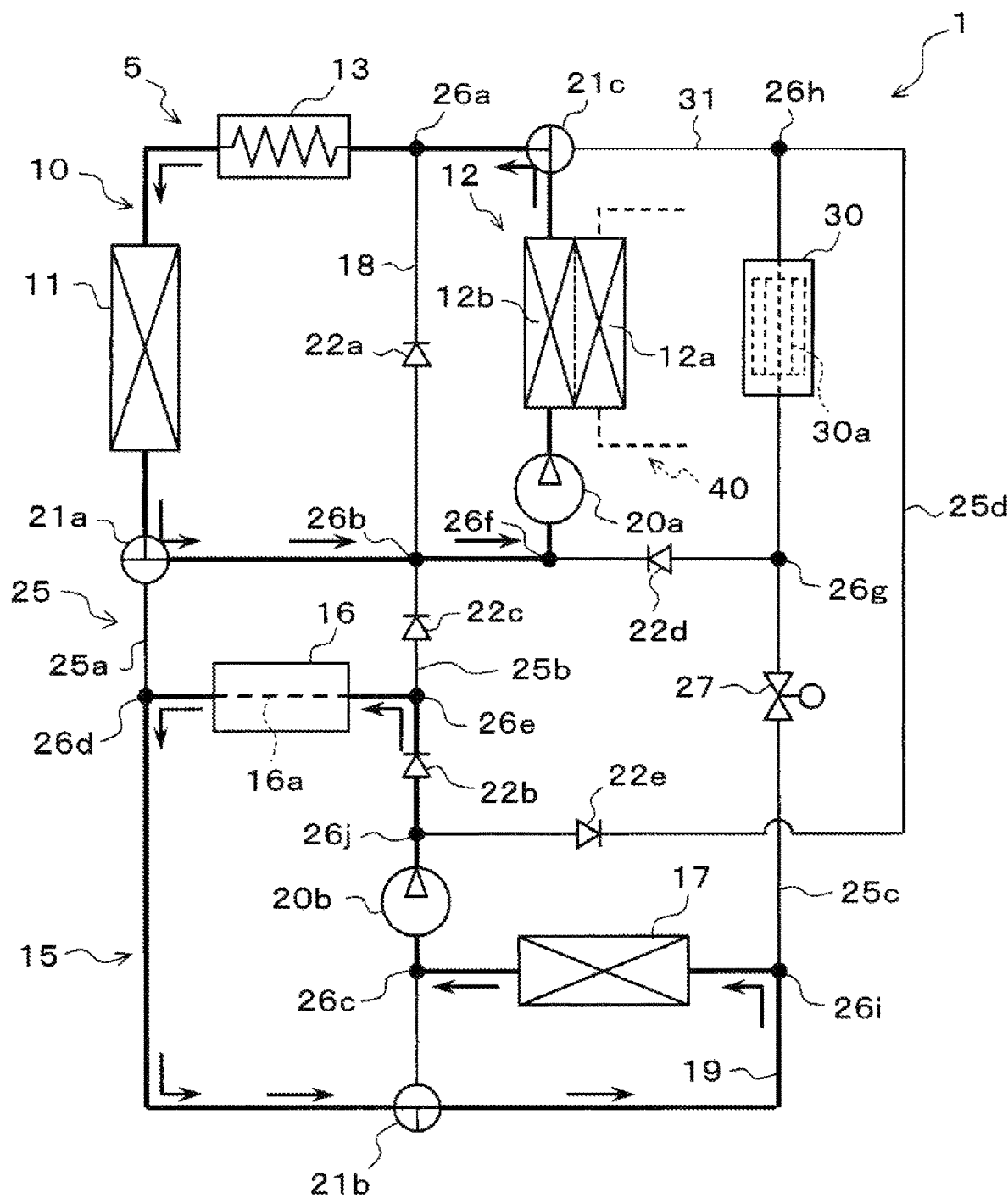
FIG. 21 is an explanatory view of a fifteenth operation mode of the heat management system according to the second embodiment.

Thereby, in the heat medium circuit 5 in the fifteenth operation mode, the heat medium circulates as indicated by thick arrows in FIG. 21. Specifically, in the fifteenth operation mode, the heat medium circulates through the first pump 20a, the water refrigerant heat exchanger 12, the third heat-medium three-way valve 21c, the heater 13, the heater core 11, the first heat-medium three-way valve 21a, and the first pump 20a in this order.

At the same time, in the heat medium circuit 5, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the fifteenth operation mode, the circulation path of the heat medium via the water refrigerant heat exchanger 12, the heater 13, and the heater core 11 and the circulation path of the heat medium via the heat generation equipment 16 and the radiator 17 are formed independently.

With the circuit configuration of the heat medium circuit 5 in the fifteenth operation mode, the heat medium discharged from the first pump 20a exchanges heat with the high-pressure refrigerant passing through the refrigerant passage 12a of the water refrigerant heat exchanger 12.

The heat medium flowing out of the water refrigerant heat exchanger 12 flows into the heating passage of the heater 13 via the third heat-medium three-way valve 21c and is heated by the heat generation part. The heat medium flowing out of the heater 13 flows into the heater core 11 and exchanges heat with the ventilation air blown by the interior blower 62 to heat the ventilation air.

The heat medium flowing out of the heater core 11 is again sucked into the first pump 20a via the first heat-medium three-way valve 21a and pumped. As described above, in the fifteenth operation mode, the vehicle interior can be heated using the refrigerant of the refrigeration cycle 40 and the heat generation part of the heater 13 as heat sources.

On the other hand, the heat medium discharged from the second pump 20b flows into the heat medium passage 16a of the heat generation equipment 16 via the second heat-medium check valve 22b. The heat medium absorbs the heat of the heat generation equipment 16 when passing through the heat medium passage 16a and flows out. The heat medium heated by the waste heat of the heat generation equipment 16 flows into the radiator 17 via the second heat-medium three-way valve 21b.

The heat medium flowing into the radiator 17 exchanges heat with the outside air to dissipate the heat of the heat medium to the outside air. The heat medium flowing out of the radiator 17 is again sucked into the second pump 20b and pumped toward the second heat-medium check valve 22b.

As illustrated in FIG. 21, in the fifteenth operation mode, the heat medium is not circulated via the heat medium passage 30a of the battery 30. According to the fifteenth operation mode, the vehicle interior can be heated without actively adjusting the temperature of the battery 30.

In the fifteenth operation mode, the circulation path of the heat medium via the water refrigerant heat exchanger 12, the heater 13, and the heater core 11, and the circulation path of the heat medium via the heat generation equipment 16 and the radiator 17 are formed independently.

Thus, according to the fifteenth operation mode, the heating of the vehicle interior using the refrigerant of the refrigeration cycle 40 and the heat generation part of the heater 13 as heating sources and the temperature adjustment of the heat generation equipment 16 by heat radiation to the outside air can each be performed appropriately.

(16) Sixteenth Operation Mode

The sixteenth operation mode is executed by the heat management system 1 in a case where the temperature of the heat medium is required to be equal to or higher than the second reference water temperature (e.g., 70° C.) and the heat generation equipment 16, and the battery 30 are cooled with respect to the vehicle interior air-conditioning, for example, in winter (the outside air temperature is 10° C. or lower).

In the sixteenth operation mode, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate the inflow/outflow port on the fourth connection 26d side with the inflow/outflow port on the radiator 17 side and to close the inflow/outflow port on the third connection 26c side.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side. Further, the control device 70 controls the operation of the heat-medium switching valve 27 so as to open the heat medium passage of the third connection passage 25c.

Figure 22:
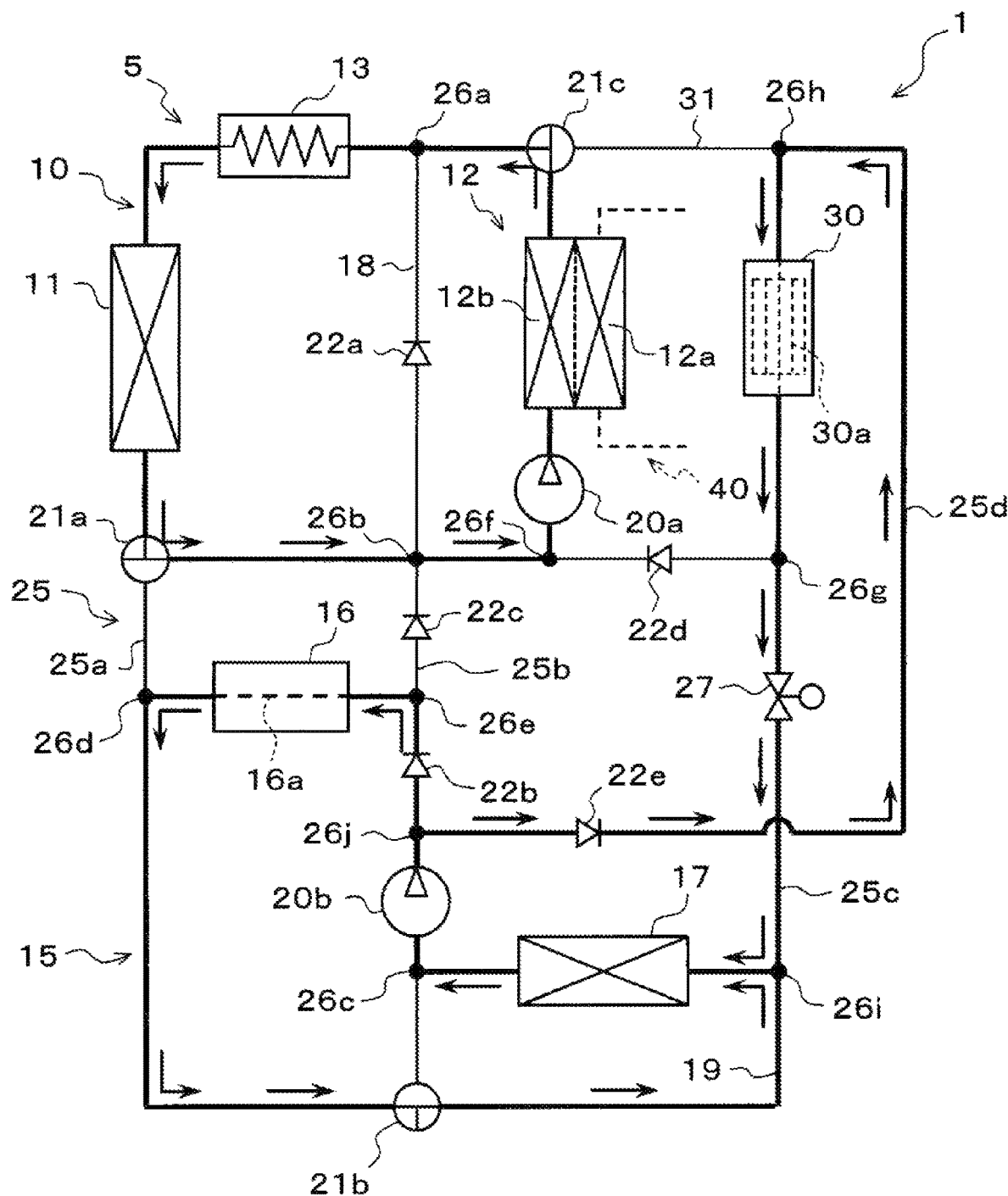
FIG. 22 is an explanatory view of a sixteenth operation mode of the heat management system according to the second embodiment.

Thereby, in the heat medium circuit 5 in the sixteenth operation mode, the heat medium circulates as indicated by thick arrows in FIG. 22. Specifically, in the sixteenth operation mode, the heat medium circulates through the first pump 20a, the water refrigerant heat exchanger 12, the third heat-medium three-way valve 21c, the heater 13, the heater core 11, the first heat-medium three-way valve 21a, and the first pump 20a in this order.

At the same time, the heat medium circulates through the second pump 20b, the fifth heat-medium check valve 22e, the battery 30, the heat-medium switching valve 27, the radiator 17, and the second pump 20b in this order. Further, the heat medium circulates through the second pump 20b, the second heat-medium check valve 22b, the heat generation equipment 16, the second heat-medium three-way valve 21b, the radiator 17, and the second pump 20b in this order.

That is, in the heat medium circuit 5 in the sixteenth operation mode, the circulation path of the heat medium via the water refrigerant heat exchanger 12 and the heater core 11 and the circulation path of the heat medium via the battery 30, the heat generation equipment 16, and the radiator 17 are formed independently.

In the circulation path of the heat medium discharged by the second pump 20b, a circulation path is formed in which the flow of the heat medium passing through the battery 30 and the flow of the heat medium passing through the heat generation equipment 16 are connected in parallel with respect to the flow of the heat medium passing through the second pump 20b and the radiator 17.

With the circuit configuration of the heat medium circuit 5 in the sixteenth operation mode, the heat medium discharged from the first pump 20a exchanges heat with the high-pressure refrigerant passing through the refrigerant passage 12a of the water refrigerant heat exchanger 12.

The heat medium flowing out of the water refrigerant heat exchanger 12 flows into the heating passage of the heater 13 via the third heat-medium three-way valve 21c and is heated by the heat generation part. The heat medium flowing out of the heater 13 flows into the heater core 11 and exchanges heat with the ventilation air blown by the interior blower 62 to heat the ventilation air.

The heat medium flowing out of the heater core 11 is again sucked into the first pump 20a via the first heat-medium three-way valve 21a and pumped. As described above, in the sixteenth operation mode, the vehicle interior can be heated using the refrigerant of the refrigeration cycle 40 and the heat generation part of the heater 13 as heat sources.

The heat medium discharged from the second pump 20b is branched into two flows at tenth connection 26j. The heat medium on one side branched at the tenth connection 26j flows into the heat medium passage 30a of the battery 30 via the fifth heat-medium check valve 22e and absorbs heat from each battery cell of the battery 30. The heat medium flowing out of the battery 30 reaches the ninth connection 26i via the heat-medium switching valve 27.

On the other hand, the heat medium on the other side branched at the tenth connection 26j flows into the heat medium passage 16a of the heat generation equipment 16 via the second heat-medium check valve 22b, absorbs the heat of the heat generation equipment 16, and flows out. The heat medium heated by the heat generation equipment 16 reaches the ninth connection 26i via the second heat-medium three-way valve 21b.

At the ninth connection 26i, the heat medium having passed through the heat-medium switching valve 27 is joined with the heat medium having passed through the second heat-medium three-way valve 21b. The heat medium joined at the ninth connection 26i flows into the radiator 17 and exchanges heat with the outside air. As a result, the heat of the heat medium is dissipated to the outside air. The heat medium flowing out of the radiator 17 is again sucked into the second pump 20b and pumped toward the tenth connection 26j.

As illustrated in FIG. 22, in the sixteenth operation mode, the refrigeration cycle 40 operates in the heating mode, and the circulation path of the heat medium via through the water refrigerant heat exchanger 12, the heater 13, and the heater core 11 is formed Thereby, in the sixteenth operation mode, the vehicle interior can be heated using the refrigerant of the refrigeration cycle 40 and the heat generation part of the heater 13 as heat sources.

According to the sixteenth operation mode, the circulation path of the heat medium via the heat generation equipment 16, the battery 30, and the radiator 17 is formed independently of the circulation path of the heat medium via the water refrigerant heat exchanger 12, the heater 13, and the heater core 11.

Thereby, in the heat management system 1 in the sixteenth operation mode, the heat generation equipment 16 and the battery 30 can be cooled by heat dissipation from the outside air in the radiator 17. Further, since the circulation path of the heat medium related to the heating of the vehicle interior and the circulation path of the heat medium related to the cooling of the heat generation equipment 16 and the battery 30 are independent of each other, the heating of the vehicle interior and the cooling of the heat generation equipment 16 and the battery 30 can each be performed appropriately.

(17) Seventeenth Operation Mode

The battery 30, which is a secondary battery, has a large internal resistance at a low temperature, and hence the input/output characteristics deteriorate. Thus, when the battery 30 is used in an environment where the outside air temperature is low, it is necessary to perform warm-up in order to raise the temperature of the battery 30. The seventeenth operation mode is executed in the heat management system 1 when the battery 30 is warmed up via the heat medium.

In the seventeenth operation mode, the control device 70 operates the first pump 20a with a predetermined pumping capacity and brings the second pump 20b into the stopped state. Also, the control device 70 operates the heater 13 so as to generate heat with a predetermined calorific value. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the third heat-medium three-way valve 21c so as to communicate all of the inflow/outflow port of the water refrigerant heat exchanger 12 on the heat medium passage 12b side, the inflow/outflow port on the first connection 26a side, and the inflow/outflow port on the eighth connection 26h side with each other. Further, the control device 70 controls the operation of the heat-medium switching valve 27 so as to close the heat medium passage of the third connection passage 25c.

In the seventeenth operation mode, the control is performed to reduce the heat dissipation capability of the heater core 11. Specifically, the air mix door 64 in the interior air conditioning unit 60 is operated such that the cold air bypass passage 65 side is fully opened. As a result, the volume of air passing through the heater core 11 can be minimized, so that the amount of heat dissipation in the heater core 11 can be reduced.

Figure 23:
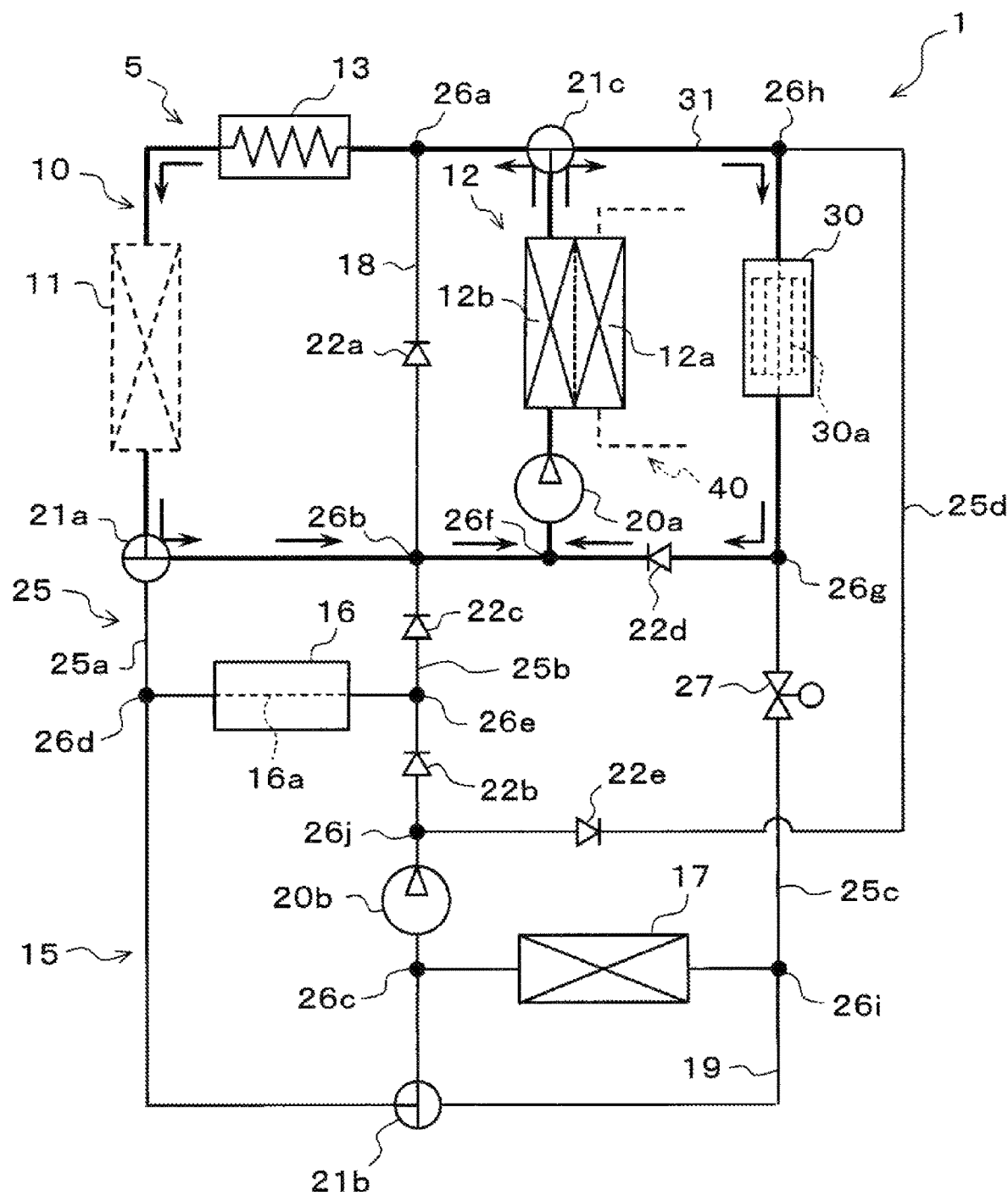
FIG. 23 is an explanatory view of a seventeenth operation mode of the heat management system according to the second embodiment.

In the heat medium circuit 5 in the seventeenth operation mode, the heat medium circulates as indicated by thick arrows in FIG. 23. Specifically, in the seventeenth operation mode, the heat medium circulates through the first pump 20a, the water refrigerant heat exchanger 12, the third heat-medium three-way valve 21c, the heater 13, the heater core 11, the first heat-medium three-way valve 21a, and the first pump 20a in this order. At the same time, the heat medium circulates through the first pump 20a, the water refrigerant heat exchanger 12, the third heat-medium three-way valve 21c, the battery 30, the fourth heat-medium check valve 22d, and the first pump 20a in this order.

That is, in the heat medium circuit 5 in the seventeenth operation mode, a circulation path is formed in which the flow of the heat medium via the heater 13 and the flow of the heat medium via the battery 30 are connected in parallel with respect to the flow of the heat medium passing through the first pump 20a and the water refrigerant heat exchanger 12.

With the circuit configuration of the heat medium circuit 5 in the seventeenth operation mode, the heat medium discharged from the first pump 20a exchanges heat with the high-pressure refrigerant passing through the refrigerant passage 12a of the water refrigerant heat exchanger 12. The heat medium flowing out of the water refrigerant heat exchanger 12 is branched into two flows by the third heat-medium three-way valve 21c.

The heat medium on one side branched by the third heat-medium three-way valve 21c flows into the heating passage of the heater 13 and is heated by the heat generation part. The heat medium flowing out of the heater 13 passes through the heater core 11 with almost no heat dissipation in the heater core 11. The heat medium flowing out of the heater core 11 reaches the sixth connection 26f via the first heat-medium three-way valve 21a.

The heat medium on the other side branched by the third heat-medium three-way valve 21c flows into the heat medium passage 30a of the battery 30. When flowing into the heat medium passage 30a of the battery 30, the heat medium heated by the water refrigerant heat exchanger 12 or the like dissipates heat to each battery cell of the battery 30. As a result, the temperature of the battery 30 in the low-temperature state rises due to heat exchange with the heat medium. The heat medium flowing out of the battery 30 reaches the sixth connection 26f via the fourth heat-medium check valve 22d.

In the sixth connection 26f, the heat medium flowing out of the first heat-medium three-way valve 21a is joined with the heat medium flowing out of the fourth heat-medium check valve 22d. The heat medium joined at the sixth connection 26f is sucked into the first pump 20a again and pumped.

As described above, in the seventeenth operation mode, the temperature of the battery 30 can be raised using the refrigerant of the refrigeration cycle 40 and the heat generation part of the heater 13 as heat sources, and the warm-up of the battery 30 can be realized.

(18) Eighteenth Operation Mode

The eighteenth operation mode is executed by the heat management system 1 in a case where the exterior heat exchanger 43 in the refrigeration cycle 40 is defrosted while the vehicle interior is heated and the battery 30 is cooled.

In the eighteenth operation mode, the control device 70 controls the operations of the first pump 20a, the second pump 20b, the heater 13, the first heat-medium three-way valve 21a, the second heat-medium three-way valve 21b, the third heat-medium three-way valve 21c, and the heat-medium switching valve 27 in the same manner as in the tenth operation mode. The control device 70 operates the refrigeration cycle 40 in the medium-cool mode described above.

Thereby, in the heat medium circuit 5 in the eighteenth operation mode, the heat medium circulates as indicated by thick arrows in FIG. 16. Specifically, in the heat medium circuit 5 in the eighteenth operation mode, the heat medium circulates through the first pump 20a, the water refrigerant heat exchanger 12, the third heat-medium three-way valve 21c, the battery 30, the fourth heat-medium check valve 22d, and the first pump 20a in this order.

At the same time, the heat medium circulates through the second pump 20b, the second heat-medium check valve 22b, the third heat-medium check valve 22c, the first heat-medium check valve 22a, the heater 13, the heater core 11, the first heat-medium three-way valve 21a, the second heat-medium three-way valve 21b, and the second pump 20b in this order. Further, the heat medium circulates through the second pump 20b, the second heat-medium check valve 22b, the heat generation equipment 16, the second heat-medium three-way valve 21b, and the second pump 20b in this order.

In the circulation path of the heat medium on the second pump 20b side in the eighteenth operation mode, the heat medium is heated by the heat generation part when passing through the heating passage of the heater 13. Further, when passing through the heat medium passage 30a of the heat generation equipment 16, the heat medium is heated by the waste heat of the heat generation equipment 16.

The heat medium heated by the heater 13 and the heat generation equipment 16 radiates the heat of the heat medium to the ventilation air when passing through the heater core 11. That is, in the eighteenth operation mode, the vehicle interior can be heated using the waste heat of the heat generation part of the heater 13 and the heat generation equipment 16 as heat sources.

In the circulation path of the heat medium on the first pump 20a side in the eighteenth operation mode, the heat medium exchanges heat with each battery cell of the battery 30 and is warmed when passing through the heat medium passage 30a of the battery 30. The heat medium warmed by battery 30 exchanges heat with the low-pressure refrigerant passing through the refrigerant passage 12a when passing through the heat medium passage 30a of the water refrigerant heat exchanger 12. That is, in the eighteenth operation mode, the heat of the battery 30 is absorbed by the low-pressure refrigerant of the refrigeration cycle 40 via the heat medium.

In the eighteenth operation mode, with the refrigeration cycle 40 operating in the medium-cool mode, heat absorbed by the water refrigerant heat exchanger 12 is supplied to the exterior heat exchanger 43 along with circulation of the refrigerant as indicated by hatched arrows in FIG. 2. As a result, the frost adhering to the surface of the exterior heat exchanger 43 is melted by the heat derived from the battery 30.

That is, according to the heat management system 1 in the eighteenth operation mode, it is possible to realize the defrosting of the exterior heat exchanger 43 by using the heat of the battery 30, and it is possible to reduce a decrease in the heating capacity of the refrigeration cycle 40.

In the eighteenth operation mode, the circulation path of the heat medium via the heater 13, the heat generation equipment 16, and the heater core 11 is formed independently of the circulation path of the heat medium for defrosting in the exterior heat exchanger 43. Therefore, according to the eighteenth operation mode, the defrosting of the exterior heat exchanger 43 and the heating of the vehicle interior using the waste heat of the heat generation equipment and the like can be performed in parallel.

As described above, according to the heat management system 1 of the second embodiment, as in the first embodiment described above, it is possible to obtain the function effects exhibited from the configuration and operation common to the first embodiment. That is, the heat management system 1 according to the second embodiment can exert the effects generated in the first to seventh operation modes described above.

According to the heat management system 1 of the second embodiment, as in the eighth to tenth operation modes, the heater core 11 can be made independent of the circulation path of the heat medium via the water refrigerant heat exchanger 12 and the heat medium passage 30a of the battery 30 with respect to the flow of the heat medium.

Thereby, the heat management system 1 can independently perform the heating of the vehicle interior using the heater core 11 in response to the temperature adjustment of the battery 30 using the refrigeration cycle 40.

According to the heat management system 1 of the second embodiment, as in the tenth operation mode, it is possible to form the circulation path of the heat medium via the heater core 11 and the heat generation equipment 16 independently of the circulation path of the heat medium via the water refrigerant heat exchanger 12 and the battery 30.

As a result, the heat management system 1 can independently and parallelly perform the temperature adjustment of the battery 30 using the refrigeration cycle 40 and the heating of the vehicle interior using the waste heat of the heat generation equipment 16.

According to the heat management system 1 of the second embodiment, as in the ninth operation mode, the circulation path of the heat medium via the heater core 11, the heat generation equipment 16, and the radiator 17 can be formed independently of the circulation path of the heat medium via the water refrigerant heat exchanger 12 and the battery 30.

Thereby, when the temperature adjustment of the battery 30 using the refrigeration cycle 40 and the heating of the vehicle interior using the waste heat of the heat generation equipment 16 are performed in parallel, the heat management system 1 can dissipate excessive heat from the heat generation equipment 16 to the outside air. Therefore, when the heating of the vehicle interior is performed using the waste heat of the heat generation equipment 16, it is possible to achieve both comfort due to the heating of the vehicle interior and appropriate temperature adjustment of the heat generation equipment 16.

According to the heat management system 1 of the second embodiment, as in the eleventh to sixteenth operation modes, regarding the flow of the heat medium, the heat medium passage 30a of the battery 30 can be made independent of the circulation path of the heat medium via the water refrigerant heat exchanger 12 and the heater core 11.

Thereby, the heat management system 1 can independently adjust the temperature of the battery 30 with respect to the heating of the vehicle interior using the refrigeration cycle 40.

In the heat management system 1 according to the second embodiment, as in the eleventh, twelfth, and fourteenth to sixteenth operation modes, the circulation path via the battery 30 and the radiator 17 is formed independently of the circulation path of the heat medium via the water refrigerant heat exchanger 12 and the heater core 11.

As a result, the heat management system 1 according to the second embodiment can independently and parallelly perform the heating of the vehicle interior using the refrigeration cycle 40 and the temperature adjustment of the battery 30 by heat radiation to the outside air.

According to the heat management system 1, as in the twelfth and sixteenth operation modes, the circulation path of the heat medium via the battery 30, the radiator 17, and the heat generation equipment 16 can be formed independently of the circulation path of the heat medium via the water refrigerant heat exchanger 12 and the heater core 11.

As a result, the heat management system 1 according to the second embodiment can independently and parallelly perform the heating of the vehicle interior using the refrigeration cycle 40 and the temperature adjustment of the heat generation equipment 16 and the battery 30 by heat radiation to the outside air.

According to the heat management system 1, as in the thirteenth operation mode, the inflow and outflow of the heat medium to and from the heat medium passage 30a of the battery 30 can be restricted independently of the circulation path of the heat medium via the water refrigerant heat exchanger 12 and the heater core 11.

Thereby, when the vehicle interior is heated by the refrigeration cycle 40, the heat management system 1 according to the second embodiment can reduce the influence of the temperature change of the heat medium due to the heating of the vehicle interior on the battery 30.

Third Embodiment

Next, a heat management system 1 according to a third embodiment will be described with reference to FIG. 24. The heat management system 1 according to the third embodiment has the same basic configuration as the heat management system 1 according to the second embodiment and further includes a radiator switching valve 28.

Figure 24:
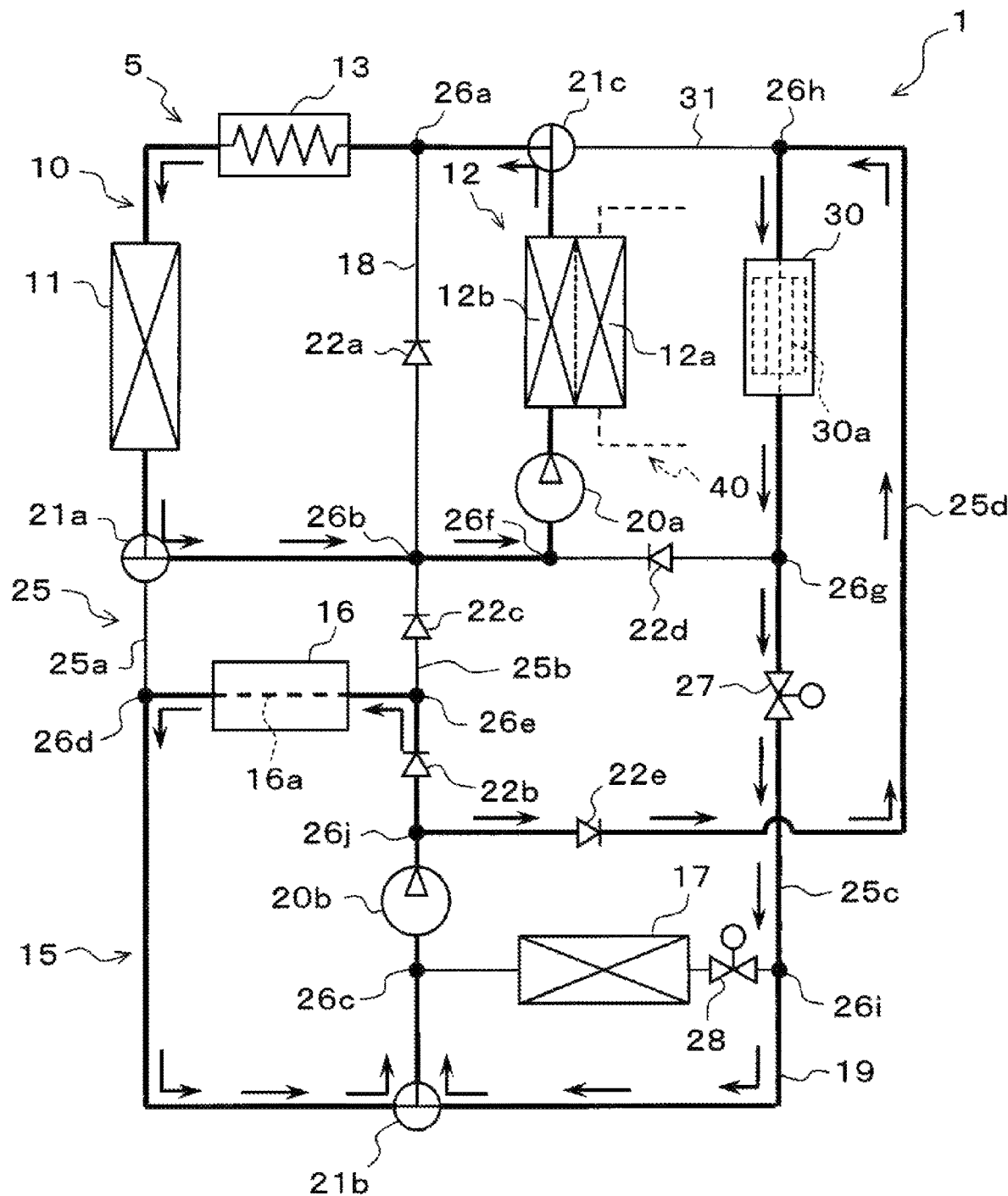
FIG. 24 is an explanatory view of a nineteenth operation mode of the heat management system according to a third embodiment.

As illustrated in FIG. 24, the radiator switching valve 28 is disposed in a heat medium pipe between the ninth connection 26i and the heat medium inlet of the radiator 17. The radiator switching valve 28 switches whether the heat medium flows in or out of the radiator 17 by opening or closing the heat medium passage between the ninth connection 26i and the heat medium inlet of the radiator 17.

The radiator switching valve 28 is an electromagnetic valve with its operation controlled by a control voltage output from the control device 70. Thus, in the third embodiment, the radiator switching valve 28 constitutes a part of a circuit switching part that switches the circuit configuration of the heat medium circuit 5.

The heat-medium-circuit switching control part 70c according to the third embodiment is configured to control the operations of the first heat-medium three-way valve 21a, the second heat-medium three-way valve 21b, the third heat-medium three-way valve 21c, the heat-medium switching valve 27, and the radiator switching valve 28 which are circuit switching parts in the control device 70.

As described above, the heat management system 1 according to the third embodiment is obtained by adding the radiator switching valve 28 to the heat medium circuit 5 of the second embodiment described above. Hence, the heat management system 1 according to the third embodiment can realize the first to eighteenth operation modes described above. In the heat management system 1 according to the third embodiment, it is possible to further realize a nineteenth operation mode by controlling the operation of the radiator switching valve 28.

(19) Nineteenth Operation Mode

The nineteenth operation mode is executed by the heat management system 1 in a case where the vehicle interior is heated and the temperature drop of the heat generation equipment 16 and the battery 30 is reduced, for example, in winter (the outside air temperature is 10° C. or lower).

In the nineteenth operation mode, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the heating mode described above.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side.

Then, the control device 70 controls the operation of the second heat-medium three-way valve 21b so as to communicate all of the inflow/outflow port on the third connection 26c side, the inflow/outflow port on the fourth connection 26d side, and the inflow/outflow port on the radiator 17 side with each other.

Also, the control device 70 controls the operation of the third heat-medium three-way valve 21c so as to communicate the inflow/outflow port of the water refrigerant heat exchanger 12 on the heat medium passage 12b side with the inflow/outflow port on the first connection 26a side and to close the inflow/outflow port on the eighth connection 26h side.

Further, the control device 70 controls the operation of the heat-medium switching valve 27 so as to open the heat medium passage of the third connection passage 25c. Then, the control device 70 controls the operation of the radiator switching valve 28 so as to close the heat medium passage between the ninth connection 26i and the inflow port of the radiator 17.

Thereby, in the heat medium circuit 5 in the nineteenth operation mode, the heat medium circulates as indicated by thick arrows in FIG. 24. Specifically, in the nineteenth operation mode, the heat medium circulates through the first pump 20a, the water refrigerant heat exchanger 12, the third heat-medium three-way valve 21c, the heater 13, the heater core 11, the first heat-medium three-way valve 21a, and the first pump 20a in this order.

At the same time, the heat medium circulates through the second pump 20b, the fifth heat-medium check valve 22e, the battery 30, the heat-medium switching valve 27, the second heat-medium three-way valve 21b, and the second pump 20b in this order. Further, the heat medium circulates through the second pump 20b, the second heat-medium check valve 22b, the heat generation equipment 16, the second heat-medium three-way valve 21b, and the second pump 20b in this order.

That is, in the heat medium circuit 5 in the nineteenth operation mode, the circulation path of the heat medium via the water refrigerant heat exchanger 12 and the heater core 11 and the circulation path of the heat medium via the battery 30 and the heat generation equipment 16 are formed independently.

In the circulation path of the heat medium discharged by the second pump 20b, a circulation path is formed in which the flow of the heat medium passing through the battery 30 and the flow of the heat medium passing through the heat generation equipment 16 are connected in parallel with respect to the flow of the heat medium passing through the second pump 20b.

With the circuit configuration of the heat medium circuit 5 in the nineteenth operation mode, the heat medium discharged from the first pump 20a exchanges heat with the high-pressure refrigerant passing through the refrigerant passage 12a of the water refrigerant heat exchanger 12.

The heat medium flowing out of the water refrigerant heat exchanger 12 flows into the heating passage of the heater 13 via the third heat-medium three-way valve 21c and is heated by the heat generation part. The heat medium flowing out of the heater 13 flows into the heater core 11 and exchanges heat with the ventilation air blown by the interior blower 62 to heat the ventilation air.

The heat medium flowing out of the heater core 11 is again sucked into the first pump 20a via the first heat-medium three-way valve 21a and pumped. As described above, in the nineteenth operation mode, the vehicle interior can be heated using the refrigerant of the refrigeration cycle 40 and the heat generation part of the heater 13 as heat sources.

The heat medium discharged from the second pump 20b is branched into two flows at tenth connection 26j. The heat medium on one side branched at the tenth connection 26j flows into the heat medium passage 30a of the battery 30 via the fifth heat-medium check valve 22e and absorbs heat from each battery cell of the battery 30. The heat medium flowing out of the battery 30 flows into the second heat-medium three-way valve 21b via the heat-medium switching valve 27.

On the other hand, the heat medium on the other side branched at the tenth connection 26j flows into the heat medium passage 16a of the heat generation equipment 16 via the second heat-medium check valve 22b, absorbs the heat of the heat generation equipment 16, and flows out. The heat medium heated by the heat generation equipment 16 flows into the second heat-medium three-way valve 21b. That is, the two flows of the heat medium branched at the tenth connection 26j are joined at the second heat-medium three-way valve 21b and sucked into the second pump 20b again.

As illustrated in FIG. 24, in the nineteenth operation mode, the refrigeration cycle 40 operates in the heating mode, and the circulation path of the heat medium via the water refrigerant heat exchanger 12, the heater 13, and the heater core 11 is formed. Thereby, in the nineteenth operation mode, the vehicle interior can be heated using the refrigerant of the refrigeration cycle 40 and the heat generation part of the heater 13 as heat sources.

According to the nineteenth operation mode, the circulation path of the heat medium via the heat generation equipment 16 and the battery 30 is formed independently of the circulation path of the heat medium via the water refrigerant heat exchanger 12, the heater 13, and the heater core 11.

As a result, in the heat management system 1 in the nineteenth operation mode, the heat medium circulated by the second pump 20b continuously circulates while absorbing heat from the heat generation equipment 16 and the battery 30. Hence, it is possible to store the waste heat of the heat generation equipment 16 and the battery 30 in the circulating heat medium in a low-temperature environment such as winter (the outside air temperature is 10° C. or lower).

Therefore, according to the heat management system 1 in the nineteenth operation mode, it is possible to reduce the temperature drop of the heat generation equipment 16 and the battery 30 and maintain the heat generation equipment 16 and the battery 30 in a proper temperature range.

Further, the circulation path of the heat medium related to the heating of the vehicle interior and the circulation path of the heat medium related to the cooling of the heat generation equipment 16 and the battery 30 are independent of each other, so that the heating of the vehicle interior and the temperature maintenance of the heat generation equipment 16 and the battery 30 can each be performed appropriately.

As described above, according to the heat management system 1 of the third embodiment, even when the radiator switching valve 28 is disposed between the radiator 17 and the ninth connection 26i, it is possible to similarly obtain the function effects exhibited from the configuration and operation common to the second embodiment described above.

According to the heat management system 1 of the third embodiment, as illustrated in FIG. 24, as in the nineteenth operation mode, the circulation path via the battery 30 and the heat generation equipment 16 is formed independently of the circulation path of the heat medium via the water refrigerant heat exchanger 12 and the heater core 11.

As a result, the heat management system 1 according to the third embodiment can independently and parallelly perform the heating of the vehicle interior using the refrigeration cycle 40 and the prevention of temperature decrease of the radiator 17 and the battery 30 using heat stored in the heat medium.

Fourth Embodiment

Subsequently, a heat management system 1 according to a fourth embodiment will be described with reference to FIG. 25. The heat management system 1 according to the fourth embodiment has the same basic configuration as the heat management system 1 according to the first embodiment and adopts a water-cooling capacitor 91 and a chiller 92 instead of the water refrigerant heat exchanger 12 according to the first embodiment.

In the refrigeration cycle 40 according to the first embodiment, as illustrated in FIGS. 2 and 5, one water refrigerant heat exchanger 12 functions as a radiator or a heat absorber by switching the circuit configuration of the refrigeration cycle 40.

In this regard, in the refrigeration cycle 40 according to the fourth embodiment, although not illustrated, the water-cooling capacitor 91 functioning as a radiator and the chiller 92 functioning as a heat absorber are disposed individually. The refrigeration cycle 40 according to the fourth embodiment can selectively cause the water-cooling capacitor 91 and the chiller 92 to function by switching the circuit configuration.

The water-cooling capacitor 91 is formed of a water refrigerant heat exchanger and includes a refrigerant passage 91a through which the high-pressure refrigerant of the refrigeration cycle 40 passes and a heat medium passage 91b through which the heat medium circulating in the heat medium circuit 5 passes. Thus, the water-cooling capacitor 91 radiates the heat of the high-pressure refrigerant passing through the refrigerant passage 91a to the heat medium passing through the heat medium passage 91b to heat the heat medium.

The chiller 92 is formed of a water refrigerant heat exchanger and includes a refrigerant passage 92a through which the low-pressure refrigerant of the refrigeration cycle 40 passes and a heat medium passage 92b through which the heat medium circulating in the heat medium circuit 5 passes. The chiller 92 causes the low-pressure refrigerant passing through the refrigerant passage 92a to absorb heat from the heat medium passing through the heat medium passage 92b, thereby cooling the heat medium.

Figure 25:
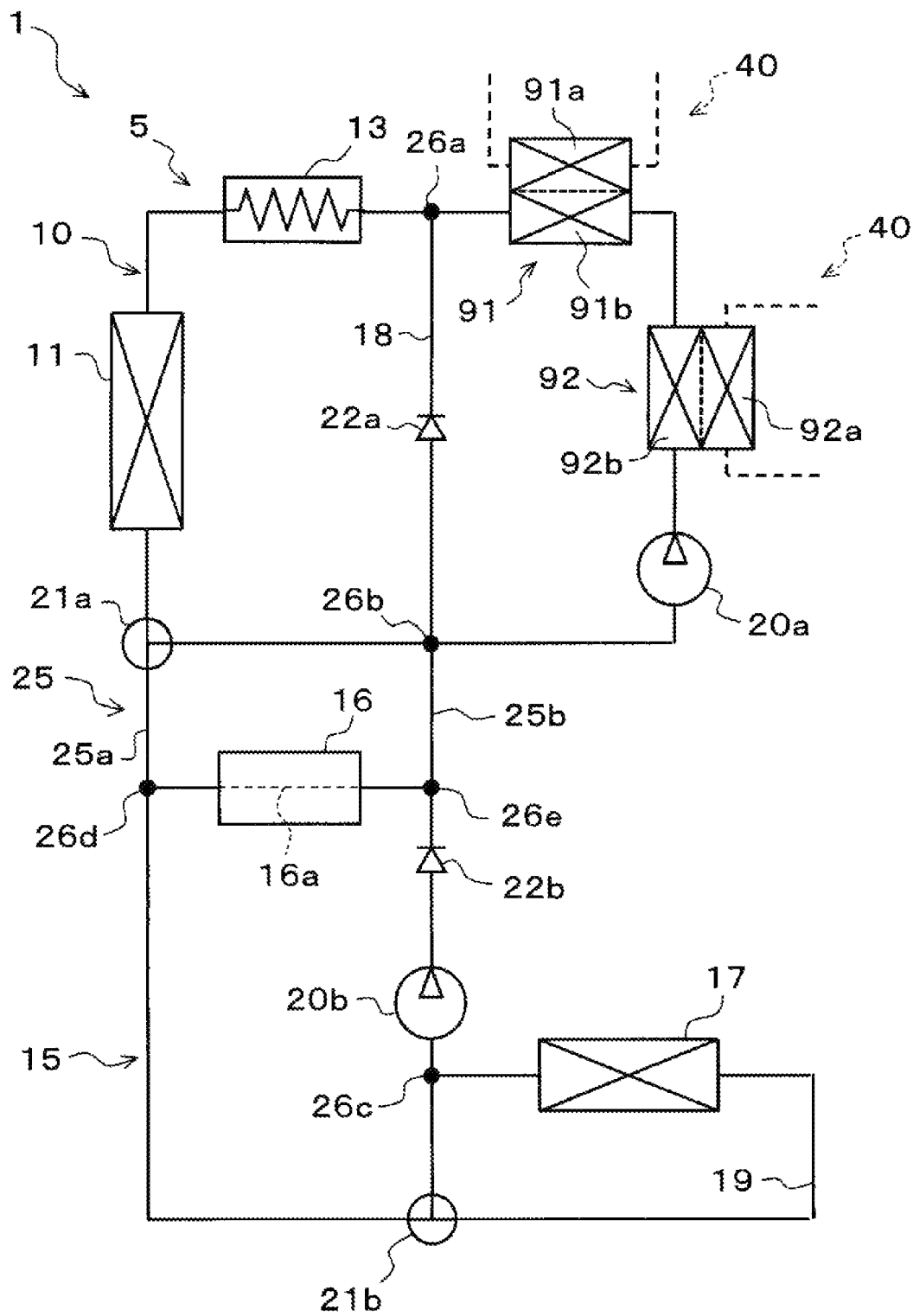
FIG. 25 is an overall configuration diagram of a heat management system according to a fourth embodiment.

As illustrated in FIG. 25, the heat medium circuit 5 in the fourth embodiment is configured by disposing the water-cooling capacitor 91 and the chiller 92 instead of the water refrigerant heat exchanger 12 of the heat medium circuit 5 in the first embodiment.

Specifically, the discharge port of the first pump 20a is connected to the heat medium inlet side of the heat medium passage 91b of the water-cooling capacitor 91. The heat medium inlet side of the heat medium passage 92b in the chiller 92 is connected to the heat medium outlet side of the heat medium passage 91b in the water-cooling capacitor 91. The heat medium outlet side of the heat medium passage 92b in the chiller 92 is connected to the heat medium pipe on the first connection 26a side.

As illustrated in FIG. 25, as in the first embodiment, the heat management system 1 according to the fourth embodiment can realize the first to seventh operation modes by switching the circuit configurations of the heat medium circuit 5 and the refrigeration cycle 40.

As described above, according to the heat management system 1 of the fourth embodiment, even when the water-cooling capacitor 91 and the chiller 92 are adopted, it is possible to obtain, as in the first embodiment described above, the function effects exhibited from the configuration and operation common to the first embodiment.

Fifth Embodiment

Next, a heat management system 1 according to a fifth embodiment will be described with reference to FIG. 26. The heat management system 1 according to the fifth embodiment has the same basic configuration as the heat management system 1 according to the second embodiment and adopts the water-cooling capacitor 91 and the chiller 92 instead of the water refrigerant heat exchanger 12 according to the second embodiment.

The water-cooling capacitor 91 and the chiller 92 according to the fifth embodiment are configured as in the fourth embodiment. The refrigeration cycle 40 according to the fifth embodiment can selectively cause the water-cooling capacitor 91 and the chiller 92 to function by switching the circuit configuration.

Figure 26:
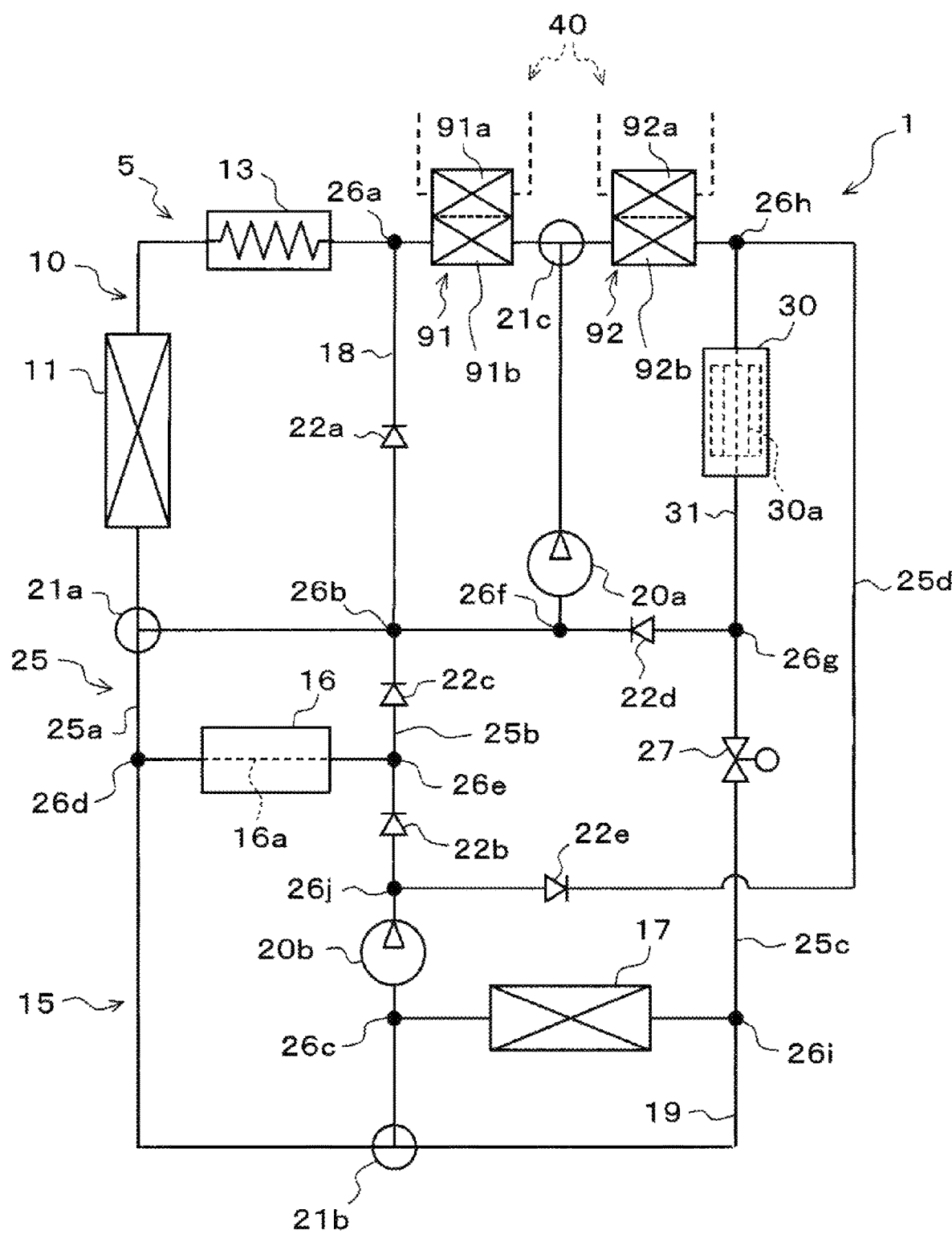
FIG. 26 is an overall configuration diagram of a heat management system according to a fifth embodiment.

As illustrated in FIG. 26, in the heat medium circuit 5 according to the fifth embodiment, the heat medium inlet side of the heat medium passage 91b in the water-cooling capacitor 91 is connected to one side of the outflow port in the third heat-medium three-way valve 21c. The heat medium outlet side of the heat medium passage 91b in the water-cooling capacitor 91 is connected to the heat medium pipe on the first connection 26a side.

The heat medium inlet side of the heat medium passage 92b in the chiller 92 is connected to the other side of the outflow port in the third heat-medium three-way valve 21c. The heat medium outlet side of the heat medium passage 92b in the chiller 92 is connected to the heat medium pipe on the eighth connection 26h side.

As illustrated in FIG. 26, as in the second embodiment, the heat management system 1 according to the fifth embodiment can realize the first to eighteenth operation modes by switching the circuit configurations of the heat medium circuit 5 and the refrigeration cycle 40.

As described above, according to the heat management system 1 of the fifth embodiment, even when the water-cooling capacitor 91 and the chiller 92 are adopted, it is possible to obtain, as in the second and third embodiments described above, the function effects exhibited from the configuration and operation common to the second and third embodiments.

Sixth Embodiment

Subsequently, a heat management system 1 according to a sixth embodiment will be described with reference to FIG. 27. The heat management system 1 according to the sixth embodiment is configured as in the fifth embodiment except for the placement of the water-cooling capacitor 91 and the chiller 92 in the heat medium circuit 5. Thus, the description of other configurations will be omitted, and differences from the fifth embodiment will be described.

In the heat medium circuit 5 according to the sixth embodiment, the heat medium inlet side of the heat medium passage 91b in the water-cooling capacitor 91 is connected to the heat medium pipe on the first connection 26a side. The heat medium outlet side of the heat medium passage 91b in the water-cooling capacitor 91 is connected to the inlet side of the heating passage in the heater 13.

The chiller 92 in the heat medium circuit 5 according to the sixth embodiment is disposed between the third heat-medium three-way valve 21c and the eighth connection 26h as in the fifth embodiment.

Figure 27:
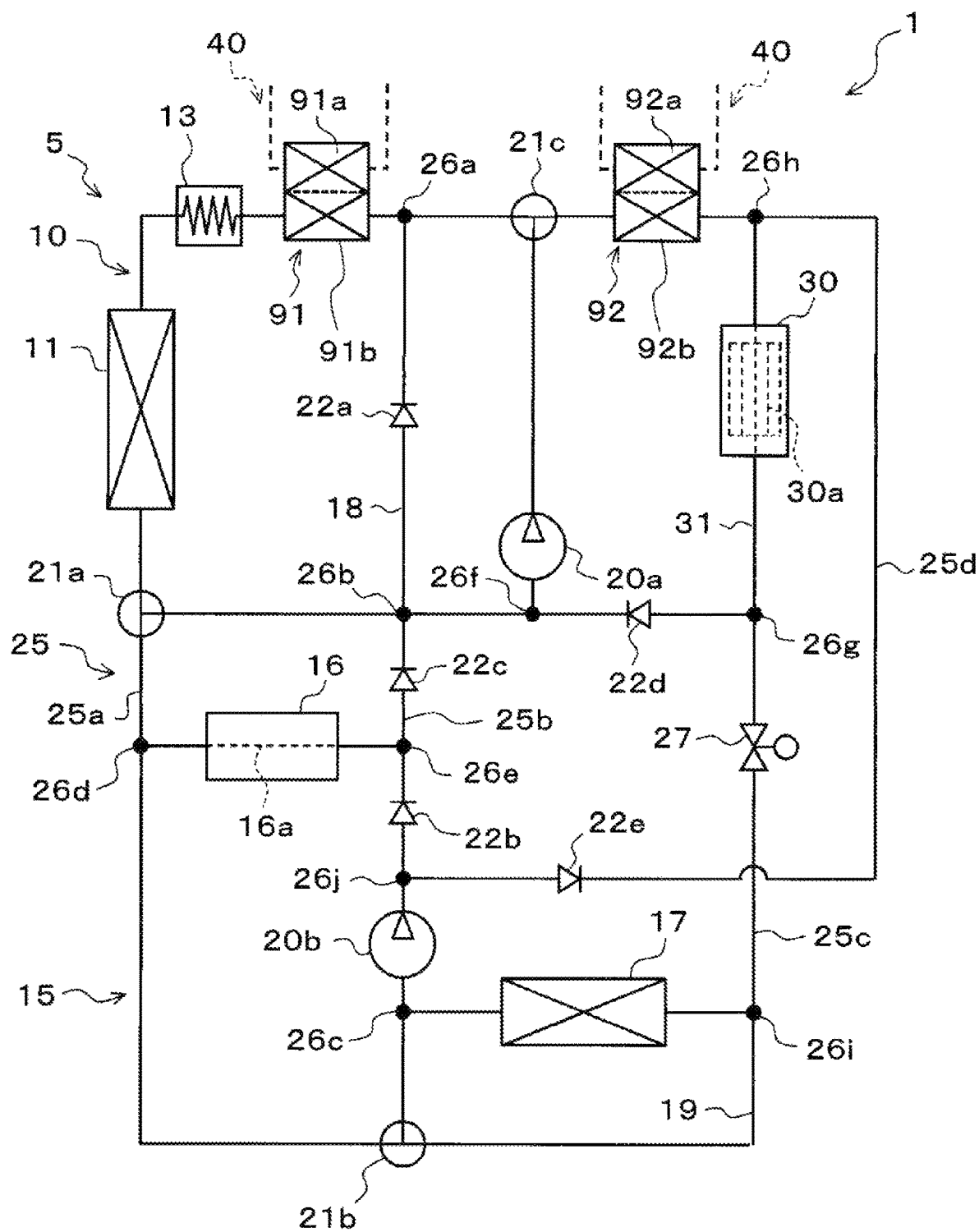
FIG. 27 is an overall configuration diagram of a heat management system according to a sixth embodiment.

As illustrated in FIG. 27, as in the second, third, and fifth embodiments, the heat management system 1 according to the sixth embodiment can realize the first to eighteenth operation modes by switching the circuit configurations of the heat medium circuit 5 and the refrigeration cycle 40.

As described above, according to the heat management system 1 of the sixth embodiment, even when the placement of the water-cooling capacitor 91 and the chiller 92 is changed, it is possible to obtain the function effects exhibited from the configuration and operation common to the second, third, and fifth embodiments in the same manner as in the embodiments described above.

Seventh Embodiment

Next, a heat management system 1 according to a seventh embodiment will be described with reference to FIG. 28. The heat management system 1 according to the seventh embodiment has the same basic configuration as the heat management system 1 according to the first embodiment and differs from in the connection form or the like of a first connection passage 25a and a second connection passage 25b. Hereinafter, differences from the first embodiment will be described specifically.

Figure 28:
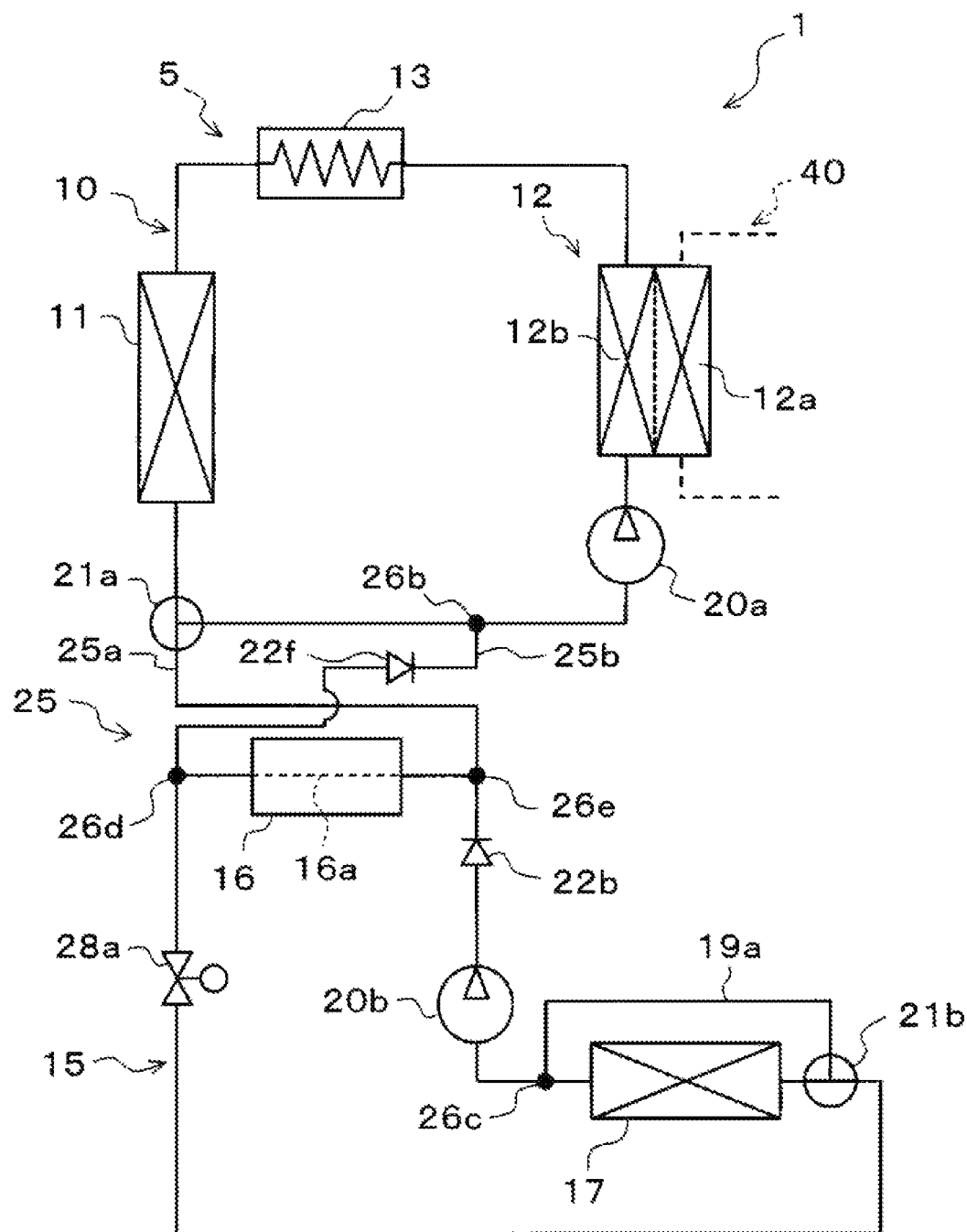
FIG. 28 is an overall configuration diagram of a heat management system according to a seventh embodiment.

As illustrated in FIG. 28, in the high-temperature heat medium circuit 10 in the seventh embodiment, the bypass passage 18 connecting the first connection 26a and the second connection 26b is removed. In addition, the first heat-medium check valve 22a is also removed together with the bypass passage 18. The high-temperature heat medium circuit 10 of the seventh embodiment has a similar configuration to that of the first embodiment except that the bypass passage 18 and the first heat-medium check valve 22a are not provided.

In the low-temperature heat medium circuit 15 according to the seventh embodiment, a low-temperature-side switching valve 28a is disposed between the fourth connection 26d and one inflow/outflow port of the second heat-medium three-way valve 21b. The low-temperature-side switching valve 28a is configured as in the heat-medium switching valve 27 and switches the presence or absence of the flow of the heat medium between the fourth connection 26d and the second heat-medium three-way valve 21b. Therefore, the low-temperature-side switching valve 28a constitutes a part of the circuit switching part.

One inflow/outflow port of the second heat-medium three-way valve 21b is connected to the other side of the low-temperature-side switching valve 28a. The other inflow/outflow port of the second heat-medium three-way valve 21b is connected to the heat medium inlet side of the radiator 17. A detour passage 19a is connected to the other inflow/outflow port of the second heat-medium three-way valve 21b. The detour passage 19a is a heat medium passage for causing the flow of the heat medium having passed through the second heat-medium three-way valve 21b to detour around the radiator 17. The other end side of the detour passage 19a is connected to the third connection 26c as in the first embodiment.

Next, the circuit connection part 25 in the seventh embodiment will be described. As in the first embodiment, the circuit connection part 25 in the seventh embodiment includes the first connection passage 25a and the second connection 26b. As illustrated in FIG. 28, one end portion of the first connection passage 25a is connected to one inflow/outflow port of the first heat-medium three-way valve 21a as in the first embodiment. The other end side of the first connection passage 25a is connected to the fifth connection 26e of the low-temperature heat medium circuit 15.

One end portion of the second connection passage 25b according to the seventh embodiment is connected to the second connection 26b as in the first embodiment. The other end side of the second connection passage 25b is connected to the fourth connection 26d of the low-temperature heat medium circuit 15.

Further, a sixth heat-medium check valve 22f is disposed in the second connection passage 25b. The sixth heat-medium check valve 22f allows the heat medium to flow from the fourth connection 26d side to the second connection 26b side and prohibits the heat medium from flowing from the second connection 26b side to the fourth connection 26d side.

According to the heat management system 1 of the seventh embodiment configured as illustrated in FIG. 28, as in the first embodiment described above, the first operation mode to the seventh operation mode can be realized. Here, as a specific example of the operation mode in the seventh embodiment, the operation of each component in the second operation mode and the fourth operation mode will be described.

First, the second operation mode according to the seventh embodiment will be described. As in the first embodiment, the second operation mode is an operation mode executed in a case where a total amount of waste heat generated in the heat generation equipment 16 and a heat radiation amount in the water refrigerant heat exchanger 12 is equal to or smaller than a heating required amount of heat set by the user, for example, in spring, autumn, or the like.

In the second operation mode according to the seventh embodiment as well, the control device 70 operates the first pump 20a and brings the second pump 20b into the stopped state. The control device 70 stops the heater 13 to operate the refrigeration cycle 40 in the dehumidifying and heating mode.

The control device 70 controls the operation of the first heat-medium three-way valve 21a so as to communicate the inflow/outflow port on the heater core 11 side with the inflow/outflow port on the first connection passage 25a side and to close the inflow/outflow port on the second connection 26b side. Further, the control device 70 switches the low-temperature-side switching valve 28a to the closed state.

Thereby, in the second operation mode according to the seventh embodiment, the heat medium circulates through the heat medium circuit 5. Specifically, in the heat medium circuit 5 in the second operation mode, the heat medium circulates through the first pump 20a, the water refrigerant heat exchanger 12, the heater 13, the heater core 11, the first heat-medium three-way valve 21a, the heat generation equipment 16, the sixth heat-medium check valve 22f, and the first pump 20a in this order. Therefore, the second operation mode in the seventh embodiment can exert the same effect as the second operation mode in the first embodiment.

In the second operation mode according to the seventh embodiment, the flow of the heat medium flowing into the first pump 20a from the first heat-medium three-way valve 21a via the heat generation equipment 16 differs from that in the second operation mode of the first embodiment.

Specifically, in the seventh embodiment, the heat medium flowing out of the first heat-medium three-way valve 21a flows into the heat medium passage 16a of the heat generation equipment 16 via the first connection passage 25a and the fifth connection 26e. The heat medium flowing out of the heat medium passage 16a of the heat generation equipment 16 flows into the second connection passage 25b via the fourth connection 26d. The heat medium flowing through the second connection passage 25b is again sucked into the first pump 20a via the sixth heat-medium check valve 22f and the second connection 26b.

Next, a fourth operation mode according to the seventh embodiment will be described. As in the first embodiment, the fourth operation mode is an operation mode executed when the temperature of the heat medium circulating in the heat medium circuit 5 becomes equal to or higher than a predetermined first reference water temperature (e.g., 60° C.), for example, in spring, autumn (the outside air temperature is 10° C. to 25° C.), or the like.

In the fourth operation mode according to the seventh embodiment as well, the control device 70 operates the first pump 20a and the second pump 20b with respective predetermined pumping capacities. The control device 70 stops the heater 13 to operate the refrigeration cycle 40 in the dehumidifying and heating mode.

The control device 70 controls the operation of the first heat-medium three-way valve 21a so as to communicate the inflow/outflow port on the heater core 11 side with the inflow/outflow port on the second connection 26b side and to close the inflow/outflow port on the first connection passage 25a side. Further, the control device 70 switches the low-temperature-side switching valve 28a to the open state.

Then, the control device 70 controls the operation of the second heat-medium three-way valve 21b so as to communicate the inflow/outflow port on the low-temperature-side switching valve 28a side with the inflow/outflow port on the radiator 17 side and to close the inflow/outflow port on the detour passage 19a side.

Thereby, in the fourth operation mode according to the seventh embodiment, the heat medium circulates through the heat medium circuit 5. Specifically, in the heat medium circuit 5 in the fourth operation mode according to the seventh embodiment, the heat medium circulates through the first pump 20a, the water refrigerant heat exchanger 12, the heater 13, the heater core 11, the first heat-medium three-way valve 21a, and the first pump 20a in this order. At the same time, the heat medium circulates through the second pump 20b, the second heat-medium check valve 22b, the heat generation equipment 16, the low-temperature-side switching valve 28a, the second heat-medium three-way valve 21b, the radiator 17, and the second pump 20b in this order.

Here, in the heat medium circuit 5 in the fourth operation mode according to the seventh embodiment, attention is paid to the flow of the heat medium passing through the heat generation equipment 16. The heat medium flowing out of the second heat-medium check valve 22b flows into the heat medium passage 16a of the heat generation equipment 16 via the fifth connection 26e. The heat medium flowing out of the heat medium passage 16a of the heat generation equipment 16 flows into the low-temperature-side switching valve 28a via the fourth connection 26d.

As illustrated in FIG. 7, in the second operation mode of the first embodiment, the heat medium passing through the heat generation equipment 16 flows from the fourth connection 26d side toward the fifth connection 26e side. As illustrated in FIG. 9, in the fourth operation mode of the first embodiment, the heat medium passing through the heat generation equipment 16 flows from the fifth connection 26e side toward the fourth connection 26d side.

That is, in the heat management system 1 of the first embodiment, there has been a case where at the time of switching the operation mode, the direction of the flow of the heat medium passing through the heat medium passage 16a of the heat generation equipment 16 changes. It is assumed that due to the change in the direction of the flow of the heat medium passing through the heat generation equipment 16, the flow of the heat medium in the vicinity of the heat generation equipment 16 is delayed, and the temperature adjustment of the heat generation equipment 16 and the like are affected.

In this regard, in the heat management system 1 according to the seventh embodiment, as described using the second operation mode and the fourth operation mode, the direction of the flow of the heat medium passing through the heat generation equipment 16 is unified in the direction from the fifth connection 26e side toward the fourth connection 26d side. Thus, according to the heat management system 1 of the seventh embodiment, by unifying the direction of the flow of the heat medium around the heat generation equipment 16, the smooth circulation of the heat medium can be realized even when the operation mode is switched.

As described above, according to the heat management system 1 of the seventh embodiment, even when the configuration of the circuit connection part 25 is changed, it is possible to obtain the function effects exhibited from the configuration and operation common to the first and fourth embodiments in the same manner as in the embodiments described above.

Eighth Embodiment

Subsequently, a heat management system 1 according to an eighth embodiment will be described with reference to FIG. 29. The heat management system 1 according to the eighth embodiment has the same basic configuration as the heat management system 1 according to the second embodiment and differs in the connection forms of the bypass passage 18, the first connection passage 25a, and the second connection passage 25b. Hereinafter, differences from the second embodiment will be described specifically.

Figure 29:
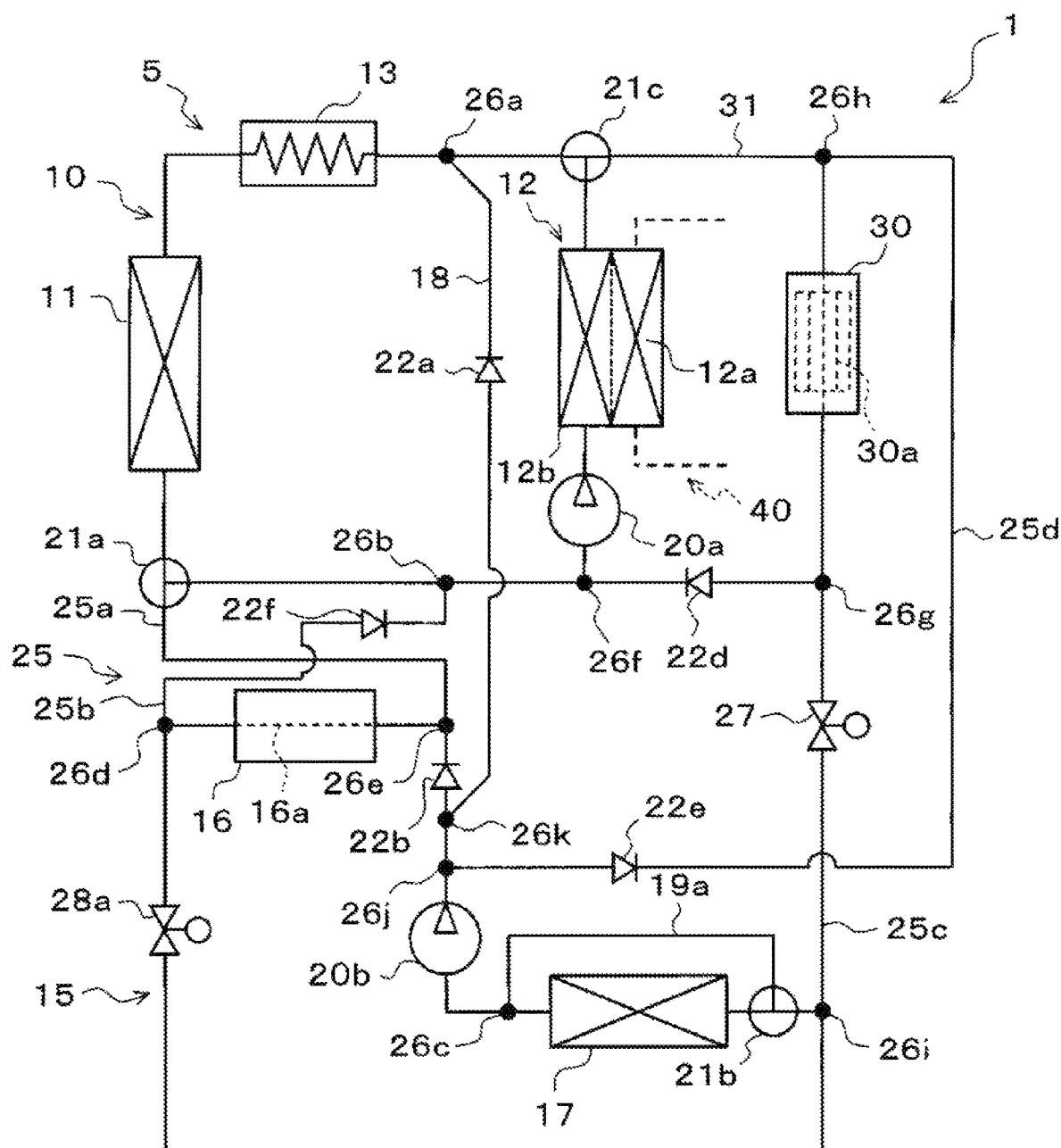
FIG. 29 is an overall configuration diagram of a heat management system according to an eighth embodiment.

As illustrated in FIG. 29, in the low-temperature heat medium circuit 15 according to the eighth embodiment, the second heat-medium three-way valve 21b is disposed in the heat medium passage connecting the heat medium inlet side of the radiator 17 and a ninth connection 26i. One inflow/outflow port of the second heat-medium three-way valve 21b is connected to the ninth connection 26i, and the other inflow/outflow port of the second heat-medium three-way valve 21b is connected to the heat medium inlet of the radiator 17. Another inflow/outflow port of the second heat-medium three-way valve 21b is connected to the third connection 26c via the detour passage 19a.

In the low-temperature heat medium circuit 15 of the eighth embodiment, the low-temperature-side switching valve 28a is disposed in the heat medium passage connecting the fourth connection 26d and the ninth connection 26i. The low-temperature-side switching valve 28a has a similar configuration to that of the seventh embodiment.

In the low-temperature heat medium circuit 15 according to the eighth embodiment, an eleventh connection 26k is disposed in the heat medium passage connecting the tenth connection 26j and the inflow port side of the second heat-medium check valve 22b. The other end side of the bypass passage 18 is connected to the eleventh connection 26k.

One end side of the bypass passage 18 is connected to the first connection 26a. The bypass passage 18 in the eighth embodiment includes the first heat-medium check valve 22a as in the second embodiment but differs in not being connected to the heat medium passage connecting the second connection 26b and the sixth connection 26f.

The heat management system 1 according to the eighth embodiment differs from that of the second embodiment in terms of the configuration of the circuit connection part 25. As in the seventh embodiment, one end portion of the first connection passage 25a according to the eighth embodiment is connected to one inflow/outflow port of the first heat-medium three-way valve 21a, and the other end side of the first connection passage 25a is connected to the fifth connection 26e.

As in the seventh embodiment, one end portion of the second connection passage 25b according to the eighth embodiment is connected to the second connection 26b, and the other end side of the second connection passage 25b is connected to the fourth connection 26d. The sixth heat-medium check valve 22f is disposed in the second connection passage 25b.

According to the heat management system 1 of the eighth embodiment configured as described above, as in the second embodiment, the eighth operation mode to the nineteenth operation mode can be realized. In the heat management system 1 according to the eighth embodiment, the configurations of the first connection passage 25a and the second connection passage 25b are similar to those of the seventh embodiment. Therefore, according to the heat management system 1, in all the operation modes, the flow direction of the heat medium passing through the heat generation equipment 16 can be unified from the fifth connection 26e to the fourth connection 26d.

As described above, according to the heat management system 1 of the eighth embodiment, even in a case where the configuration of the circuit connection part 25 is changed based on the configuration according to the second embodiment, it is possible to obtain the function effects exhibited from the configuration and operation common to the embodiments described above in the same manner as in the embodiments described above.

Ninth Embodiment

Next, a heat management system 1 according to a ninth embodiment will be described with reference to FIG. 30. The heat management system 1 according to the ninth embodiment has the same basic configuration as the heat medium circuit 5 according to the eighth embodiment and differs in the configurations of the circuit connection part 25 and the like. As the refrigeration cycle 40 in the ninth embodiment, the refrigeration cycle 40 configured in the same manner as in the fourth embodiment is adopted.

That is, the refrigeration cycle 40 according to the ninth embodiment includes the water-cooling capacitor 91 functioning as a radiator and the chiller 92 functioning as a heat absorber, and the water-cooling capacitor 91 and the chiller 92 can selectively function by switching a circuit configuration thereof.

Figure 30:
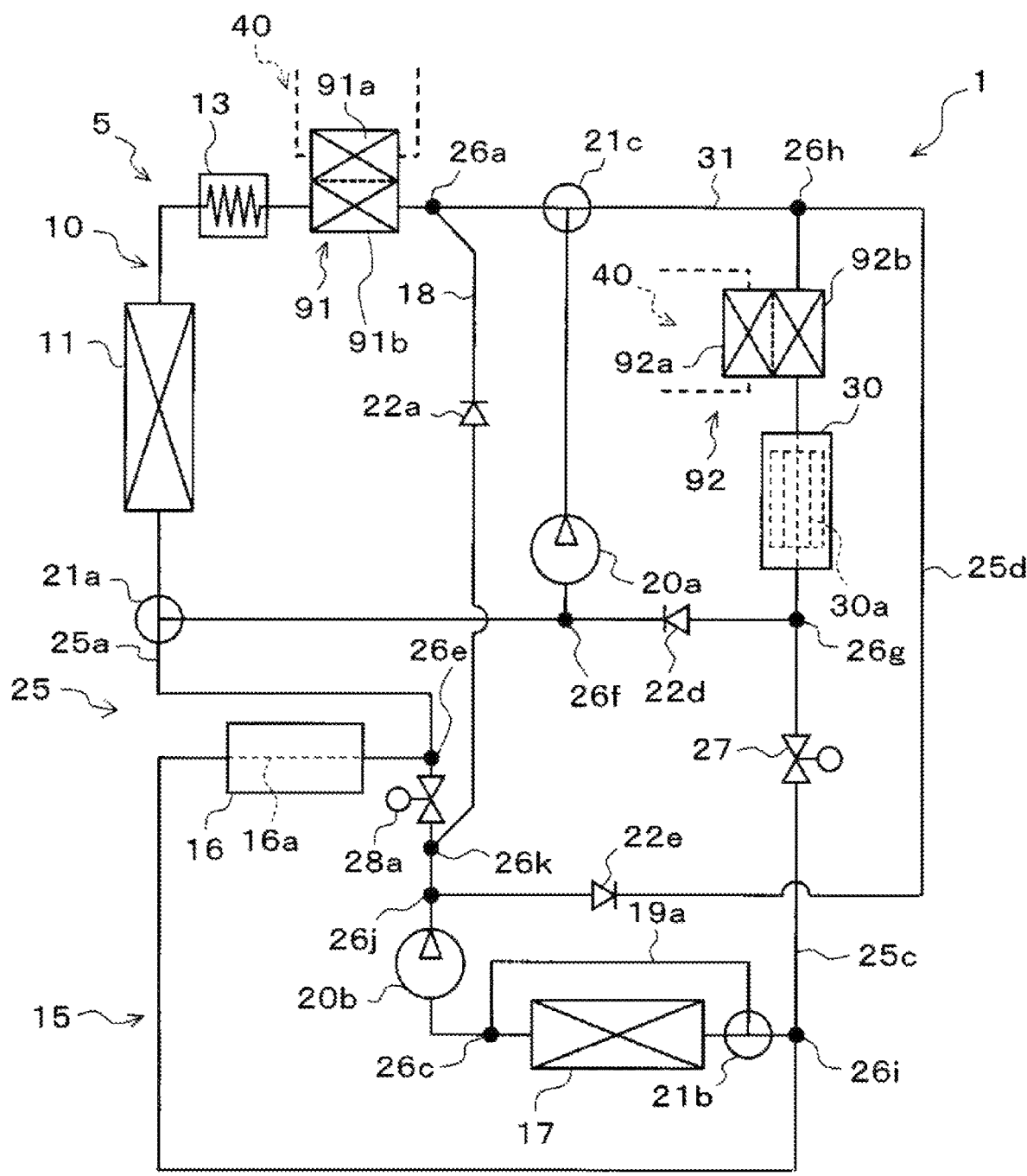
FIG. 30 is an overall configuration diagram of a heat management system according to a ninth embodiment.

As illustrated in FIG. 30, in the heat medium circuit 5 according to the ninth embodiment, the first connection 26a is connected to the heat medium inlet side of the heat medium passage 91b of the water-cooling capacitor 91. The heat medium outlet side of the heat medium passage 91b of the water-cooling capacitor 91 is connected to the inlet side of the heating passage in the heater 13.

The heat medium inlet side of the heat medium passage 92b of the chiller 92 is connected to the eighth connection 26h. The heat medium outlet side of the heat medium passage 92b of the chiller 92 is connected to the inlet side of the heat medium passage 30a of the battery 30.

In the heat medium circuit 5 according to the ninth embodiment, the second connection passage 25b and the sixth heat-medium check valve 22f are removed from the configuration according to the eighth embodiment. As in the eighth embodiment, the first connection passage 25a connects one inflow/outflow port of the first heat-medium three-way valve 21a and the fifth connection 26e.

Further, in the ninth embodiment, the low-temperature-side switching valve 28a is disposed on the heat medium pipe connecting the fifth connection 26e and the eleventh connection 26k. The configuration of the low-temperature-side switching valve 28a is similar to that of the embodiments described above.

According to the heat management system 1 of the ninth embodiment configured as described above, it is possible to realize a plurality of operation modes excluding the eleventh operation mode and the fourteenth operation mode among the eighth to nineteenth operation modes.

First, as one of the operation modes in the ninth embodiment, the operation of each component in the tenth operation mode will be described. In the tenth operation mode in the ninth embodiment, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the medium-cool mode.

Then, the control device 70 controls the operation of the first heat-medium three-way valve 21a so as to communicate the inflow/outflow port on the heater core 11 side with the inflow/outflow port on the first connection passage 25a side and to close the inflow/outflow port on the sixth connection 26f side.

Also, the control device 70 controls the operation of the second heat-medium three-way valve 21b so as to communicate the inflow/outflow port on the ninth connection 26i side and the inflow/outflow port on the detour passage 19a side and to close the inflow/outflow port on the radiator 17 side.

Further, the control device 70 controls the operation of the third heat-medium three-way valve 21c so as to communicate the inflow/outflow port on the discharge port side of the first pump 20a and the inflow/outflow port on the eighth connection 26h side and to close the inflow/outflow port on the first connection 26a side.

Then, the control device 70 controls the operation of the heat-medium switching valve 27 so as to close the heat medium passage of the third connection passage 25c. Further, the control device 70 controls the operation of the low-temperature-side switching valve 28a so as to close the heat medium passage connecting the fifth connection 26e and the eleventh connection 26k.

Thereby, in the heat medium circuit 5 in the tenth operation mode in the ninth embodiment, the heat medium circulates through the first pump 20a, the third heat-medium three-way valve 21c, the chiller 92, the battery 30, the fourth heat-medium check valve 22d, and the first pump 20a in this order.

At the same time, the heat medium circulates through the second pump 20b, the first heat-medium check valve 22a, the water-cooling capacitor 91, the heater 13, the heater core 11, the first heat-medium three-way valve 21a, the heat generation equipment 16, the second heat-medium three-way valve 21b, and the second pump 20b in this order.

That is, in the heat medium circuit 5 in the tenth operation mode, the circulation path of the heat medium via the chiller 92 and the battery 30 and the circulation path of the heat medium via the water-cooling capacitor 91, the heater core 11, the heater 13, and the heat generation equipment 16 are formed independently.

Thus, according to the tenth operation mode of the ninth embodiment, the temperature adjustment of the heat generation equipment 16, the heating of the vehicle interior, and the cooling of the battery 30 can each be performed appropriately. In the tenth operation mode, the heat generation part of the heater 13 is used as a heating source related to the heating of the vehicle interior in addition to the waste heat of the heat generation equipment 16. Thereby, the tenth operation mode can also cope with a case where high heating capacity is required as the heating of the vehicle interior.

The heat management system 1 according to the ninth embodiment can realize the same operation as the tenth operation mode as in the second embodiment described above and can thus realize the eighteenth operation mode. That is, according to the eighteenth operation mode of the ninth embodiment, the defrosting of the exterior heat exchanger 43 and the heating of the vehicle interior using waste heat or the like of the heat generation equipment can be performed in parallel.

Next, as the operation mode in the ninth embodiment, the operation of each component in the sixteenth operation mode will be described. In the sixteenth operation mode in the ninth embodiment, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the heating mode.

The control device 70 controls the operation of the first heat-medium three-way valve 21a so as to communicate the inflow/outflow port on the heater core 11 side with the inflow/outflow port on the sixth connection 26f side and to close the inflow/outflow port on the first connection passage 25a side.

Then, the control device 70 controls the operation of the second heat-medium three-way valve 21b so as to communicate the inflow/outflow port on the ninth connection 26i side with the inflow/outflow port on the radiator 17 side and to close the inflow/outflow port on the detour passage 19a side.

Also, the control device 70 controls the operation of the third heat-medium three-way valve 21c so as to communicate the inflow/outflow port on the discharge port side of the first pump 20a with the inflow/outflow port on the first connection 26a side and to close the inflow/outflow port on the eighth connection 26h side.

Further, the control device 70 controls the operation of the heat-medium switching valve 27 so as to open the heat medium passage of the third connection passage 25c. The control device 70 controls the operation of the low-temperature-side switching valve 28a so as to open the heat medium passage connecting the fifth connection 26e and the eleventh connection 26k.

Thereby, in the sixteenth operation mode according to the ninth embodiment, the heat medium circulates through the first pump 20a, the third heat-medium three-way valve 21c, the water-cooling capacitor 91, the heater 13, the heater core 11, the first heat-medium three-way valve 21a, and the first pump 20a in this order.

At the same time, the heat medium circulates through the second pump 20b, the fifth heat-medium check valve 22e, the chiller 92, the battery 30, the heat-medium switching valve 27, the second heat-medium three-way valve 21b, the radiator 17, and the second pump 20b in this order. Further, the heat medium circulates through the second pump 20b, the low-temperature-side switching valve 28a, the heat generation equipment 16, the second heat-medium three-way valve 21b, the radiator 17, and the second pump 20b in this order.

That is, in the heat medium circuit 5 in the sixteenth operation mode, the circulation path of the heat medium via the water-cooling capacitor 91 and the heater core 11 and the circulation path of the heat medium via the battery 30, the heat generation equipment 16, and the radiator 17 are formed independently.

In the circulation path of the heat medium discharged by the second pump 20b, a circulation path is formed in which the flow of the heat medium passing through the battery 30 and the flow of the heat medium passing through the heat generation equipment 16 are connected in parallel with respect to the flow of the heat medium passing through the second pump 20b and the radiator 17. Thus, according to the sixteenth operation mode of the ninth embodiment, the heating of the vehicle interior and the cooling of the heat generation equipment 16 and the battery 30 can each be performed appropriately.

Subsequently, as the operation mode in the ninth embodiment, the operation of each component in the nineteenth operation mode will be described. In the nineteenth operation mode in the ninth embodiment, the control device 70 operates the first pump 20a and the second pump 20b at the respectively predetermined pumping capacities. Also, the control device 70 operates the heater 13 so as to generate heat with a calorific value determined in advance by the user. Further, the control device 70 operates the refrigeration cycle 40 in the heating mode.

The control device 70 controls the operation of the first heat-medium three-way valve 21a so as to communicate the inflow/outflow port on the heater core 11 side with the inflow/outflow port on the sixth connection 26f side and to close the inflow/outflow port on the first connection passage 25a side.

Then, the control device 70 controls the operation of the second heat-medium three-way valve 21b so as to communicate the inflow/outflow port on the ninth connection 26i side with the inflow/outflow port on the detour passage 19a side and to close the inflow/outflow port on the radiator 17 side.

Also, the control device 70 controls the operation of the third heat-medium three-way valve 21c so as to communicate the inflow/outflow port on the discharge port side of the first pump 20a with the inflow/outflow port on the first connection 26a side and to close the inflow/outflow port on the eighth connection 26h side.

Further, the control device 70 controls the operation of the heat-medium switching valve 27 so as to open the heat medium passage of the third connection passage 25c. The control device 70 controls the operation of the low-temperature-side switching valve 28a so as to open the heat medium passage connecting the fifth connection 26e and the eleventh connection 26k.

Thereby, in the nineteenth operation mode according to the ninth embodiment, the heat medium circulates through the first pump 20a, the third heat-medium three-way valve 21c, the water-cooling capacitor 91, the heater 13, the heater core 11, the first heat-medium three-way valve 21a, and the first pump 20a in this order.

At the same time, the heat medium circulates through the second pump 20b, the fifth heat-medium check valve 22e, the chiller 92, the battery 30, the heat-medium switching valve 27, the second heat-medium three-way valve 21b, and the second pump 20b in this order. Further, the heat medium circulates through the second pump 20b, the low-temperature-side switching valve 28a, the heat generation equipment 16, the second heat-medium three-way valve 21b, and the second pump 20b in this order.

That is, in the heat medium circuit 5 in the nineteenth operation mode according to the ninth embodiment, the circulation path of the heat medium via the water-cooling capacitor 91 and the heater core 11 and the circulation path of the heat medium via the battery 30 and the heat generation equipment 16 are formed independently.

In the circulation path of the heat medium discharged by the second pump 20b, a circulation path is formed in which the flow of the heat medium passing through the battery 30 and the chiller 92 and the flow of the heat medium passing through the heat generation equipment 16 are connected in parallel with respect to the flow of the heat medium passing through the second pump 20b.

Thereby, in the nineteenth operation mode, the vehicle interior can be heated using the refrigerant of the refrigeration cycle 40 and the heat generation part of the heater 13 as heat sources. In addition, it is possible to maintain the heat generation equipment 16 and the battery 30 in a proper temperature range by reducing the temperature drop of the heat generation equipment 16 and the battery 30. That is, according to the heat management system 1 in the nineteenth operation mode, the heating of the vehicle interior and the temperature maintenance of the heat generation equipment 16 and the battery 30 can each be performed appropriately.

Further, the heat management system 1 according to the ninth embodiment can realize the twentieth operation mode. In the twentieth operation mode, the control device 70 operates the first pump 20a and the second pump 20b at the respectively predetermined pumping capacities. Also, the control device 70 operates the heater 13 so as to generate heat with a calorific value determined in advance by the user.

The control device 70 controls the operation of the first heat-medium three-way valve 21a so as to communicate the inflow/outflow port on the heater core 11 side with the inflow/outflow port on the first connection passage 25a side and to close the inflow/outflow port on the sixth connection 26f side.

Then, the control device 70 controls the operation of the second heat-medium three-way valve 21b so as to communicate the inflow/outflow port on the ninth connection 26i side with the inflow/outflow port on the detour passage 19a side and to close the inflow/outflow port on the radiator 17 side.

Also, the control device 70 controls the operation of the third heat-medium three-way valve 21c so as to communicate the inflow/outflow port on the discharge port side of the first pump 20a with the inflow/outflow port on the first connection 26a side and to close the inflow/outflow port on the eighth connection 26h side.

Further, the control device 70 controls the operation of the heat-medium switching valve 27 so as to close the heat medium passage of the third connection passage 25c. The control device 70 controls the operation of the low-temperature-side switching valve 28a so as to close the heat medium passage connecting the fifth connection 26e and the eleventh connection 26k.

Thereby, in the twentieth operation mode according to the ninth embodiment, the heat medium circulates through the first pump 20a, the third heat-medium three-way valve 21c, the water-cooling capacitor 91, the heater 13, the heater core 11, the first heat-medium three-way valve 21a, and the heat generation equipment 16 in this order. The heat medium flowing out of the heat generation equipment 16 flows through the second heat-medium three-way valve 21b, the second pump 20b, the fifth heat-medium check valve 22e, the chiller 92, the battery 30, the fourth heat-medium check valve 22d, and the first pump 20a in this order.

That is, in the heat medium circuit 5 in the twentieth operation mode according to the ninth embodiment, the circulation path of the heat medium via the water-cooling capacitor 91, the heater 13, the heater core 11, the heat generation equipment 16, the chiller 92, and the battery 30 is formed.

Therefore, in the twentieth operation mode, the heat management system 1 can perform the heating of the vehicle interior and the temperature adjustment of the heat generation equipment 16 and the battery 30 by using the refrigerant of the refrigeration cycle 40 and the heat generation part of the heater 13 as heat sources.

As described above, according to the heat management system 1 of the ninth embodiment, even when the configuration of the refrigeration cycle 40 or the like is changed based on the configuration according to the eighth embodiment, it is possible to obtain the function effects exhibited from the configuration and operation common to the eighth embodiment or the like in the same manner as in the embodiments described above.

Tenth Embodiment

Subsequently, a heat management system 1 according to a tenth embodiment will be described with reference to FIG. 31. The heat management system 1 according to the tenth embodiment has the same basic configuration as the heat management system 1 according to the ninth embodiment and differs in the configurations of the bypass passage 18, the low-temperature-side switching valve 28a, and the like in the heat medium circuit 5.

Figure 31:
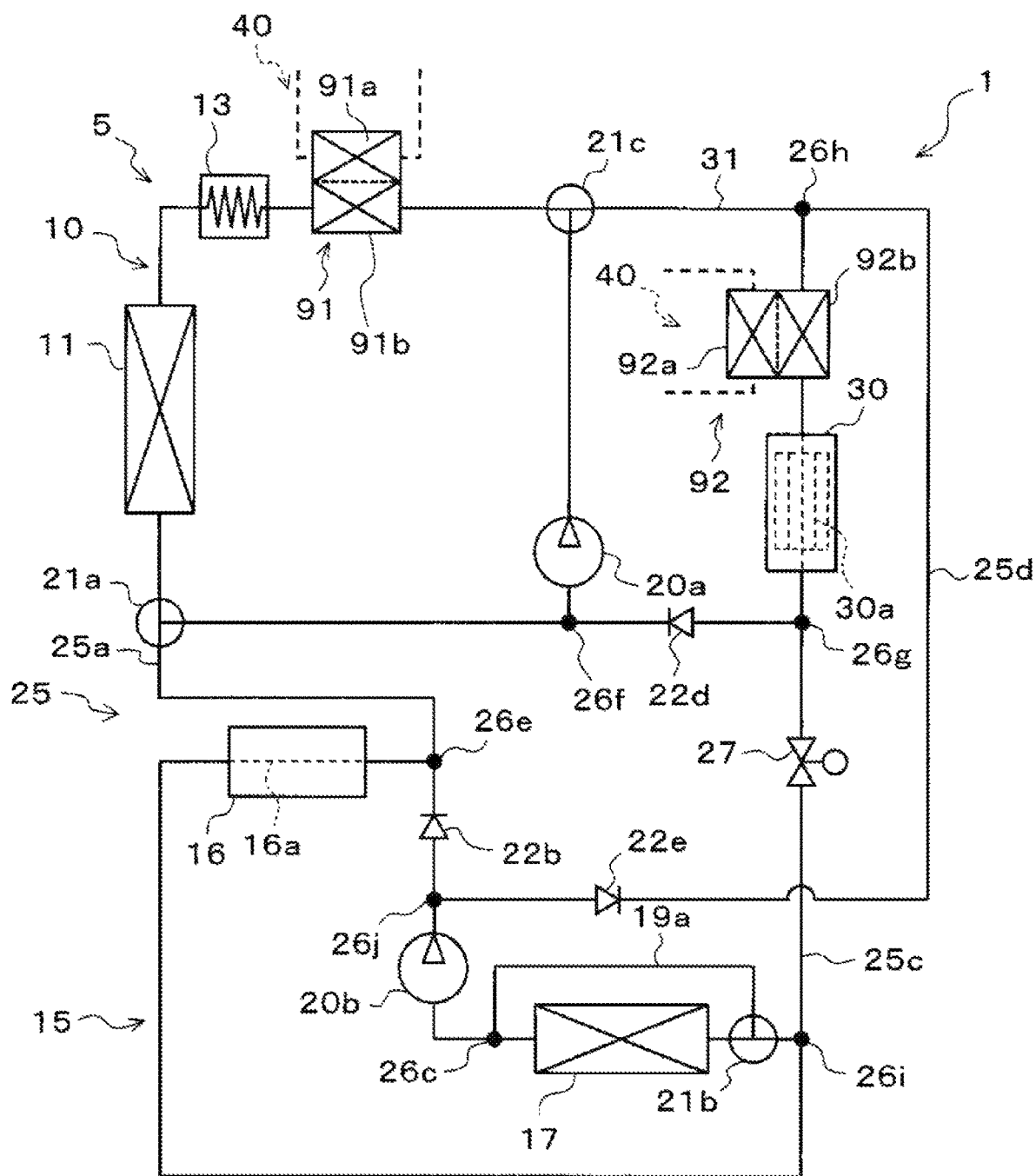
FIG. 31 is an overall configuration diagram of a heat management system according to a tenth embodiment.

As illustrated in FIG. 31, in the heat medium circuit 5 according to the tenth embodiment, the bypass passage 18 connecting the first connection 26a and the eleventh connection 26k is removed. Therefore, in the eighth embodiment, the first heat-medium check valve 22a disposed in the bypass passage 18 is also removed.

In the ninth embodiment, the low-temperature-side switching valve 28a is disposed between the fifth connection 26e and the tenth connection 26j, but in the tenth embodiment, the second heat-medium check valve 22b is disposed instead of the low-temperature-side switching valve 28a. The second heat-medium check valve 22b according to the tenth embodiment allows the heat medium to flow from the tenth connection 26j side to the fifth connection 26e side and prohibits the heat medium from flowing from the fifth connection 26e side to the tenth connection 26j side.

According to the heat management system 1 of the tenth embodiment configured as described above, even when the configuration of the heat medium circuit 5 is simplified as compared with the ninth embodiment, it is possible to realize the operation modes excluding the ninth to eleventh, thirteenth, fourteenth, and eighteenth operation modes among the eighth to nineteenth operation modes.

As described above, according to the heat management system 1 of the tenth embodiment, even in a case where the heat medium circuit 5 according to the ninth embodiment is simplified, it is possible to obtain the function effects exhibited from the configuration and operation common to the embodiments described above in the same manner as in the embodiments described above.

The present disclosure is not limited to the embodiments described above but can be variously modified as follows without departing from the spirit of the present disclosure.

In the embodiments described above, an example has been described in which the heat management system 1 according to the present disclosure is applied to the vehicle air conditioner with in-vehicle equipment cooling function, but the application of the heat management system 1 is not limited thereto. The heat management system 1 is not limited to a vehicle use but may be applied to a stationary air conditioner or the like. For example, the present invention may be applied to an air conditioner with a server cooling function that performs air conditioning in a room in which a server (computer) is accommodated while the temperature of the server is adjusted appropriately.

In the heat medium circuit of the heat management system, the heat generation equipment 16 includes the plurality of components, but the heat medium passages 16a of the components in the heat generation equipment 16 may be directly connected to each other in series or may be connected in parallel. The heat generation equipment 16 may be formed as a single component.

In the embodiments described above, the first heat-medium three-way valve 21a, the second heat-medium three-way valve 21b, the third heat-medium three-way valve 21c, and the heat-medium switching valve 27 have each been adopted as the circuit switching part in the heat medium circuit 5, but the present invention is not limited thereto. When the circuit configuration in the heat medium circuit 5 can be switched, another configuration such as a combination of a plurality of switching valves can be adopted.

In the embodiments described above, the example in which the ethylene glycol aqueous solution is adopted as the heat medium of the heat medium circuit 5 has been described, but the heat medium is not limited thereto. For example, a solution containing dimethylpolysiloxane, nanofluid, or the like, antifreeze liquid, or the like can be adopted as the heat medium. Further, an insulating liquid medium such as oil can also be used as the heat medium.

The configuration of the refrigeration cycle 40 in the present disclosure is not limited to the above embodiments. For example, an exterior heat exchanger having a modulator may be adopted as the exterior heat exchanger 43 constituting the refrigeration cycle 40. Similarly, as the water refrigerant heat exchanger 12, the water refrigerant heat exchanger 12 having a liquid storage tank may be adopted.

In the above embodiments, the example in which evaporating pressure regulating valve 48 is adopted as the component of the refrigeration cycle 40 has been described, but the evaporating pressure regulating valve 48 is not an essential component. For example, in a refrigeration cycle device in which the refrigerant evaporating temperature in the water refrigerant heat exchanger 12 does not become 0° C. or lower in the medium-cool and cooling mode, the evaporating pressure regulating valve 48 may be eliminated.

In the embodiment described above, the example in which the four-way valve 42 is adopted as the refrigerant circuit switching part of the refrigeration cycle 40 has been described, but as long as the circuit configuration of the refrigeration cycle 40 can be switched similarly to the four-way valve 42, other configurations can be adopted.

Further, in the embodiments described above, the example in which R1234yf is adopted as the refrigerant of the refrigeration cycle 40 has been described, but the refrigerant is not limited thereto. For example, R134a, R600a, R410A, R404A, R32, R407C, and the like may be adopted. Alternatively, a mixed refrigerant, obtained by mixing a plurality of kinds of these refrigerants, or the like may be adopted.

Although the disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

What is claimed is:

1. A heat management system comprising:
a high-temperature heat medium circuit connecting a heat medium and refrigerant heat exchanger and a heater core to circulate a heat medium, the heat medium and refrigerant heat exchanger being configured to adjust a temperature of a heat medium by heat exchange with a refrigerant circulating in a refrigeration cycle, and the heater core being configured to radiate heat of the heat medium to ventilation air to be blown to a space to be air conditioned;
a low-temperature heat medium circuit connecting a radiator and a heat generation equipment to circulate the heat medium, the radiator being configured to radiate heat of the heat medium to outside air, and the heat generation equipment being configured to generate heat in accordance with operation and to have a temperature adjusted by the heat of the heat medium;
a circuit connection part connecting the high-temperature heat medium circuit and the low-temperature heat medium circuit, to flow in and out the heat medium in the high-temperature heat medium circuit and the low-temperature heat medium circuit; and
a circuit switching part configured to switch the flow of the heat medium flowing in the high-temperature heat medium circuit, the low-temperature heat medium circuit and the circuit connection part, wherein
the circuit switching part is configured to switch between
an operation mode in which the heat medium heated by the heat medium and refrigerant heat exchanger is circulated to pass through the heater core, and
an operation mode in which the heat medium heated by the heat generation equipment and the heat medium and refrigerant heat exchanger is circulated to pass through the heater core, and
in the operation mode in which the heat medium heated by the heat generation equipment and the heat medium and refrigerant heat exchanger is circulated to pass through the heater core, the circuit switching part is configured to switch an operation mode in which the heat medium is circulated in a circulation path via the heat medium and refrigerant heat exchanger and the heater core, and the heat medium is circulated in a heat medium circulation path via the heat generation equipment and the radiator independently of a heat medium circulation path via the heat medium and refrigerant heat exchanger and the heater core, when the temperature of the heat medium is higher than a predetermined reference temperature.

2. The heat management system according to claim 1, wherein the circuit switching part is configured to switch an operation mode in which the space to be air conditioned is heated by circulating the heated heat medium to pass through the heater core, and the heat medium is circulated in a heat medium circulation path via the heat generation equipment independently of a heat medium circulation path via the heater core.

3. The heat management system according to claim 2, wherein the radiator is included in the heat medium circulation path via the heat generation equipment.

4. The heat management system according to claim 1, wherein
the refrigeration cycle includes an exterior heat exchanger that exchanges heat between the refrigerant and the outside air,
the circuit switching part is configured to switch an operation mode in which the heat medium is circulated via the heat medium and refrigerant heat exchanger and the heater core, and the heat medium flowing into and out of the heat generation equipment is restricted, and
the heat medium and refrigerant heat exchanger is configured to absorb heat of the heat medium and to supply the heat to the exterior heat exchanger.

5. The heat management system according to claim 1, wherein the circuit switching part is configured to switch an operation mode in which the heat medium heated by the heat generation equipment is circulated to pass through the radiator, and the heat medium flowing into and out of the heat medium and refrigerant heat exchanger is restricted.

6. The heat management system according to claim 1, wherein
in the operation mode in which the heat medium heated by the heat generation equipment and the heat medium and refrigerant heat exchanger is circulating to pass through the heater core, the circuit switching part is configured to switch an operation mode in which the heat medium is circulated to pass through the radiator in addition to the heat generation equipment, the heat medium and refrigerant heat exchanger and the heater core, when a high-temperature condition regarding the temperature of the heat medium is satisfied.

7. The heat management system according to claim 1, wherein the high-temperature heat medium circuit includes a heater that is configured to heat the heat medium flowing into the heater core in accordance with operation and to arbitrarily adjust a heat amount for heating the heat medium.

8. A heat management system comprising:
a high-temperature heat medium circuit connecting a heat medium and refrigerant heat exchanger and a heater core to circulate a heat medium, the heat medium and refrigerant heat exchanger being configured to adjust a temperature of a heat medium by heat exchange with a refrigerant circulating in a refrigeration cycle, and the heater core being configured to radiate heat of the heat medium to ventilation air to be blown to a space to be air conditioned;
a low-temperature heat medium circuit connecting a radiator and a heat generation equipment to circulate the heat medium, the radiator being configured to radiate heat of the heat medium to outside air, and the heat generation equipment being configured to generate heat in accordance with operation and to have a temperature adjusted by the heat of the heat medium;
a circuit connection part connecting the high-temperature heat medium circuit and the low-temperature heat medium circuit, to flow in and out the heat medium in the high-temperature heat medium circuit and the low-temperature heat medium circuit;
an equipment heat exchange part connected to allow inflow and outflow of the heat medium and configured to exchange heat between the heat medium and a target equipment to be subjected to temperature adjustment; and
a circuit switching part configured to switch the flow of the heat medium flowing in the high-temperature heat medium circuit, the low-temperature heat medium circuit and the circuit connection part, wherein
the circuit switching part is configured to switch between
an operation mode in which the heat medium heated by the heat medium and refrigerant heat exchanger is circulated to pass through the heater core, and
an operation mode in which the heat medium heated by the heat generation equipment and the heat medium and refrigerant heat exchanger is circulated to pass through the heater core, and
the circuit switching part is configured to switch an operation mode in which the heat medium having passed through the heat medium and refrigerant heat exchanger is circulated to pass through the equipment heat exchange part, and a heat medium circulation pass via the heater core is made independent of a heat medium circulation path including the heat medium and refrigerant heat exchanger and the equipment heat exchange part.

9. The heat management system according to claim 8, wherein
when the heat medium having passed through the heat medium and refrigerant heat exchanger is circulated to pass through the equipment heat exchange part, the circuit switching part is configured to switch an operation mode in which the heat medium is circulated in a heat medium circulation path via the heater core and the heat generation equipment independently of the heat medium circulation path including the heat medium and refrigerant heat exchanger and the equipment heat exchange part.

10. The heat management system according to claim 8, wherein
when the heat medium having passed through the heat medium and refrigerant heat exchanger is circulated to pass through the equipment heat exchange part, the circuit switching part is configured to switch an operation mode in which the heat medium is circulated to pass through the heater core, the heat generation equipment, and the radiator independently of the heat medium circulation path including the heat medium and refrigerant heat exchanger and the equipment heat exchange part.

11. A heat management system comprising:

a high-temperature heat medium circuit connecting a heat medium and refrigerant heat exchanger and a heater core to circulate a heat medium, the heat medium and refrigerant heat exchanger being configured to adjust a temperature of a heat medium by heat exchange with a refrigerant circulating in a refrigeration cycle, and the heater core being configured to radiate heat of the heat medium to ventilation air to be blown to a space to be air conditioned;

a low-temperature heat medium circuit connecting a radiator and a heat generation equipment to circulate the heat medium, the radiator being configured to radiate heat of the heat medium to outside air, and the heat generation equipment being configured to generate heat in accordance with operation and to have a temperature adjusted by the heat of the heat medium;

a circuit connection part connecting the high-temperature heat medium circuit and the low-temperature heat medium circuit, to flow in and out the heat medium in the high-temperature heat medium circuit and the low-temperature heat medium circuit;

an equipment heat exchange part that is connected to allow inflow and outflow of the heat medium and exchanges heat between the heat medium and a target equipment to be subjected to temperature adjustment; and a circuit switching part configured to switch the flow of the heat medium flowing in the high-temperature heat medium circuit, the low-temperature heat medium circuit and the circuit connection part, wherein the circuit switching part is configured to switch between
an operation mode in which the heat medium heated by the heat medium and refrigerant heat exchanger is circulated to pass through the heater core, and
an operation mode in which the heat medium heated by the heat generation equipment and the heat medium and refrigerant heat exchanger is circulated to pass through the heater core, and the circuit switching part is configured to switch an operation mode in which the heat medium having passed through the heat medium and refrigerant heat exchanger is circulated to pass through the heater core, and the flow of the heat medium flowing in the equipment heat exchange part is made independent of a heat medium circulation path including the heat medium and refrigerant heat exchanger and the heater core.

12. The heat management system according to claim 11, wherein
when the heat medium having passed through the heat medium and refrigerant heat exchanger is circulated to pass through the heater core, the circuit switching part is switched to an operation mode in which the heat medium is circulated via the equipment heat exchange part and radiator independently of the heat medium circulation path including the heat medium and refrigerant heat exchanger and the heater core.

13. The heat management system according to claim 11, wherein
when the heat medium having passed through the heat medium and refrigerant heat exchanger is circulated through the heater core, the circuit switching part is switched to an operation mode in which the heat medium is circulated to pass through the equipment heat exchange part, the radiator and the heat generation equipment, independently of the heat medium circulation path including the heat medium and refrigerant heat exchanger and the heater core.

14. The heat management system according to claim 11, wherein
when the heat medium having passed through the heat medium and refrigerant heat exchanger is circulated through the heater core, the circuit switching part is switched to an operation mode in which the heat medium is circulated to pass through the equipment heat exchange part and the heat generation equipment, independently of the heat medium circulation path including the heat medium and refrigerant heat exchanger and the heater core.

15. The heat management system according to claim 11, wherein
when the heat medium having passed through the heat medium and refrigerant heat exchanger is circulated through the heater core, the circuit switching part is switched to an operation mode in which the heat medium flowing into and out of the equipment heat exchange part is restricted independently of the circulation of the heat medium via the heat medium and refrigerant heat exchanger and the heater core.

16. The heat management system according to claim 8, wherein
the high-temperature heat medium circuit includes a heater configured to heat the heat medium flowing into the heater core in accordance with operation and to arbitrarily adjusting an amount of heat for heating the heat medium.

17. The heat management system according to claim 16, wherein
the circuit switching part is configured to switch an operation mode in which the heat medium having passed through the heat medium and refrigerant heat exchanger is branched into a flow via the heater and the heater core and a flow via the equipment heat exchange part, and to cause simultaneously
(i) a circulation of the heat medium via the heat medium and refrigerant heat exchanger, the heater and the heater core and
(ii) a circulation of the heat medium via the heat medium and refrigerant heat exchanger and the equipment heat exchange part.

* * * * *